US006662061B1

(12) United States Patent
Brown

(10) Patent No.: US 6,662,061 B1
(45) **Date of Patent: *Dec. 9, 2003**

(54) SYSTEM AND METHOD FOR SIMULATION AND MODELING OF BATCH PROCESS MANUFACTURING FACILITIES USING PROCESS TIME LINES

(76) Inventor: Peter G. Brown, 63 Clearwater Rd., Newton, MA (US) 02162

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,794

(22) Filed: Aug. 13, 1999

Related U.S. Application Data

(63) Continuation-in-part of application No. 09/019,777, filed on Feb. 6, 1998, now Pat. No. 6,311,095.

(60) Provisional application No. 60/037,387, filed on Feb. 7, 1997.

(51) Int. Cl.[7] ............................................ G06F 19/00

(52) U.S. Cl. .......................... 700/97; 700/100; 700/117

(58) Field of Search ................................ 700/112, 113, 700/114, 115, 116, 117, 118, 100, 97

(56) References Cited

U.S. PATENT DOCUMENTS

| | | | | |
|---|---|---|---|---|
| 4,796,194 | A | 1/1989 | Atherton | 700/103 |
| 4,975,865 | A | 12/1990 | Carrette et al. | 700/10 |
| 5,006,992 | A | 4/1991 | Skeirik | 706/58 |
| 5,148,370 | A | 9/1992 | Litt et al. | 700/104 |
| 5,164,905 | A | 11/1992 | Iwasaki et al. | 700/112 |
| 5,237,508 | A | 8/1993 | Furukawa et al. | 700/100 |
| 5,255,197 | A | 10/1993 | Iida | 700/108 |

(List continued on next page.)

OTHER PUBLICATIONS

International Search Report for PCT Appl. No. PCT/US98/13055.

Berstein et al., "A Simulation–based Decision Support System for a Specialty Chemicals Production Plant," *Proc. of the 1992 Winter Simulation Conference,* 1992, pp. 1262–1270.

(List continued on next page.)

*Primary Examiner*—Albert W. Paladini
*Assistant Examiner*—Chad Rapp
(74) *Attorney, Agent, or Firm*—Sterne Kessler Goldstein & Fox P.L.L.C.

(57) ABSTRACT

A system and method for the simulation and modeling of biopharmaceutical batch process manufacturing facilities using process time lines is described herein. The system employs a four-field delimited string code which specifies the unit identifier code and the iteration value for each of the three levels of scheduling cycle—"Unit Operation Cycles," "Unit Operation Cluster Cycles," and "Batch Cycles"—of the biopharmaceutical drug production process being modeled. The method includes the step of selecting a sequence of unit operations wherein each of the sequence of unit operations has an identifier code. Next, a set of scheduling cycles is selected for each of the sequence of unit operations. A master table is then referenced, using the identifier code, to obtain operational parameters for each of the sequence of unit operations. A block flow diagram is then generated using the sequence of unit operations and the operational parameters. The method further includes generating a process time line using the operational parameters, the block flow diagram, and the set of scheduling cycles for each of the sequence of unit operations. The process time line—a time line for the beginning and ending times of each unit operation and its associated tasks for the entire biopharmaceutical drug production process—is used as a tool for batch processing and facility design.

12 Claims, 67 Drawing Sheets

U.S. PATENT DOCUMENTS

| | | | | |
|---|---|---|---|---|
| 5,343,387 A | | 8/1994 | Honma et al. | 705/9 |
| 5,375,062 A | | 12/1994 | Aoki | 700/94 |
| 5,402,367 A | | 3/1995 | Sullivan et al. | 703/6 |
| 5,402,526 A | | 3/1995 | Bauman et al. | 706/49 |
| 5,408,405 A | | 4/1995 | Mozumder et al. | 700/31 |
| 5,428,525 A | | 6/1995 | Cappelaere et al. | 700/49 |
| 5,440,478 A | | 8/1995 | Fisher et al. | 700/109 |
| 5,442,562 A | | 8/1995 | Hopkins et al. | 700/108 |
| 5,450,346 A | | 9/1995 | Krummen et al. | 700/11 |
| 5,463,555 A | | 10/1995 | Ward et al. | 700/96 |
| 5,495,417 A | | 2/1996 | Fuduka et al. | 700/121 |
| 5,594,639 A | | 1/1997 | Atsumi | 700/107 |
| 5,666,297 A | | 9/1997 | Britt et al. | 703/18 |
| 5,666,585 A | | 9/1997 | Nagira et al. | 399/10 |
| 5,737,581 A | | 4/1998 | Keane | 703/6 |
| 5,757,659 A | | 5/1998 | Arai et al. | 702/22 |
| 5,774,875 A | | 6/1998 | Medeiros et al. | 705/28 |
| 5,841,660 A | | 11/1998 | Robinson et al. | 700/115 |
| 5,969,973 A | | 10/1999 | Bourne et al. | 700/115 |
| 5,980,078 A | | 11/1999 | Krivoshein et al. | 700/1 |
| 6,311,093 B1 | * | 10/2001 | Brown | 700/95 |
| 6,311,095 B1 | * | 10/2001 | Brown | 700/117 |

OTHER PUBLICATIONS

Ehrlich et al., "Making Better Manufacturing Decisions with AIM," *Proc. of the 1996 Winter Simulation Conference,* 1996, pp. 485–491.

Faccenda et al., "A Combined Simulation/Optimization Approach to Process Plant Design," *Proc. of the 1992 Winter Simulation Conference,* 1992, pp. 1256–1261.

Ketcham et al., "A Generic Simulator for Continuous Flow Manufacturing," *Proc. of 1988 Winter Simulation Conference,* 1988, pp. 609–615.

Leitch et al., "A Real–Time Knowledge Based System for Product Quality Control," *International Conference on Control,* 1988, pp. 281–286.

Litt, J., "An Expert System to Perform On–Line Controller Tuning," *IEEE Control Systems Magazine,* vol. 11, Issue 3, Apr. 1991, pp. 18–23.

Sam G. Taylor et al., APICS, *Process Flow Scheduling: A Scheduling Systems Framework for Flow Manufacturing,* Copyright 1994 (168 Pages).

Sam G. Taylor et al., APICS, *Can Process Flow Scheduling Help You?,* pp. 44–46, Mar. 1996.

Copy of International Search Report from PCT Appl. No. PCT/US00/22104, 2 pages, mailed Jan. 25, 2001.

* cited by examiner

*FIG. 3*

UNIT OPERATIONS LIST

MICROBIAL FERMENTATION PROCESS

| UOP SEQ. NO. | CODE | UNIT OPERATION TYPE | CYCLES PER UnOp | UnOp OFFSET (HRS) | BATCH | BATCH UnOp START | BATCH UnOp END | BATCH OFFSET (HRS) | PROCESS | PROCESS UnOp START | PROCESS UnOp END | PROCESS OFFSET (HRS) | RECOVERY PRODUCT SWR | RECOVERY PRODUCT OAR | RECOVERY TOTAL PROTEIN SWR | RECOVERY TOTAL PROTEIN OAR |
|---|---|---|---|---|---|---|---|---|---|---|---|---|---|---|---|---|
| 1 | 1 | INOCULUM PREP | 1 | | 3 | 1 | 6 | | 1 | | | | | | | |
| 2 | 2 | FLASK GROWTH | 1 | | 3 | 1 | 6 | | 1 | | | | | | | |
| 3 | 53 | SEED FERMENTATION | 1 | | 3 | 1 | 6 | | 1 | | | | | | | |
| 4 | 3 | PRODUCTION FERMENTATION | 1 | | 3 | 1 | 6 | | 1 | | | | 100% | 100% | 100% | 100% |
| 5 | 51 | HEAT EXCHANGE | 1 | | 3 | 1 | 6 | | 1 | | | | 100% | 100% | 100% | 100% |
| 6 | 28 | CONT. CENTRIFUGATION/WHOLE CELL HARVEST | 1 | | 3 | 1 | 6 | | 1 | | | | 95% | 95% | 95% | 95% |
| 7 | 48 | RESUSPEND CELL PASTE | 1 | | 1 | | | | 1 | | | | 100% | 95% | 100% | 95% |
| 8 | 51 | HEAT EXCHANGE | 1 | | 3 | 8 | 10 | | 1 | | | | 100% | 95% | 100% | 95% |
| 9 | 31 | CELL DISRUPTION/HIGH PRESSURE | 1 | | 3 | 8 | 10 | | 1 | | | | 80% | 76% | 90% | 86% |
| 10 | 51 | HEAT EXCHANGE | 1 | | 3 | 8 | 10 | | 1 | | | | 100% | 76% | 100% | 86% |
| 11 | 48 | RESUSPENSION/SURFACTANT | 1 | | 2 | 11 | 12 | | 1 | | | | 100% | 76% | 95% | 81% |
| 12 | 29 | CONT. CENTRIFUGATION/PRECIPITATE HARVEST | 1 | | 2 | 11 | 12 | | 1 | | | | 95% | 72% | 32% | 26% |
| 13 | 48 | RESUSPENSION/BUFFER | 1 | | 1 | | | | 1 | | | | 100% | 72% | 95% | 24% |
| 14 | 29 | ULTRAFILTRATION/CONCENTRATION/DILUTION | 1 | | 1 | | | | 1 | | | | 95% | 69% | 95% | 23% |
| 15 | 48 | MICROFILTRATION/TANGENTIAL FLOW | 1 | | 1 | | | | 1 | | | | 93% | 64% | 95% | 22% |
| 16 | 36 | PRODUCT ADSORPTION HPLC | 1 | | 1 | | | | 1 | | | | 85% | 54% | 33% | 7% |
| 17 | 34 | PRODUCT ADSORPTION HPLC | 1 | | 1 | | | | 1 | | | | 90% | 49% | 40% | 3% |
| 18 | 39 | ULTRAFILTRATION/FLOW DIALYSIS | 1 | | 1 | | | | 1 | | | | 95% | 46% | 95% | 3% |
| 19 | 39 | PRODUCT ADSORPTION HPLC | 1 | | 1 | | | | 1 | | | | 85% | 39% | 55% | 2% |
| 20 | 37 | ULTRAFILTRATION/FLOW DIALYSIS | 1 | | 1 | | | | 1 | | | | 90% | 35% | 95% | 1% |
| 21 | 39 | PRODUCT ADSORPTION HPLC | 1 | | 1 | | | | 1 | | | | 90% | 32% | 80% | 1% |
| 22 | 37 | MICROFILTRATION/DEAD END | 1 | | 1 | | | | 1 | | | | 95% | 30% | 95% | 1% |
| 23 | 99 | END | | | | | | | | | | | | | | |

UNIT OPERATIONS LIST

MAMMALIAN CELL CULTURE PROCESS

| | | | CYCLES PER | | | | | | | | | | RECOVERY | | | |
|---|---|---|---|---|---|---|---|---|---|---|---|---|---|---|---|---|
| | | | UnOp | | BATCH | | | | PROCESS | | | | PRODUCT | | TOTAL PROTEIN | |
| UOP SEQ. NO. | CODE | UNIT OPERATION TYPE | | OFFSET (HRS) | | UnOp START | UnOp END | OFFSET (HRS) | | UnOp START | UnOp END | OFFSET (HRS) | SWR | OAR | SWR | OAR |
| 1 | 4 | INITIAL SEEDING | 1 | | 1 | | | | 1 | | | | | | | |
| 2 | 5 | CULTURE VESSEL SPLIT | 1 | | 1 | | | | 1 | | | | | | | |
| 3 | 5 | CULTURE VESSEL SPLIT | 1 | | 1 | | | | 1 | | | | | | | |
| 4 | 5 | CULTURE VESSEL SPLIT | 1 | | 1 | | | | 1 | | | | | | | |
| 5 | 6 | SPINNER FLASK SPLIT | 1 | | 1 | | | | 1 | | | | | | | |
| 6 | 54 | SPINNER FLASK SPLIT | 1 | | 1 | | | | 1 | | | | | | | |
| 7 | 13 | STIRRED TANK REACTOR | 1 | | 1 | | | | 1 | | | | | | | |
| 8 | 61 | HARVEST/FEED | 7 | 24 | 1 | | | | 8 | 8 | 18 | 168 | | | | |
| 9 | 62 | HARVEST POOL | 1 | | 1 | | | | 8 | 8 | 18 | 168 | | | | |
| 10 | 34 | MF/TANGENTIAL FLOW | 1 | | 1 | | | | 8 | 8 | 18 | 168 | | | | |
| 11 | 36 | UF/CONCENTRATION | 1 | | 1 | | | | 8 | 8 | 18 | 168 | | | | |
| 12 | 39 | PAC/MPLC | 1 | | 1 | | | | 8 | 8 | 18 | 168 | | | | |
| 13 | 39 | PAC/MPLC | 1 | | 1 | | | | 8 | 8 | 18 | 168 | | | | |
| 14 | 36 | UF/CONCENTRATION | 1 | | 1 | | | | 8 | 8 | 18 | 168 | | | | |
| 15 | 39 | PAC/MPLC | 1 | | 1 | | | | 8 | 8 | 18 | 168 | | | | |
| 16 | 37 | UF/FLOW DIALYSIS | 1 | | 1 | | | | 8 | 8 | 18 | 168 | | | | |
| 17 | 39 | PAC/MPLC | 1 | | 1 | | | | 8 | 8 | 18 | 168 | | | | |
| 18 | 35 | MF/DEAD END | 1 | | 1 | | | | 8 | 8 | 18 | 168 | | | | |
| 19 | 99 | END | 1 | | 1 | | | | 8 | 8 | 18 | 168 | | | | |

| UNIT OPERATION ID CODE | UNIT OPERATION TYPE | PARAMETERS |
|---|---|---|
| 1 | INOCULUM PREP | # OF FLASKS, VOLUME OF FLASKS, TEMPERATURE, AGITATION, DURATION, FINAL OD |
| 2 | FLASK GROWTH | SCALE UP RATIO, MEDIA VOLUME, TEMPERATURE, AGITATION, DURATION, FINAL OD |
| 3 | FERMENTATION SEED | SCALE UP RATIO, FERMENTOR WORKING VOLUME, ANTIFOAM, BASE ACID, GROW TEMPERATURE, AGITATION, SPARGE RATE, BACK PRESSURE, TOTAL DURATION |
| 4 | FERMENTATION PRODUCTION | SCALE UP RATIO, GERMENTOR WORKING VOLUME, ANTIFOAM A, ANTIFOAM B, BASE, ACID, GROW TEMPERATURE, AGITATION, SPARGE RATE, BACK PRESSURE, TOTAL DURATION, FINAL OK, DRY CELL MASS, PRODUCT CONCENTRATION, CIP, SIP |
| 5 | HEAT EXCHANGE | PROCESS INITIAL & FINAL TEMP; UTILITY INITIAL & FINAL TEMP; PROCESS SPECIFIC HEAT; DESIGN TYPE, STEP RECOVERY OF PRODUCT, STEP RECOVERY OF T.P., TEMPERATURE REGULATION, CIP, SIP |
| 6 | BATCH CENTRIFUGATION | SYSTEM VOID VOLUME, RCF, TIME, VOLUME REDUCTION, WASH VOLUME, CLEAN, RINSE |
| 7 | RESOLUBLIZATION RESUSPENSION | REAGENT/PRODUCT RATIO, TITRATION SOLUTION, RESOLUBLIZATION, AGITATION, SOLUTION NAME, STEP RECOVERY OF THE PRODUCT, STEP RECOVERY OF T.P., TEMPERATURE REGULATION, CIP, SIP |
| 8 | CELL DISRUPTION HIGH PRESS. HOMMOGENIZATION | PRODUCT TERMPERATURE, UNILITY TEMPERATURE, VOID VOLUME, NUMBER OF PASSES, PRESSURE, FLOW RATE, TEMPERATURE INCREASE, WASH, RINSE, STEP RECOVERY OF PRODUCT, STEP RECOVERY OF T.P., TERMPERATURE REGULATION, CIP |
| 9 | DILUTE WITH SURFACTANT | REAGENT PRODUCT RATIO, TITRATION SOLUTION, DILUTION TIME, AGITATION, SOLUTION NAME, STEP RECOVERY OF PRODUCT, STEP RECOVERY OF T.P., TEMPERATURE REGULATION, CIP, SIP |
| 10 | BATCH CENTRIFUGATION PRECIPITATE HARVEST | SYSTEM VOID VOLUME, RCF, TIME, VOLUME REDUCTION, WASH VOLUME, CLEAN, RINSE, STEP RECOVERY OF PRODUCT, STEP RECOVERY OF T.P., TEMPERATURE REGULATION, CIP, SIP |
| 11 | RESUSPEND WITH CHAOTROPE | REAGENT/PRODUCT RATIO, TITRATION SOLUTION, RESOLUBLIZATION, AGITATION, SOLUTION NAME, STEP RECOVERY OF PRODUCT, STEP RECOVERY TO TP, TEMPERATURE REGULATION, CIP, SIP |
| • | • | • |

| SOLUTION TYPE | TASKS | TASK DURATION |
|---|---|---|
| S-101 | SETUP, PREINCUBATION, INCUBATION, CLEAN UP | 3, 3, 23, .3, HRS |
| S-101 | SETUP, PREINCUBATION, INCUBATION, CLEAN UP | 1, 1, 23, .3, HRS |
| S-101, 102, 103, 104, 105 | SETUP, PREINCUBATION, FERMENTATION, HARVEST, CIP, SIP, CLEAN UP | 1, 1, 21, .5, 1, 1, 3 HRS |
| S-101, 102 103, 104, 105 | SETUP, PREINCUBATION, FERMENTATION, CIP, SIP, CLEAN UP | • |
| | SETUP, TRANSFER, CIP, SIP, CLEAN UP | • |
| S-106 | SETUP, CENTRIFUGATION, WASH, CIP, SIP, CLEANUP | • |
| S-107 | SETUP, DILUTION, AGITATE, CIP, SIP, CLEAN UP | • |
| S-107 | SETUP, LYSIS, CIP, SIP, CLEAN UP | • |
| S-108 | SETUP, DILUTION, AGITATE, CIP, SIP, CLEAN UP | • |
| S-108 | SETUP, CENTRIFUGATION, WASH, CIP, SIP, CLEAN UP | • |
| S-109 | SETUP, FLUSH, PRIME, CONCENTRATION, DILUTION, WASH, FLUSH, STORE, CIP, SIP, CLEANUP | • |
| • | • | • |

SAMPLE APPLICATION OF PROCESS DESIGN CYCLES IN PROCESS SCHEDULING

MICROBIAL FERMENTATION PROCESS (SEE UNIT OPERATION LIST)

| | | | FIRST PROCESS CYCLE | | SECOND PROCESS CYCLE | |
|---|---|---|---|---|---|---|
| | | DURATION | WEEK | DAY | WEEK | DAY |

NOTE: NONE OF THE UNIT OPERATIONS IN THIS PROCESS HAVE MORE THAT 1 CYCLE PER UNIT OPERATION
(SEE UNIT OPERATION 8 IN THE MAMMALIAN CELL CULTURE PROCESS FOR AN EXAMPLE OF MULTIPLE CYCLES PER UNIT OPERATION)

UNIT OPERATIONS 1-6 UNDERGO THREE REPETATIVE CYCLES PER BATCH AS A SET BEFORE CONTINUING WITH UNIT OP 7
THIS TRANSLATES TO THREE RUNS ON A FERMENTOR WITH EACH HARVEST (UNIT OP 5 & 6) BEING STORED FOR POOLING AT UNIT OP 7
ASSOCIATED WITH EACH FERMENTOR RUN (UNIT OP 4) ARE THE PREVIOUS STEPS FOR INNOCULATION PREP (UNIT OPS 1-3)

| | | DURATION | WEEK | DAY | WEEK | DAY |
|---|---|---|---|---|---|---|
| 1/3 FERMENTATION CYCLES PER BATCH | | | | | | |
| 1 | INOCULUM PREP | 24 HRS | 1 | FRI - SAT | 2 | FRI - SAT |
| 2 | FLASK GROWTH | 24 HRS | 2 | SAT - SUN | 3 | SAT - SUN |
| 3 | SEED FERMENTAION | 24 HRS | 2 | SUN - MON | 3 | SUN - MON |
| 4 | PRODUCTION FERMENTATION | 24 HRS | 2 | MON - TUE | 3 | MON - TUE |
| 5 | HEAT EXCHANGE | 1 HR | 2 | TUE | 3 | TUE |
| 6 | CENTRIFUGATION | 1 HR | 2 | TUE | 3 | TUE |
| 2/3 FERMENTATION CYCLES PER BATCH | | | | | | |
| 1 | INOCULUM PREP | 24 HRS | 2 | SUN - MON | 3 | SUN - MON |
| 2 | FLASK GROWTH | 24 HRS | 2 | MON - TUE | 3 | MON - TUE |
| 3 | SEED FERMENTAION | 24 HRS | 2 | TUE - WED | 3 | TUE - WED |
| 4 | PRODUCTION FERMENTATION | 24 HRS | 2 | WED - THU | 3 | WED - THU |
| 5 | HEAT EXCHANGE | 1 HR | 2 | THU | 3 | THU |
| 6 | CENTRIFUGATION | 1 HR | 2 | THU | 3 | THU |
| 3/3 FERMENTATION CYCLES PER BATCH | | | | | | |
| 1 | INOCULUM PREP | 24 HRS | 2 | TUE - WED | 3 | TUE - WED |
| 2 | FLASK GROWTH | 24 HRS | 2 | WED - THU | 3 | WED - THU |
| 3 | SEED FERMENTAION | 24 HRS | 2 | THU - FRI | 3 | THU - FRI |
| 4 | PRODUCTION FERMENTATION | 24 HRS | 2 | FRI - SAT | 3 | FRI - SAT |
| 5 | HEAT EXCHANGE | 1 HR | 2 | SAT | 3 | SAT |
| 6 | CENTRIFUGATION | 1 HR | 2 | SAT | 3 | SAT |
| UNIT OPERATION 7 POOLS THE HARVESTS FROM THE THREE FERMENTATION CYCLES ABOVE | | | | | | |
| 7 | POOL HARVESTS | 3 HR | 3 | MON | 4 | MON |

UNIT OPERATIONS 8-9 UNDERGO THREE REPETATIVE CYCLES PER BATCH AS SET BEFORE CONTINUING WITH UNIT OPERATION 11
THIS TRANSLATES TO THREE CONSECUTIVE PASSES THROUGH CELL DISRUPTOR (UNIT OP 9) WITH ITS ASSOCIATED HEAT EXCHANGERS
(UNIT OP 8 & 10) AT THE INLET AND THE OUTLET OF THE CELL DISRUPTOR

| | | DURATION | WEEK | DAY | WEEK | DAY |
|---|---|---|---|---|---|---|
| 1/3 DISRUPTION CYCLES PER BATCH | | | | | | |
| 8 | HEAT EXCHANGE | | | | | |
| 9 | CELL DISRUPTION | | | | | |
| 10 | HEAT EXCHANGE | 0.5 HR | 3 | MON | 4 | MON |
| 2/3 DISRUPTION CYCLES PER BATCH | | | | | | |
| 8 | HEAT EXCHANGE | | | | | |
| 9 | CELL DISRUPTION | | | | | |
| 10 | HEAT EXCHANGE | 0.5 HR | 3 | MON | 4 | MON |
| 3/3 DISRUPTION CYCLES PER BATCH | | | | | | |
| 8 | HEAT EXCHANGE | | | | | |
| 9 | CELL DISRUPTION | | | | | |
| 10 | HEAT EXCHANGE | 0.5 HR | 3 | MON | 4 | MON |

FIG. 11

SAMPLE APPLICATION OF PROCESS DESIGN CYCLES IN PROCESS SCHEDULING

MICROBIAL FERMENTATION PROCESS (SEE UNIT OPERATION LIST)

| | | | FIRST PROCESS CYCLE | | SECOND PROCESS CYCLE | |
|---|---|---|---|---|---|---|
| | | DURATION | WEEK | DAY | WEEK | DAY |
| UNIT OPS 11-12 UNDERGO TWO REPETATIVE CYCLES PER BATCH AS A SET BEFORE CONTINUING WITH UNIT OP 13 THIS TRANSLATES TO TWO CYCLES OF RESUSPENDING THE CELL TYSATE FROM THE CELL DISRUPTOR IN A MILD SURFACTANT AND RECONCENTRATING THE INSOLUBLE PRODUCT TO A PASTE BY CENTRIFUGATION | | | | | | |
| 1/2 PRODUCT WASHING CYCLES PER BATCH | | | | | | |
| 11 | RESUSPENSION | 0.5 HR | 3 | MON | 4 | MON |
| 12 | CENTRIFUGATION | 1 HR | 3 | MON | 4 | MON |
| 2/3 PRODUCT WASHING CYCLES PER BATCH | | | | | | |
| 11 | RESUSPENSION | 0.5 HR | 3 | MON | 4 | MON |
| 12 | CENTRIFUGATION | 1 HR | 3 | MON | 4 | MON |
| UNIT OPS 13-22 UNDERGO ONLY ONE CYCLE PER UNIT OPERATION EACH TO THE END OF THE PROCESS | | | | | | |
| 13 | RESUSPENSION | 0.5 HR | 3 | MON | 4 | MON |
| 14 | BUFFER EXCHANGE | 2 HR | 3 | MON | 4 | MON |
| 15 | FILTRATION | 2 HR | 3 | MON | 4 | MON |
| 16 | LIQUID CHROMATOGRAPHY | 16 HRS | 3 | MON - TUE | 4 | MON - TUE |
| 17 | LIQUID CHROMATOGRAPHY | 4 HRS | 3 | TUE | 4 | TUE |
| 18 | BUFFER EXCHANGE | 2 HRS | 3 | TUE | 4 | TUE |
| 19 | LIQUID CHROMATOGRAPHY | 2 HRS | 3 | WED | 4 | WED |
| 20 | BUFFER EXCHANGE | 2 HRS | 3 | WED | 4 | WED |
| 21 | LIQUID CHROMATOGRAPHY | 2 HRS | 3 | WED | 4 | WED |
| 22 | FILTRATION | 2 HRS | 3 | WED | 4 | WED |

FIG. 12A-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | TIME | FINISH DATE | TIME | CALCULATIONS |
|---|---|---|---|---|---|---|---|---|---|---|---|---|---|---|
| | | | | | | 15.5 | | | | 06/03/96 | 08:00 AM | | | |
| 1 | 1 A INOCULUM PREP | | | | | | | | | | | | | |
| 2 | | | | | | | | | | | | | | |
| 3 | SET UP | 3.0 | 0.0 | 3.0 HRS | 12.5 | | | 0.40 | 0.52 | 06/03/96 | 09:30 AM | 06/03/96 | 12:30 PM | |
| 4 | PREINCUBATION | 3.0 | 0.0 | 3.0 HRS | 15.5 | | | 0.52 | 0.65 | 06/03/96 | 12:30 PM | 06/03/96 | 03:30 PM | |
| 5 | INCUBATION | 23.0 | 0.0 | 23.0 HRS | | 38.5 | | 0.65 | 1.60 | 06/03/96 | 03:30 PM | 06/04/96 | 02:30 PM | |
| 6 | CLEAN UP | 0.3 | 0.0 | 0.3 HRS | | | 38.8 | 1.60 | 1.61 | 06/04/96 | 02:30 PM | 06/04/96 | 02:45 PM | |
| 6 | SUBTOTAL | 29.0 | | 29.0 HRS | | 38.5 | | | | | | | | |
| 7 | | | | | | | | | | | | | | |
| 8 | 2 A FLASK GROWTH | | | | | | | | | | | | | |
| 9 | | | | | | | | | | | | | | |
| 10 | SET UP | 1.0 | 0.0 | 1.0 HRS | 37.5 | | | 1.52 | 1.56 | 06/04/96 | 12:30 PM | 06/04/96 | 01:30 PM | |
| 11 | PREINCUBATION | 1.0 | 0.0 | 1.0 HRS | 38.5 | | | 1.56 | 1.60 | 06/04/96 | 01:30 PM | 06/04/96 | 02:30 PM | |
| 12 | INCUBATION | 23.0 | 0.0 | 23.0 HRS | | 61.5 | | 1.60 | 2.56 | 06/04/96 | 02:30 PM | 06/05/96 | 01:30 PM | |
| 13 | CLEAN UP | 0.3 | 0.0 | 0.3 HRS | | | 61.8 | 2.56 | 2.57 | 06/05/96 | 01:30 PM | 06/05/96 | 01:45 PM | |
| 13 | SUBTOTAL | 25.0 | | 25.0 HRS | | 61.5 | | | | | | | | |
| 14 | | | | | | | | | | | | | | |
| 15 | 3 A SEED FERMENTATION | | | | | | | | | | | | | |
| 16 | | | | | | | | | | | | | | |
| 17 | SET UP | 1.0 | 0.0 | 1.0 HRS | 60.5 | | | 2.48 | 2.52 | 06/05/96 | 11:30 AM | 06/05/96 | 12:30 PM | |
| 18 | PREINCUBATION | 1.0 | 0.0 | 1.0 HRS | 61.5 | | | 2.52 | 2.56 | 06/05/96 | 12:30 PM | 06/05/96 | 01:30 PM | |
| 19 | FERMENTATION | 21.0 | 0.0 | 21.0 HRS | | 82.5 | | 2.56 | 3.44 | 06/05/96 | 01:30 PM | 06/06/96 | 10:30 AM | |
| 20 | HARVEST | 0.5 | 0.0 | 0.5 HRS | | 83.0 | | 3.44 | 3.46 | 06/06/96 | 10:30 AM | 06/06/96 | 11:00 AM | 50.0 L 1.7 LPM = 0.50 HRS |
| 21 | CIP | 1.0 | 0.0 | 1.0 HRS | | | 83.5 | 3.44 | 3.48 | 06/06/96 | 10:30 AM | 06/06/96 | 11:30 AM | |
| 22 | SIP | 1.0 | 0.0 | 1.0 HRS | | | 84.5 | 3.48 | 3.52 | 06/06/96 | 11:30 AM | 06/06/96 | 12:30 PM | |
| 23 | CLEAN UP | 3.0 | 0.0 | 3.0 HRS | | | 87.5 | 3.52 | 3.65 | 06/06/96 | 12:30 PM | 06/06/96 | 03:30 PM | |
| 24 | SUBTOTAL | 28.5 | | 28.5 HRS | | 83.0 | | | | | | | | |
| 25 | | | | | | | | | | | | | | |

FIG. 12A-2

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 26 | 4 A PRODUCTION FERMENTATION | | | | | | | | | | | | | |
| 27 | | | | | | | | | | | | | | |
| 28 | SET UP | 1.0 | 0.0 | 1.0 HRS | 82.5 | | | 3.38 | 3.42 | 06/06/96 | 09:00 AM | 06/06/96 | 10:00 AM | |
| 29 | PREINCUBATION | 1.0 | 0.0 | 1.0 HRS | 83.0 | | | 3.42 | 3.46 | 06/06/96 | 10:00 AM | 06/06/96 | 11:00 AM | |
| 30 | FERMENTATION | 21.0 | 0.0 | 21.0 HRS | | 104.0 | | 3.46 | 4.33 | 06/06/96 | 11:00 AM | 06/07/96 | 08:00 AM | |
| 31 | CIP | 1.0 | 0.0 | 1.0 HRS | | | 105.0 | 4.33 | 4.38 | 06/07/96 | 08:00 AM | 06/07/96 | 09:00 AM | |
| 32 | SIP | 1.0 | 0.0 | 1.0 HRS | | | 106.0 | 4.38 | 4.42 | 06/07/96 | 09:00 AM | 06/07/96 | 10:00 AM | |
| 33 | CLEAN UP | 2.0 | 0.0 | 2.0 HRS | | | 108.0 | 4.42 | 4.50 | 06/07/96 | 10:00 AM | 06/07/96 | 12:00 PM | |
| 34 | SUBTOTAL | 27.0 | | 27.0 HRS | | 104.0 | | | | | | | | |
| 35 | | | | | | | | | | | | | | |
| 36 | 5 A HEAT EXCHANGE | | | | | | | | | | | | | |
| 37 | | | | | | | | | | | | | | |
| 38 | SET UP | 0.50 | 0.0 | 0.5 HRS | 104.5 | | | 4.33 | 4.35 | 06/07/96 | 08:00 AM | 06/07/96 | 08:30 AM | |
| 39 | TRANSFER | 1.00 | 0.0 | 1.0 HRS | | 105.0 | | 4.33 | 4.38 | 06/07/96 | 08:00 AM | 06/07/96 | 09:00 AM | 562.1 L 9.4 LPM = 1.00 HRS |
| 40 | CIP | 1.0 | 0.0 | 1.0 HRS | | | 106.0 | 4.38 | 4.42 | 06/07/96 | 09:00 AM | 06/07/96 | 10:00 AM | |
| 41 | SIP | 1.0 | 0.0 | 1.0 HRS | | | 107.0 | 4.42 | 4.46 | 06/07/96 | 10:00 AM | 06/07/96 | 11:00 AM | |
| 42 | CLEAN UP | 2.0 | 0.0 | 2.0 HRS | | | 109.0 | 4.46 | 4.54 | 06/07/96 | 11:00 AM | 06/07/96 | 01:00 PM | |
| 43 | SUBTOTAL | 5.0 | | 5.0 HRS | | 105.0 | | | | | | | | |
| 44 | | | | | | | | | | | | | | |
| 45 | 6 A CONT. CENT./SOLIDS | | | | | | | | | | | | | |
| 46 | | | | | | | | | | | | | | |
| 47 | SET UP | 1.00 | 0.0 | 1.0 HRS | 105.0 | | | 4.33 | 4.38 | 06/07/96 | 08:00 AM | 06/07/96 | 09:00 AM | |
| 48 | CENTRIFUGATION | 1.00 | 0.0 | 1.0 HRS | | 106.0 | | 4.38 | 4.42 | 06/07/96 | 09:00 AM | 06/07/96 | 10:00 AM | 562.1 L 9.4 LPM = 1.00 HRS |
| 49 | WASH | 0.10 | 0.0 | 0.1 HRS | | 106.1 | | 4.42 | 4.42 | 06/07/96 | 10:00 AM | 06/07/96 | 10:06 AM | 1.0 L 0.2 LPM = 0.10 HRS |
| 50 | CIP | 0.25 | 0.0 | 0.3 HRS | | | 106.4 | 4.42 | 4.43 | 06/07/96 | 10:06 AM | 06/07/96 | 10:21 AM | 20.0 L 1.3 LPM = 0.25 HRS |
| 51 | SIP | 1.00 | 0.0 | 1.0 HRS | | | 107.4 | 4.43 | 4.47 | 06/07/96 | 10:21 AM | 06/07/96 | 11:21 AM | |
| 52 | CLEAN UP | 0.50 | 0.0 | 0.5 HRS | | | 107.9 | 4.47 | 4.49 | 06/07/96 | 11:21 AM | 06/07/96 | 11:51 AM | |
| 53 | SUBTOTAL | 3.85 | | 3.85 HRS | | 106.1 | | | | | | | | |
| 54 | | | | | | | | | | | | | | |
| 55 | 1 B INOCULUM PREP | | | | | | | | | | | | | |
| 56 | | | | | | | | | | | | | | |
| 57 | SET UP | 1.0 | 0.0 | 1.0 HRS | 14.5 | | | 0.56 | 0.60 | 06/03/96 | 01:30 PM | 06/03/96 | 02:30 PM | |
| 58 | PREINCUBATION | 1.0 | 0.0 | 1.0 HRS | 15.5 | | | 0.60 | 0.65 | 06/03/96 | 02:30 PM | 06/03/96 | 03:30 PM | |

FIG. 12B-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | TIME | FINISH DATE | TIME | CALCULATIONS |
|---|---|---|---|---|---|---|---|---|---|---|---|---|---|---|
| | | | | | | 15.5 | | | | 06/03/96 | 08:00 AM | | | |
| 59 | INCUBATION | 23.0 | 0.0 | 23.0 HRS | | 38.5 | | 0.65 | 1.60 | 06/03/96 | 03:30 PM | 06/04/96 | 02:30 PM | |
| 60 | CLEAN UP | 0.3 | 0.0 | 0.3 HRS | | | 38.8 | 1.60 | 1.61 | 06/04/96 | 02:30 PM | 06/04/96 | 02:45 PM | |
| 60 | SUBTOTAL | 25.0 | | 25.0 HRS | | 38.5 | | | | | | | | |
| 61 | | | | | | | | | | | | | | |
| 62 | 2 B FLASK GROWTH | | | | | | | | | | | | | |
| 63 | | | | | | | | | | | | | | |
| 64 | SET UP | 1.0 | 0.0 | 1.0 HRS | 37.5 | | | 1.52 | 1.56 | 06/04/96 | 12:30 PM | 06/04/96 | 01:30 PM | |
| 65 | PREINCUBATION | 1.0 | 0.0 | 1.0 HRS | 38.5 | | | 1.56 | 1.60 | 06/04/96 | 01:30 PM | 06/04/96 | 02:30 PM | |
| 66 | INCUBATION | 23.0 | 0.0 | 23.0 HRS | | 61.5 | | 1.60 | 2.56 | 06/04/96 | 02:30 PM | 06/05/96 | 01:30 PM | |
| 67 | CLEAN UP | 0.3 | 0.0 | 0.3 HRS | | | 61.8 | 2.56 | 2.57 | 06/05/96 | 01:30 PM | 06/05/96 | 01:45 PM | |
| 67 | SUBTOTAL | 25.0 | | 25.0 HRS | | 61.5 | | | | | | | | |
| 68 | | | | | | | | | | | | | | |
| 69 | 3 B SEED FERMENTATION | | | | | | | | | | | | | |
| 70 | | | | | | | | | | | | | | |
| 71 | SET UP | 1.0 | 0.0 | 1.0 HRS | 60.5 | | | 2.48 | 2.52 | 06/05/96 | 11:30 AM | 06/05/96 | 12:30 PM | |
| 72 | PREINCUBATION | 1.0 | 0.0 | 1.0 HRS | 61.5 | | | 2.52 | 2.56 | 06/05/96 | 12:30 PM | 06/05/96 | 01:30 PM | |
| 73 | FERMENTATION | 21.0 | 0.0 | 21.0 HRS | | 82.5 | | 2.56 | 3.44 | 06/05/96 | 01:30 PM | 06/06/96 | 10:30 AM | |
| 74 | HARVEST | 0.5 | 0.0 | 0.5 HRS | | 83.0 | | 3.44 | 3.46 | 06/06/96 | 10:30 AM | 06/06/96 | 11:00 AM | 50.0 L 1.7 LPM = 0.50 HRS |
| 75 | CIP | 1.0 | 0.0 | 1.0 HRS | | | 83.5 | 3.44 | 3.48 | 06/06/96 | 10:30 AM | 06/06/96 | 11:30 AM | |
| 76 | SIP | 1.0 | 0.0 | 1.0 HRS | | | 84.5 | 3.48 | 3.52 | 06/06/96 | 11:30 AM | 06/06/96 | 12:30 PM | |
| 77 | CLEAN UP | 3.0 | 0.0 | 3.0 HRS | | | 87.5 | 3.52 | 3.65 | 06/06/96 | 12:30 PM | 06/06/96 | 03:30 PM | |
| 78 | SUBTOTAL | 28.5 | | 28.5 HRS | | 83.0 | | | | | | | | |
| 79 | | | | | | | | | | | | | | |
| 80 | 4 B PRODUCTION FERMENTATION | | | | | | | | | | | | | |
| 81 | | | | | | | | | | | | | | |
| 82 | SET UP | 1.0 | 0.0 | 1.0 HRS | 82.0 | | | 3.38 | 3.42 | 06/06/96 | 09:00 AM | 06/06/96 | 10:00 AM | |
| 83 | PREINCUBATION | 1.0 | 0.0 | 1.0 HRS | 83.0 | | | 3.42 | 3.46 | 06/06/96 | 10:00 AM | 06/06/96 | 11:00 AM | |
| 84 | FERMENTATION | 21.0 | 0.0 | 21.0 HRS | | 104.0 | | 3.46 | 4.33 | 06/06/96 | 11:00 AM | 06/07/96 | 08:00 AM | |

FIG. 12B-2

| | | | | | | | | | | | | | | |
|---|---|---|---|---|---|---|---|---|---|---|---|---|---|---|
| 85 | CIP | 1.0 | 0.0 | 1.0 HRS | | | 105.0 | 4.33 | 4.38 | 06/07/96 | 08:00 AM | 06/07/96 | 09:00 AM | |
| 86 | SIP | 1.0 | 0.0 | 1.0 HRS | | | 106.0 | 4.38 | 4.42 | 06/07/96 | 09:00 AM | 06/07/96 | 10:00 AM | |
| 87 | CLEAN UP | 2.0 | 0.0 | 2.0 HRS | | | 108.0 | 4.42 | 4.50 | 06/07/96 | 10:00 AM | 06/07/96 | 12:00 PM | |
| 88 | SUBTOTAL | 27.0 | | 27.0 HRS | | 104.0 | | | | | | | | |
| 89 | | | | | | | | | | | | | | |
| 90 | 5 B HEAT EXCHANGE | | | | | | | | | | | | | |
| 91 | | | | | | | | | | | | | | |
| 92 | SET UP | 0.50 | 0.0 | 0.5 HRS | 104.5 | | | 4.33 | 4.35 | 06/07/96 | 08:00 AM | 06/07/96 | 08:30 AM | |
| 93 | TRANSFER | 1.00 | 0.0 | 1.0 HRS | | 105.0 | | 4.33 | 4.38 | 06/07/96 | 08:00 AM | 06/07/96 | 09:00 AM | 562.1 LB 9.4 LPM = 1.00 HRS |
| 94 | CIP | 1.0 | 0.0 | 1.0 HRS | | | 106.0 | 4.38 | 4.42 | 06/07/96 | 09:00 AM | 06/07/96 | 10:00 AM | |
| 95 | SIP | 1.0 | 0.0 | 1.0 HRS | | | 107.0 | 4.42 | 4.46 | 06/07/96 | 10:00 AM | 06/07/96 | 11:00 AM | |
| 96 | CLEAN UP | 2.0 | 0.0 | 2.0 HRS | | | 109.0 | 4.46 | 4.54 | 06/07/96 | 11:00 AM | 06/07/96 | 01:00 PM | |
| 97 | SUBTOTAL | 5.0 | | 5.0 HRS | | 105.0 | | | | | | | | |
| 98 | | | | | | | | | | | | | | |
| 99 | 6 B CONT. CENT./SOLIDS | | | | | | | | | | | | | |
| 100 | | | | | | | | | | | | | | |
| 101 | SET UP | 1.00 | 0.0 | 1.0 HRS | 105.0 | | | 4.33 | 4.38 | 06/07/96 | 08:00 AM | 06/07/96 | 09:00 AM | |
| 102 | CENTRIFUGATION | 1.00 | 0.0 | 1.0 HRS | | 106.0 | | 4.38 | 4.42 | 06/07/96 | 09:00 AM | 06/07/96 | 10:00 AM | 562.1 LB 9.4 LPM = 1.00 HRS |
| 103 | WASH | 0.10 | 0.0 | 0.1 HRS | | 106.1 | | 4.42 | 4.42 | 06/07/96 | 10:00 AM | 06/07/96 | 10:06 AM | 1.0 LB 0.2 LPM = 0.10 HRS |
| 104 | CIP | 0.25 | 0.0 | 0.3 HRS | | | 106.4 | 4.42 | 4.43 | 06/07/96 | 10:06 AM | 06/07/96 | 10:21 AM | 20.0 LB 1.3 LPM = 0.25 HRS |
| 105 | SIP | 1.00 | 0.0 | 1.0 HRS | | | 107.4 | 4.43 | 4.47 | 06/07/96 | 10:21 AM | 06/07/96 | 11:21 AM | |
| 106 | CLEAN UP | 0.50 | 0.0 | 0.5 HRS | | | 107.9 | 4.47 | 4.49 | 06/07/96 | 11:21 AM | 06/07/96 | 11:51 AM | |
| 107 | SUBTOTAL | 3.85 | | 3.85 HRS | | 106.1 | | | | | | | | |
| 108 | | | | | | | | | | | | | | |
| 109 | 1 C INOCULUM PREP | | | | | | | | | | | | | |
| 110 | | | | | | | | | | | | | | |
| 111 | SET UP | 1.0 | 0.0 | 1.0 HRS | 14.5 | | | 0.56 | 0.50 | 06/03/96 | 01:30 PM | 06/03/96 | 02:30 PM | |
| 112 | PREINCUBATION | 1.0 | 0.0 | 1.0 HRS | 15.5 | | | 0.60 | 0.65 | 06/03/96 | 02:30 PM | 06/03/96 | 03:30 PM | |
| 113 | INCUBATION | 23.0 | 0.0 | 23.0 HRS | | 38.5 | | 0.65 | 1.60 | 06/03/96 | 03:30 PM | 06/04/96 | 02:30 PM | |
| 114 | CLEAN UP | 0.3 | 0.0 | 0.3 HRS | | | 38.8 | 1.60 | 1.61 | 06/04/96 | 02:30 PM | 06/04/96 | 02:45 PM | |
| 114 | SUBTOTAL | 25.0 | | 25.0 HRS | | 38.5 | | | | | | | | |
| 115 | | | | | | | | | | | | | | |

FIG. 12C-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | START TIME | FINISH DATE | FINISH TIME | CALCULATIONS |
|---|---|---|---|---|---|---|---|---|---|---|---|---|---|---|
| | | | | | | 15.5 | | | | 06/03/96 | 08:00 AM | | | |
| 116 | 2 C FLASK GROWTH | | | | | | | | | | | | | |
| 117 | | | | | | | | | | | | | | |
| 118 | SET UP | 1.0 | 0.0 | 1.0 HRS | 37.5 | | | 1.52 | 1.56 | 06/04/96 | 12:30 PM | 06/04/96 | 01:30 PM | |
| 119 | PREINCUBATION | 1.0 | 0.0 | 1.0 HRS | 38.5 | | | 1.56 | 1.60 | 06/04/96 | 01:30 PM | 06/04/96 | 02:30 PM | |
| 120 | INCUBATION | 23.0 | 0.0 | 23.0 HRS | | 61.5 | | 1.60 | 2.56 | 06/04/96 | 02:30 PM | 06/05/96 | 01:30 PM | |
| 121 | CLEAN UP | 0.3 | 0.0 | 0.3 HRS | | | 61.8 | 2.56 | 2.57 | 06/05/96 | 01:30 PM | 06/05/96 | 01:45 PM | |
| 121 | SUBTOTAL | 25.0 | | 25.0 HRS | | 61.5 | | | | | | | | |
| 122 | | | | | | | | | | | | | | |
| 123 | 3 C SEED FERMENTATION | | | | | | | | | | | | | |
| 124 | | | | | | | | | | | | | | |
| 125 | SET UP | 1.0 | 0.0 | 1.0 HRS | 60.5 | | | 2.48 | 2.52 | 06/05/96 | 11:30 AM | 06/05/96 | 12:30 PM | |
| 126 | PREINCUBATION | 1.0 | 0.0 | 1.0 HRS | 61.5 | | | 2.52 | 2.56 | 06/05/96 | 12:30 PM | 06/05/96 | 01:30 PM | |
| 127 | FERMENTATION | 21.0 | 0.0 | 21.0 HRS | | 82.5 | | 2.56 | 3.44 | 06/05/96 | 01:30 PM | 06/06/96 | 10:30 AM | |
| 128 | HARVEST | 0.5 | 0.0 | 0.5 HRS | | 83.0 | | 3.44 | 3.46 | 06/06/96 | 10:30 AM | 06/06/96 | 11:00 AM | 50.0 L 1.7 LPM = 0.50 HRS |
| 129 | CIP | 1.0 | 0.0 | 1.0 HRS | | | 83.5 | 3.44 | 3.48 | 06/06/96 | 10:30 AM | 06/06/96 | 11:30 AM | |
| 130 | SIP | 1.0 | 0.0 | 1.0 HRS | | | 84.5 | 3.48 | 3.52 | 06/06/96 | 11:30 AM | 06/06/96 | 12:30 PM | |
| 131 | CLEAN UP | 3.0 | 0.0 | 3.0 HRS | | | 87.5 | 3.52 | 3.65 | 06/06/96 | 12:30 PM | 06/06/96 | 03:30 PM | |
| 132 | SUBTOTAL | 28.5 | | 28.5 HRS | | 83.0 | | | | | | | | |
| 133 | | | | | | | | | | | | | | |
| 134 | 4 C PRODUCTION FERMENTATION | | | | | | | | | | | | | |
| 135 | | | | | | | | | | | | | | |
| 136 | SET UP | 1.0 | 0.0 | 1.0 HRS | 82.0 | | | 3.38 | 3.42 | 06/06/96 | 09:00 AM | 06/06/96 | 10:00 AM | |
| 137 | PREINCUBATION | 1.0 | 0.0 | 1.0 HRS | 83.0 | | | 3.42 | 3.46 | 06/06/96 | 10:00 AM | 06/06/96 | 11:00 AM | |
| 138 | FERMENTATION | 21.0 | 0.0 | 21.0 HRS | | 104.0 | | 3.46 | 4.33 | 06/06/96 | 11:00 AM | 06/07/96 | 08:00 AM | |
| 139 | CIP | 1.0 | 0.0 | 1.0 HRS | | | 105.0 | 4.33 | 4.38 | 06/07/96 | 08:00 AM | 06/07/96 | 09:00 AM | |
| 140 | SIP | 1.0 | 0.0 | 1.0 HRS | | | 106.0 | 4.38 | 4.42 | 06/07/96 | 09:00 AM | 06/07/96 | 10:00 AM | |
| 141 | CLEAN UP | 2.0 | 0.0 | 2.0 HRS | | | 108.0 | 4.42 | 4.50 | 06/07/96 | 10:00 AM | 06/07/96 | 12:00 PM | |
| 142 | SUBTOTAL | 27.0 | | 27.0 HRS | | 104.0 | | | | | | | | |

FIG. 12C-2

| | | | | | | | | | | | | | | |
|---|---|---|---|---|---|---|---|---|---|---|---|---|---|---|
| 143 | | | | | | | | | | | | | | |
| 144 | 5 C HEAT EXCHANGE | | | | | | | | | | | | | |
| 145 | | | | | | | | | | | | | | |
| 146 | SET UP | 0.50 | 0.0 | 0.5 HRS | 104.5 | | | 4.33 | 4.35 | 06/07/96 | 08:00 AM | 06/07/96 | 08:30 AM | |
| 147 | TRANSFER | 1.00 | 0.0 | 1.0 HRS | | 105.0 | | 4.33 | 4.38 | 06/07/96 | 08:00 AM | 06/07/96 | 09:00 AM | 562.1 LB 9.4 LPM = 1.00 HRS |
| 148 | CIP | 1.0 | 0.0 | 1.0 HRS | | | 106.0 | 4.38 | 4.42 | 06/07/96 | 09:00 AM | 06/07/96 | 10:00 AM | |
| 149 | SIP | 1.0 | 0.0 | 1.0 HRS | | | 107.0 | 4.42 | 4.46 | 06/07/96 | 10:00 AM | 06/07/96 | 11:00 AM | |
| 150 | CLEAN UP | 2.0 | 0.0 | 2.0 HRS | | | 109.0 | 4.46 | 4.54 | 06/07/96 | 11:00 AM | 06/07/96 | 01:00 PM | |
| 151 | SUBTOTAL | 5.0 | | 5.0 HRS | | 105.0 | | | | | | | | |
| 152 | | | | | | | | | | | | | | |
| 153 | 6 C CONT. CENT./SOLIDS | | | | | | | | | | | | | |
| 154 | | | | | | | | | | | | | | |
| 155 | SET UP | 1.00 | 0.0 | 1.0 HRS | 105.0 | | | 4.33 | 4.38 | 06/07/96 | 08:00 AM | 06/07/96 | 09:00 AM | |
| 156 | CENTRIFUGATION | 1.00 | 0.0 | 1.0 HRS | | 106.0 | | 4.38 | 4.42 | 06/07/96 | 09:00 AM | 06/07/96 | 10:00 AM | 562.1 LB 9.4 LPM = 1.00 HRS |
| 157 | WASH | 0.10 | 0.0 | 0.1 HRS | | 106.1 | | 4.42 | 4.42 | 06/07/96 | 10:00 AM | 06/07/96 | 10:06 AM | 1.0 LB 0.2 LPM = 0.10 HRS |
| 158 | CIP | 0.25 | 0.0 | 0.3 HRS | | | 106.4 | 4.42 | 4.43 | 06/07/96 | 10:06 AM | 06/07/96 | 10:21 AM | 20.0 LB 1.3 LPM = 0.25 HRS |
| 159 | SIP | 1.00 | 0.0 | 1.0 HRS | | | 107.4 | 4.43 | 4.47 | 06/07/96 | 10:21 AM | 06/07/96 | 11:21 AM | |
| 160 | CLEAN UP | 0.50 | 0.0 | 0.5 HRS | | | 107.9 | 4.47 | 4.49 | 06/07/96 | 11:21 AM | 06/07/96 | 11:51 AM | |
| 161 | SUBTOTAL | 3.85 | | 3.85 HRS | | 106.1 | | | | | | | | |
| 162 | | | | | | | | | | | | | | |
| 163 | 7 A RESOLUBLIZATION | | | | | | | | | | | | | |
| 164 | | | | | | | | | | | | | | |
| 165 | SET UP | 1.00 | 0.0 | 1.0 HRS | 106.1 | | | 4.38 | 4.42 | 06/07/96 | 09:06 AM | 06/07/96 | 10:06 AM | |
| 166 | DILUTION | 0.50 | 0.0 | 0.5 HRS | | 106.6 | | 4.42 | 4.44 | 06/07/96 | 10:06 AM | 06/07/96 | 10:36 AM | 46.7 LB 1.6 LPM = 0.50 HRS |
| 167 | AGITATE | 1.00 | 0.0 | 1.0 HRS | | 107.6 | | 4.44 | 4.48 | 06/07/96 | 10:36 AM | 06/07/96 | 11:36 AM | 0.50 HRS |
| 168 | CIP | 1.00 | 0.0 | 1.0 HRS | | | 108.6 | 4.48 | 4.53 | 06/07/96 | 11:36 AM | 06/07/96 | 12:36 PM | |
| 169 | SIP | 1.00 | 0.0 | 1.0 HRS | | | 109.6 | 4.53 | 4.57 | 06/07/96 | 12:36 PM | 06/07/96 | 01:36 PM | |
| 170 | CLEAN UP | 1.00 | 0.0 | 1.0 HRS | | | 110.6 | 4.57 | 4.61 | 06/07/96 | 01:36 PM | 06/07/96 | 02:36 PM | |
| 171 | SUBTOTAL | 5.50 | | 5.50 HRS | | 107.6 | | | | | | | | |
| 172 | | | | | | | | | | | | | | |
| 173 | 8 A HEAT EXCHANGE | | | | | | | | | | | | | |
| 174 | | | | | | | | | | | | | | |

FIG. 12D-1

| | OPERATION | PROCESS TIME LINE | | | | | | | | | | | | |
|---|---|---|---|---|---|---|---|---|---|---|---|---|---|---|
| | | DURATION (HRS.) | | | REL. TIME SCALE (HRS) | | | ABS. DAYS | | START | | FINISH | | CALCULATIONS |
| | | CALC. | A/D | ADJ. | PREP | EXEC. | COMPL. | START | END | DATE | TIME | DATE | TIME | |
| | | | | | | 15.5 | | | | 06/03/96 | 08:00 AM | | | |
| 175 | SET UP | 0.50 | 0.0 | 0.5 HRS | 107.6 | | | 4.46 | 4.48 | 06/07/96 | 11:06 AM | 06/07/96 | 11:36 AM | |
| 176 | TRANSFER | 0.30 | 0.0 | 0.3 HRS | | 107.9 | | 4.48 | 4.50 | 06/07/96 | 11:36 AM | 06/07/96 | 11:54 AM | 66.5 L 3.7 LPM = 0.30 HRS |
| 177 | CIP | 0.0 | 0.0 | 0.0 HRS | | | 107.9 | 4.50 | 4.50 | 06/07/96 | 11:54 AM | 06/07/96 | 11:54 AM | |
| 178 | SIP | 0.0 | 0.0 | 0.0 HRS | | | 107.9 | 4.50 | 4.50 | 06/07/96 | 11:54 AM | 06/07/96 | 11:54 AM | |
| 179 | CLEAN UP | 0.0 | 0.0 | 0.0 HRS | | | 107.9 | 4.50 | 4.50 | 06/07/96 | 11:54 AM | 06/07/96 | 11:54 AM | |
| 180 | SUBTOTAL | 0.8 | | 0.8 HRS | | 107.9 | | | | | | | | |
| 181 | | | | | | | | | | | | | | |
| 182 | 9 A HOMMOGENIZATION | | | | | | | | | | | | | |
| 183 | | | | | | | | | | | | | | |
| 184 | SET UP | 0.25 | 0.0 | 0.3 HRS | 107.9 | | | 4.49 | 4.50 | 06/07/96 | 11:39 AM | 06/07/96 | 11:54 AM | |
| 185 | LYSIS | 0.68 | 0.0 | 0.7 HRS | | 108.6 | | 4.50 | 4.52 | 06/07/96 | 11:54 AM | 06/07/96 | 12:34 PM | 66.5 L 1.6 LPM = 0.68 HRS |
| 186 | CIP | 0.0 | 0.0 | 0.0 HRS | | | 108.6 | 4.52 | 4.52 | 06/07/96 | 12:34 PM | 06/07/96 | 12:34 PM | |
| 187 | SIP | 0.0 | 0.0 | 0.0 HRS | | | 108.6 | 4.52 | 4.52 | 06/07/96 | 12:34 PM | 06/07/96 | 12:34 PM | |
| 188 | CLEAN UP | 0.0 | 0.0 | 0.0 HRS | | | 108.6 | 4.52 | 4.52 | 06/07/96 | 12:34 PM | 06/07/96 | 12:34 PM | |
| 189 | SUBTOTAL | 0.9 | | 0.9 HRS | | 108.6 | | | | | | | | |
| 190 | | | | | | | | | | | | | | |
| 191 | 10 A HEAT EXCHANGE | | | | | | | | | | | | | |
| 192 | | | | | | | | | | | | | | |
| 193 | SET UP | 0.50 | 0.0 | 0.5 HRS | 108.6 | | | 4.50 | 4.52 | 06/07/96 | 12:04 PM | 06/07/96 | 12:34 PM | |
| 194 | TRANSFER | 0.30 | 0.0 | 0.3 HRS | | 108.9 | | 4.52 | 4.54 | 06/07/96 | 12:34 PM | 06/07/96 | 12:52 PM | 69.0 L 3.8 LPM = 0.30 HRS |
| 195 | CIP | 0.0 | 0.0 | 0.0 HRS | | | 108.9 | 4.54 | 4.54 | 06/07/96 | 12:52 PM | 06/07/96 | 12:52 PM | |
| 196 | SIP | 0.0 | 0.0 | 0.0 HRS | | | 108.9 | 4.54 | 4.54 | 06/07/96 | 12:52 PM | 06/07/96 | 12:52 PM | |
| 197 | CLEAN UP | 0.0 | 0.0 | 0.0 HRS | | | 108.9 | 4.54 | 4.54 | 06/07/96 | 12:52 PM | 06/07/96 | 12:52 PM | |
| 198 | SUBTOTAL | 0.8 | | 0.8 HRS | | 108.9 | | | | | | | | |
| 199 | | | | | | | | | | | | | | |
| 200 | 8 B HEAT EXCHANGE | | | | | | | | | | | | | |
| 201 | | | | | | | | | | | | | | |
| 202 | SET UP | 0.00 | 0.0 | 0.0 HRS | 108.9 | | | 4.54 | 4.54 | 06/07/96 | 12:52 PM | 06/07/96 | 12:52 PM | |

FIG. 12D-2

| | | | | | | | | | | | | | | |
|---|---|---|---|---|---|---|---|---|---|---|---|---|---|---|
| 203 | TRANSFER | 0.30 | 0.0 | 0.3 HRS | | 109.2 | | 4.54 | 4.55 | 06/07/96 | 12:52 PM | 06/07/96 | 01:10 PM | 66.5 LB 3.7 LPM = 0.30 HRS |
| 204 | CIP | 0.0 | 0.0 | 0.0 HRS | | | 109.2 | 4.55 | 4.55 | 06/07/96 | 01:10 PM | 06/07/96 | 01:10 PM | |
| 205 | SIP | 0.0 | 0.0 | 0.0 HRS | | | 109.2 | 4.55 | 4.55 | 06/07/96 | 01:10 PM | 06/07/96 | 01:10 PM | |
| 206 | CLEAN UP | 0.0 | 0.0 | 0.0 HRS | | | 109.2 | 4.55 | 4.55 | 06/07/96 | 01:10 PM | 06/07/96 | 01:10 PM | |
| 207 | SUBTOTAL | 0.3 | | 0.3 HRS | | 109.2 | | | | | | | | |
| 208 | | | | | | | | | | | | | | |
| 209 | 9 B HOMMOGENIZATION | | | | | | | | | | | | | |
| 210 | | | | | | | | | | | | | | |
| 211 | SET UP | 0.00 | 0.0 | 0.0 HRS | 109.2 | | | 4.55 | 4.55 | 06/07/96 | 01:10 PM | 06/07/96 | 01:10 PM | |
| 212 | LYSIS | 0.68 | 0.0 | 0.7 HRS | | 109.9 | | 4.55 | 4.58 | 06/07/96 | 01:10 PM | 06/07/96 | 01:51 PM | 66.5 LB 1.6 LPM = 0.68 HRS |
| 213 | CIP | 0.0 | 0.0 | 0.0 HRS | | | 109.9 | 4.58 | 4.58 | 06/07/96 | 01:51 PM | 06/07/96 | 01:51 PM | |
| 214 | SIP | 0.0 | 0.0 | 0.0 HRS | | | 109.9 | 4.58 | 4.58 | 06/07/96 | 01:51 PM | 06/07/96 | 01:51 PM | |
| 215 | CLEAN UP | 0.0 | 0.0 | 0.0 HRS | | | 109.9 | 4.58 | 4.58 | 06/07/96 | 01:51 PM | 06/07/96 | 01:51 PM | |
| 216 | SUBTOTAL | 0.7 | | 0.7 HRS | | 109.9 | | | | | | | | |
| 217 | | | | | | | | | | | | | | |
| 218 | 10 B HEAT EXCHANGE | | | | | | | | | | | | | |
| 219 | | | | | | | | | | | | | | |
| 220 | SET UP | 0.50 | 0.0 | 0.5 HRS | 109.9 | | | 4.56 | 4.58 | 06/07/96 | 01:21 PM | 06/07/96 | 01:51 PM | |
| 221 | TRANSFER | 0.30 | 0.0 | 0.3 HRS | | 110.2 | | 4.58 | 4.59 | 06/07/96 | 01:51 PM | 06/07/96 | 02:09 PM | 69.0 LB 3.8 LPM = 0.30 HRS |
| 222 | CIP | 0.0 | 0.0 | 0.0 HRS | | | 110.2 | 4.59 | 4.59 | 06/07/96 | 02:09 PM | 06/07/96 | 02:09 PM | |
| 223 | SIP | 0.0 | 0.0 | 0.0 HRS | | | 110.2 | 4.59 | 4.59 | 06/07/96 | 02:09 PM | 06/07/96 | 02:09 PM | |
| 224 | CLEAN UP | 0.0 | 0.0 | 0.0 HRS | | | 110.2 | 4.59 | 4.59 | 06/07/96 | 02:09 PM | 06/07/96 | 02:09 PM | |
| 225 | SUBTOTAL | 0.8 | | 0.8 HRS | | 110.2 | | | | | | | | |
| 226 | | | | | | | | | | | | | | |
| 227 | 8 C HEAT EXCHANGE | | | | | | | | | | | | | |
| 228 | | | | | | | | | | | | | | |
| 229 | SET UP | 0.00 | 0.0 | 0.0 HRS | 110.2 | | | 4.59 | 4.59 | 06/07/96 | 02:09 PM | 06/07/96 | 02:09 PM | |
| 230 | TRANSFER | 0.30 | 0.0 | 0.3 HRS | | 110.5 | | 4.59 | 4.60 | 06/07/96 | 02:09 PM | 06/07/96 | 02:27 PM | 66.5 LB 3.7 LPM = 0.30 HRS |
| 231 | CIP | 1.0 | 0.0 | 1.0 HRS | | | 111.5 | 4.60 | 4.64 | 06/07/96 | 02:27 PM | 06/07/96 | 03:27 PM | |
| 232 | SIP | 1.0 | 0.0 | 1.0 HRS | | | 112.5 | 4.64 | 4.69 | 06/07/96 | 03:27 PM | 06/07/96 | 04:27 PM | |
| 233 | CLEAN UP | 1.0 | 0.0 | 1.0 HRS | | | 113.5 | 4.69 | 4.73 | 06/07/96 | 04:27 PM | 06/07/96 | 05:27 PM | |
| 234 | SUBTOTAL | 3.3 | | 3.3 HRS | | 110.5 | | | | | | | | |

FIG. 12E-1

| | OPERATION | PROCESS TIME LINE | | | | | | | | | | | | CALCULATIONS |
|---|---|---|---|---|---|---|---|---|---|---|---|---|---|---|
| | | DURATION (HRS.) | | | REL. TIME SCALE (HRS) | | | ABS. DAYS | | START | | FINISH | | |
| | | CALC. | A/D | ADJ. | PREP | EXEC. | COMPL. | START | END | DATE | TIME | DATE | TIME | |
| | | | | | | 15.5 | | | | 06/03/96 | 08:00 AM | | | |
| 235 | | | | | | | | | | | | | | |
| 236 | 9 C HOMMOGENIZATION | | | | | | | | | | | | | |
| 237 | | | | | | | | | | | | | | |
| 238 | SET UP | 0.00 | 0.0 | 0.0 HRS | 110.5 | | | 4.60 | 4.60 | 06/07/96 | 02:27 PM | 06/07/96 | 02:27 PM | |
| 239 | LYSIS | 0.68 | 0.0 | 0.7 HRS | | 111.1 | | 4.60 | 4.63 | 06/07/96 | 02:27 PM | 06/07/96 | 03:07 PM | 66.5 LB 1.6 LPM = 0.68 HRS |
| 240 | CIP | 1.0 | 0.0 | 1.0 HRS | | | 112.1 | 4.63 | 4.67 | 06/07/96 | 03:07 PM | 06/07/96 | 04:07 PM | |
| 241 | SIP | 1.0 | 0.0 | 1.0 HRS | | | 113.1 | 4.67 | 4.71 | 06/07/96 | 04:07 PM | 06/07/96 | 05:07 PM | |
| 242 | CLEAN UP | 1.0 | 0.0 | 1.0 HRS | | | 114.1 | 4.71 | 4.76 | 06/07/96 | 05:07 PM | 06/07/96 | 06:07 PM | |
| 243 | SUBTOTAL | 3.7 | | 3.7 HRS | | 111.1 | | | | | | | | |
| 244 | | | | | | | | | | | | | | |
| 245 | 10 C HEAT EXCHANGE | | | | | | | | | | | | | |
| 246 | | | | | | | | | | | | | | |
| 247 | SET UP | 0.00 | 0.0 | 0.0 HRS | 111.1 | | | 4.63 | 4.63 | 06/07/96 | 03:07 PM | 06/07/96 | 03:07 PM | |
| 248 | TRANSFER | 0.30 | 0.0 | 0.3 HRS | | 111.4 | | 4.63 | 4.64 | 06/07/96 | 03:07 PM | 06/07/96 | 03:25 PM | 69.0 LB 3.8 LPM = 0.30 HRS |
| 249 | CIP | 1.0 | 0.0 | 1.0 HRS | | | 112.4 | 4.64 | 4.68 | 06/07/96 | 03:25 PM | 06/07/96 | 04:25 PM | |
| 250 | SIP | 1.0 | 0.0 | 1.0 HRS | | | 113.4 | 4.68 | 4.73 | 06/07/96 | 04:25 PM | 06/07/96 | 05:25 PM | |
| 251 | CLEAN UP | 1.0 | 0.0 | 1.0 HRS | | | 114.4 | 4.73 | 4.77 | 06/07/96 | 05:25 PM | 06/07/96 | 06:25 PM | |
| 252 | SUBTOTAL | 3.3 | | 3.3 HRS | | 111.4 | | | | | | | | |
| 253 | | | | | | | | | | | | | | |
| 254 | 11 A RESOLUBLIZATION | | | | | | | | | | | | | |
| 255 | | | | | | | | | | | | | | |
| 256 | SET UP | 1.0 | 0.0 | 1.0 HRS | 108.9 | | | 4.49 | 4.54 | 06/07/96 | 11:52 AM | 06/07/96 | 12:52 PM | |
| 257 | DILUTION | 0.5 | 0.0 | 0.5 HRS | | 109.4 | | 4.54 | 4.56 | 06/07/96 | 12:52 PM | 06/07/96 | 01:22 PM | 206.9 LB 6.9 LPM = 0.50 HRS |
| 258 | AGITATE | 0.5 | 0.0 | 0.5 HRS | | 109.9 | | 4.56 | 4.58 | 06/07/96 | 01:22 PM | 06/07/96 | 01:52 PM | 0.50 HRS |
| 259 | CIP | 0.0 | 0.0 | 0.0 HRS | | | 109.9 | 4.58 | 4.58 | 06/07/96 | 01:52 PM | 06/07/96 | 01:52 PM | |
| 260 | SIP | 0.0 | 0.0 | 0.0 HRS | | | 109.9 | 4.58 | 4.58 | 06/07/96 | 01:52 PM | 06/07/96 | 01:52 PM | |
| 261 | CLEAN UP | 0.0 | 0.0 | 0.0 HRS | | | 109.9 | 4.58 | 4.58 | 06/07/96 | 01:52 PM | 06/07/96 | 01:52 PM | |
| 262 | SUBTOTAL | 2.0 | | 2.0 HRS | | 109.9 | | | | | | | | |

FIG. 12E-2

| | | | | | | | | | | | | | | | | | |
|---|---|---|---|---|---|---|---|---|---|---|---|---|---|---|---|---|---|
| 263 | | | | | | | | | | | | | | | | | |
| 264 | 12 A CONT. CENT/SOLIDS | | | | | | | | | | | | | | | | |
| 265 | | | | | | | | | | | | | | | | | |
| 266 | SET UP | 1.0 | 0.0 | 1.0 HRS | 109.9 | | | 4.54 | 4.58 | 06/07/96 | 12:52 PM | 06/07/96 | 01:52 PM | | | | |
| 267 | CENTRIFUGATION | 0.5 | 0.0 | 0.5 HRS | | 110.4 | | 4.58 | 4.60 | 06/07/96 | 01:52 PM | 06/07/96 | 02:22 PM | 275.9 LB | 9.2 LPM | = | 0.50 HRS |
| 268 | WASH | 0.1 | 0.0 | 0.1 HRS | | 110.5 | | 4.60 | 4.60 | 06/07/96 | 02:22 PM | 06/07/96 | 02:28 PM | 3.0 LB | 0.5 LPM | = | 0.10 HRS |
| 269 | CIP | 0.0 | 0.0 | 0.0 HRS | | | 110.5 | 4.60 | 4.60 | 06/07/96 | 02:28 PM | 06/07/96 | 02:28 PM | 8.0 LB | 0.5 LPM | = | 0.25 HRS |
| 270 | SIP | 0.0 | 0.0 | 0.0 HRS | | | 110.5 | 4.60 | 4.60 | 06/07/96 | 02:28 PM | 06/07/96 | 02:28 PM | | | | |
| 271 | CLEAN UP | 0.0 | 0.0 | 0.0 HRS | | | 110.5 | 4.60 | 4.60 | 06/07/96 | 02:28 PM | 06/07/96 | 02:28 PM | | | | |
| 272 | SUBTOTAL | 1.6 | | 1.6 HRS | | 110.5 | | | | | | | | | | | |
| 273 | | | | | | | | | | | | | | | | | |
| 274 | 11 B RESOLUBLIZATION | | | | | | | | | | | | | | | | |
| 275 | | | | | | | | | | | | | | | | | |
| 276 | SET UP | 0.0 | 0.0 | 0.0 HRS | 110.5 | | | 4.60 | 4.60 | 06/07/96 | 02:28 PM | 06/07/96 | 02:28 PM | | | | |
| 277 | DILUTION | 0.5 | 0.0 | 0.5 HRS | | 111.0 | | 4.60 | 4.62 | 06/07/96 | 02:28 PM | 06/07/96 | 02:58 PM | 206.9 LB | 6.9 LPM | = | 0.50 HRS |
| 278 | AGITATE | 0.3 | 0.0 | 0.3 HRS | | 111.2 | | 4.62 | 4.63 | 06/07/96 | 02:58 PM | 06/07/96 | 03:13 PM | | | | 0.50 HRS |
| 279 | CIP | 1.0 | 0.0 | 1.0 HRS | | | 112.2 | 4.63 | 4.68 | 06/07/96 | 03:13 PM | 06/07/96 | 04:13 PM | | | | |
| 280 | SIP | 1.0 | 0.0 | 1.0 HRS | | | 113.2 | 4.68 | 4.72 | 06/07/96 | 04:13 PM | 06/07/96 | 05:13 PM | | | | |
| 281 | CLEAN UP | 1.0 | 0.0 | 1.0 HRS | | | 114.2 | 4.72 | 4.76 | 06/07/96 | 05:13 PM | 06/07/96 | 06:13 PM | | | | |
| 282 | SUBTOTAL | 3.8 | | 3.8 HRS | | 111.2 | | | | | | | | | | | |
| 283 | | | | | | | | | | | | | | | | | |
| 284 | 12 B CONT. CENT/SOLIDS | | | | | | | | | | | | | | | | |
| 285 | | | | | | | | | | | | | | | | | |
| 286 | SET UP | 1.0 | 0.0 | 1.0 HRS | 111.2 | | | 4.59 | 4.63 | 06/07/96 | 02:13 PM | 06/07/96 | 03:13 PM | | | | |
| 287 | CENTRIFUGATION | 0.5 | 0.0 | 0.5 HRS | | 111.7 | | 4.63 | 4.66 | 06/07/96 | 03:13 PM | 06/07/96 | 03:43 PM | 275.9 LB | 9.2 LPM | = | 0.50 HRS |
| 288 | WASH | 0.1 | 0.0 | 0.1 HRS | | 111.8 | | 4.66 | 4.66 | 06/07/96 | 03:43 PM | 06/07/96 | 03:49 PM | 3.0 LB | 0.5 LPM | = | 0.10 HRS |
| 289 | CIP | 0.3 | 0.0 | 0.3 HRS | | | 112.1 | 4.66 | 4.67 | 06/07/96 | 03:49 PM | 06/07/96 | 04:04 PM | 8.0 LB | 0.5 LPM | = | 0.25 HRS |
| 290 | SIP | 1.0 | 0.0 | 1.0 HRS | | | 113.1 | 4.67 | 4.71 | 06/07/96 | 04:04 PM | 06/07/96 | 05:04 PM | | | | |
| 291 | CLEAN UP | 0.5 | 0.0 | 0.5 HRS | | | 113.6 | 4.71 | 4.73 | 06/07/96 | 05:04 PM | 06/07/96 | 05:34 PM | | | | |
| 292 | SUBTOTAL | 3.4 | | 3.4 HRS | | 111.8 | | | | | | | | | | | |
| 293 | | | | | | | | | | | | | | | | | |
| 294 | 13 A RESOLUBLIZATION | | | | | | | | | | | | | | | | |

FIG. 12F-1

| | OPERATION | PROCESS TIME LINE | | | | | | | | | | | | CALCULATIONS |
|---|---|---|---|---|---|---|---|---|---|---|---|---|---|---|
| | | DURATION (HRS.) | | | REL. TIME SCALE (HRS) | | | ABS. DAYS | | START | | FINISH | | |
| | | CALC. | A/D | ADJ. | PREP | EXEC. | COMPL. | START | END | DATE | TIME | DATE | TIME | |
| | | | | | | 15.5 | | | | 06/03/96 | 08:00 AM | | | |
| 295 | | | | | | | | | | | | | | |
| 296 | SET UP | 1.0 | 0.0 | 1.0 HRS | 110.5 | | | 4.56 | 4.60 | 06/07/96 | 01:28 PM | 06/07/96 | 02:28 PM | |
| 297 | DILUTION | 0.5 | 0.0 | 0.5 HRS | | 111.0 | | 4.60 | 4.62 | 06/07/96 | 02:28 PM | 06/07/96 | 02:58 PM | 60.7 L 2.0 LPM = 0.50 HRS |
| 298 | AGITATE | 18.0 | 0.0 | 18.0 HRS | | 129.0 | | 4.62 | 5.37 | 06/07/96 | 02:58 PM | 06/08/96 | 08:58 AM | 23.50 HRS |
| 299 | CIP | 1.0 | 0.0 | 1.0 HRS | | | 130.0 | 5.37 | 5.42 | 06/08/96 | 08:58 AM | 06/08/96 | 09:58 AM | |
| 300 | SIP | 1.0 | 0.0 | 1.0 HRS | | | 131.0 | 5.42 | 5.46 | 06/08/96 | 09:58 AM | 06/08/96 | 10:58 AM | |
| 301 | CLEAN UP | 1.0 | 0.0 | 1.0 HRS | | | 132.0 | 5.46 | 5.50 | 06/08/96 | 10:58 AM | 06/08/96 | 11:58 AM | |
| 302 | SUBTOTAL | 22.5 | | 22.5 HRS | | 129.0 | | | | | | | | |
| 303 | | | | | | | | | | | | | | |
| 304 | 14 A CONCENTRATION | | | | | | | | | | | | | 26.99 SF |
| 305 | | | | | | | | | | | | | | |
| 306 | SET UP | 1.0 | 0.0 | 1.0 HRS | 127.6 | | | 5.28 | 5.32 | 06/08/96 | 06:38 AM | 06/08/96 | 07:38 AM | |
| 307 | FLUSH | 0.7 | 0.0 | 0.7 HRS | 128.3 | | | 5.32 | 5.35 | 06/08/96 | 07:38 AM | 06/08/96 | 08:18 AM | 54.0 L 3.0 L/SF/Hr or 1.35 LPM |
| 308 | PRIME | 0.7 | 0.0 | 0.7 HRS | 129.0 | | | 5.35 | 5.37 | 06/08/96 | 08:18 AM | 06/08/96 | 08:58 AM | 54.0 L 3.0 L/SF/Hr or 1.35 LPM |
| 309 | CONCENTRATION | 1.0 | 0.0 | 1.0 HRS | | 130.0 | | 5.37 | 5.42 | 06/08/96 | 08:58 AM | 06/08/96 | 09:58 AM | 81.0 L 3.0 L/SF/Hr or 1.35 LPM |
| 310 | DILUTION | 0.4 | 0.0 | 0.4 HRS | | 130.4 | | 5.42 | 5.43 | 06/08/96 | 09:58 AM | 06/08/96 | 10:25 AM | 13.5 L 0.5 LPM |
| 311 | WASH | 0.9 | 0.0 | 0.9 HRS | | 131.3 | | 5.43 | 5.47 | 06/08/96 | 10:25 AM | 06/08/96 | 11:19 AM | 72.9 L 3.0 L/SF/Hr or 1.35 LPM |
| 312 | FLUSH | 0.3 | 0.0 | 0.3 HRS | | | 131.7 | 5.47 | 5.49 | 06/08/96 | 11:19 AM | 06/08/96 | 11:39 AM | 27.0 L 3.0 L/SF/Hr or 1.35 LPM |
| 313 | STORE | 0.7 | 0.0 | 0.7 HRS | | | 132.3 | 5.49 | 5.51 | 06/08/96 | 11:39 AM | 06/08/96 | 12:19 PM | 54.0 L 3.0 L/SF/Hr or 1.35 LPM |
| 314 | CIP | 1.0 | 0.0 | 1.0 HRS | | | 133.3 | 5.51 | 5.56 | 06/08/96 | 12:19 PM | 06/08/96 | 01:19 PM | |
| 315 | SIP | 1.0 | 0.0 | 1.0 HRS | | | 134.3 | 5.56 | 5.60 | 06/08/96 | 01:19 PM | 06/08/96 | 02:19 PM | |
| 316 | CLEAN UP | 1.0 | 0.0 | 1.0 HRS | | | 135.3 | 5.60 | 5.64 | 06/08/96 | 02:19 PM | 06/08/96 | 03:19 PM | |
| 317 | SUBTOTAL | 8.7 | | 8.7 HRS | | 131.3 | | | | | | | | MAX FR 1.35 LPM |
| 318 | | | | | | | | | | | | | | |
| 319 | 15 A MICROFILTRATION | | | | | | | | | | | | | 12.60 SF |
| 320 | | | | | | | | | | | | | | |
| 321 | SET UP | 1.0 | 0.0 | 1.0 HRS | 131.1 | | | 5.42 | 5.46 | 06/08/96 | 10:03 AM | 06/08/96 | 11:03 AM | |
| 322 | FLUSH | 0.1 | 0.0 | 0.1 HRS | 131.2 | | | 5.46 | 5.47 | 06/08/96 | 11:03 AM | 06/08/96 | 11:11 AM | 25.2 L 15.0 L/SF/Hr or 3.15 LPM |
| 323 | PRIME | 0.1 | 0.0 | 0.1 HRS | 131.3 | | | 5.47 | 5.47 | 06/08/96 | 11:11 AM | 06/08/96 | 11:19 AM | 25.2 L 15.0 L/SF/Hr or 3.15 LPM |

FIG. 12F-2

| | | | | | | | | | | | | | | |
|---|---|---|---|---|---|---|---|---|---|---|---|---|---|---|
| 324 | FILTRATION | 0.5 | 0.0 | 0.5 HRS | | 131.8 | | 5.47 | 5.49 | 06/08/96 | 11:19 AM | 06/08/96 | 11:49 AM | 94.5 L⍬ 15.0 L/SF/Hr or 3.15 LPM |
| 325 | WASH | 0.0 | 0.0 | 0.0 HRS | | 131.8 | | 5.49 | 5.49 | 06/08/96 | 11:49 AM | 06/08/96 | 11:49 AM | 0.0 L⍬ 15.0 L/SF/Hr or 3.15 LPM |
| 326 | REGENERATE | 0.0 | 0.0 | 0.0 HRS | | | 131.9 | 5.49 | 5.49 | 06/08/96 | 11:49 AM | 06/08/96 | 11:51 AM | 6.3 L⍬ 15.0 L/SF/Hr or 3.15 LPM |
| 327 | STORE | 0.1 | 0.0 | 0.1 HRS | | | 131.9 | 5.49 | 5.50 | 06/08/96 | 11:51 AM | 06/08/96 | 11:55 AM | 12.6 L⍬ 15.0 L/SF/Hr or 3.15 LPM |
| 328 | CIP | 1.0 | 0.0 | 1.0 HRS | | | 132.9 | 5.50 | 5.54 | 06/08/96 | 11:55 AM | 06/08/96 | 12:55 PM | |
| 329 | SIP | 1.0 | 0.0 | 1.0 HRS | | | 133.9 | 5.54 | 5.58 | 06/08/96 | 12:55 PM | 06/08/96 | 01:55 PM | |
| 330 | CLEAN UP | 1.0 | 0.0 | 1.0 HRS | | | 134.9 | 5.58 | 5.62 | 06/08/96 | 01:55 PM | 06/08/96 | 02:55 PM | |
| 331 | SUBTOTAL | 4.9 | | 4.9 HRS | | 131.8 | | | | | | | | |
| 332 | | | | | | | | | | | | | | |
| 333 | 16 A P/A MPLC | | | | | | | | | | | | | 63.8 L.CV 0.4 H/D 60.32 CM DIA. |
| 334 | | | | | | | | | | | | | | |
| 335 | EQUILIBRATION | 1.1 | 0.0 | 1.1 HRS | 131.4 | | | 5.43 | 5.48 | 06/08/96 | 10:17 AM | 06/08/96 | 11:24 AM | 318.9 L⍬ 100.0 CM/HR or 4.76 LPM |
| 336 | LOAD | 0.7 | 0.0 | 0.7 HRS | | 132.5 | | 5.49 | 5.52 | 06/08/96 | 11:49 AM | 06/08/96 | 12:31 PM | 100.5 L⍬ 50.0 CM/HR or 2.38 LPM |
| 337 | WASH | 1.3 | 0.0 | 1.3 HRS | | 133.9 | | 5.52 | 5.58 | 06/08/96 | 12:31 PM | 06/08/96 | 01:52 PM | 191.4 L⍬ 50.0 CM/HR or 2.38 LPM |
| 338 | ELUTE A | 1.3 | 0.0 | 1.3 HRS | | 135.2 | | 5.58 | 5.63 | 06/08/96 | 01:52 PM | 06/08/96 | 03:12 PM | 191.4 L⍬ 50.0 CM/HR or 2.38 LPM |
| 339 | ELUTE B | 0.0 | 0.0 | 0.0 HRS | | 135.2 | | 5.63 | 5.63 | 06/08/96 | 03:12 PM | 06/08/96 | 03:12 PM | 0.0 L⍬ 30.0 CM/HR or 1.43 LPM |
| 340 | REGENERATE | 0.2 | 0.0 | 0.2 HRS | | | 135.4 | 5.63 | 5.64 | 06/08/96 | 03:12 PM | 06/08/96 | 03:25 PM | 63.8 L⍬ 100.0 CM/HR or 4.76 LPM |
| 341 | STORE | 0.4 | 0.0 | 0.4 HRS | | | 135.9 | 5.64 | 5.66 | 06/08/96 | 03:25 PM | 06/08/96 | 03:52 PM | 127.6 L⍬ 100.0 CM/HR or 4.76 LPM |
| 342 | CIP | 1.0 | 0.0 | 1.0 HRS | | | 136.9 | 5.66 | 5.70 | 06/08/96 | 03:52 PM | 06/08/96 | 04:52 PM | |
| 343 | SIP | 1.0 | 0.0 | 1.0 HRS | | | 137.9 | 5.70 | 5.74 | 06/08/96 | 04:52 PM | 06/08/96 | 05:52 PM | |
| 344 | CLEAN UP | 1.0 | 0.0 | 1.0 HRS | | | 138.9 | 5.74 | 5.79 | 06/08/96 | 05:52 PM | 06/08/96 | 06:52 PM | |
| 345 | SUBTOTAL | 5.2 | | 5.2 HRS | | 135.2 | | | | | | | | MAX FR 4.76 LPM |
| 346 | | | | | | | | | | | | | | |
| 347 | | | | | | | | | | | | | | |
| 348 | 17 A P/A MPLC | | | | | | | | | | | | | 12.2 L.CV 0.4 H/D 34.75 CM DIA. |
| 349 | | | | | | | | | | | | | | |
| 350 | EQUILIBRATION | 0.6 | 0.0 | 0.6 HRS | 135.6 | | | 5.62 | 5.65 | 06/08/96 | 02:59 PM | 06/08/96 | 03:38 PM | 61.0 L⍬ 100.0 CM/HR or 1.58 LPM |
| 351 | LOAD | 1.1 | 0.0 | 1.1 HRS | | 136.3 | | 5.63 | 5.68 | 06/08/96 | 03:12 PM | 06/08/96 | 04:17 PM | 51.0 L⍬ 50.0 CM/HR or 0.79 LPM |
| 352 | WASH | 0.8 | 0.0 | 0.8 HRS | | 137.1 | | 5.68 | 5.71 | 06/08/96 | 04:17 PM | 06/08/96 | 05:03 PM | 36.6 L⍬ 50.0 CM/HR or 0.79 LPM |
| 353 | ELUTE A | 0.8 | 0.0 | 0.8 HRS | | 137.8 | | 5.71 | 5.74 | 06/08/96 | 05:03 PM | 06/08/96 | 05:49 PM | 36.6 L⍬ 50.0 CM/HR or 0.79 LPM |
| 354 | ELUTE B | 0.0 | 0.0 | 0.0 HRS | | 137.8 | | 5.74 | 5.74 | 06/08/96 | 05:49 PM | 06/08/96 | 05:49 PM | 0.0 L⍬ 30.0 CM/HR or 0.47 LPM |

FIG. 12G-1

| | OPERATION | PROCESS TIME LINE | | | | | | | | | | | | |
|---|---|---|---|---|---|---|---|---|---|---|---|---|---|---|
| | | DURATION (HRS.) | | | REL. TIME SCALE (HRS) | | | ABS. DAYS | | START | | FINISH | | |
| | | CALC. | A/D | ADJ. | PREP | EXEC. | COMPL. | START | END | DATE | TIME | DATE | TIME | CALCULATIONS |
| | | | | | | 15.5 | | | | 06/03/96 | 08:00 AM | | | |
| 355 | REGENERATE | 0.1 | 0.0 | 0.1 HRS | | | 138.0 | 5.74 | 5.75 | 06/08/96 | 05:49 PM | 06/08/96 | 05:57 PM | 12.2 Lℓ 100.0 CM/HR or 1.58 LPM |
| 356 | STORE | 0.3 | 0.0 | 0.3 HRS | | | 138.2 | 5.75 | 5.76 | 06/08/96 | 05:57 PM | 06/08/96 | 06:13 PM | 24.4 Lℓ 100.0 CM/HR or 1.58 LPM |
| 357 | CIP | 1.0 | 0.0 | 1.0 HRS | | | 139.2 | 5.76 | 5.80 | 06/08/96 | 06:13 PM | 06/08/96 | 07:13 PM | |
| 358 | SIP | 1.0 | 0.0 | 1.0 HRS | | | 140.2 | 5.80 | 5.84 | 06/08/96 | 07:13 PM | 06/08/96 | 08:13 PM | |
| 359 | CLEAN UP | 1.0 | 0.0 | 1.0 HRS | | | 141.2 | 5.84 | 5.88 | 06/08/96 | 08:13 PM | 06/08/96 | 09:13 PM | |
| 360 | SUBTOTAL | 6.7 | | 6.7 HRS | | 137.8 | | | | | | | | MAX FR 1.58 LPM |
| 361 | | | | | | | | | | | | | | |
| 362 | 18 A FLOW DIALYSIS | | | | | | | | | | | | | 12.20 SF |
| 363 | | | | | | | | | | | | | | |
| 364 | SET UP | 1.0 | 0.0 | 1.0 HRS | 136.5 | | | 5.65 | 5.69 | 06/08/96 | 03:29 PM | 06/08/96 | 04:29 PM | |
| 365 | FLUSH | 0.7 | 0.0 | 0.7 HRS | 137.2 | | | 5.69 | 5.72 | 06/08/96 | 04:29 PM | 06/08/96 | 05:09 PM | 24.4 Lℓ 3.0 L/SF/Hr or 0.61 LPM |
| 366 | PRIME | 0.7 | 0.0 | 0.7 HRS | 137.8 | | | 5.72 | 5.74 | 06/08/96 | 05:09 PM | 06/08/96 | 05:49 PM | 24.4 Lℓ 3.0 L/SF/Hr or 0.61 LPM |
| 367 | DIALYSIS | 1.0 | 0.0 | 1.0 HRS | | 138.8 | | 5.74 | 5.78 | 06/08/96 | 05:49 PM | 06/08/96 | 06:49 PM | 36.6 Lℓ 3.0 L/SF/Hr or 0.61 LPM |
| 368 | WASH | 0.0 | 0.0 | 0.0 HRS | | 138.8 | | 5.78 | 5.78 | 06/08/96 | 06:49 PM | 06/08/96 | 06:49 PM | 0.0 Lℓ 3.0 L/SF/Hr or 0.61 LPM |
| 369 | FLUSH | 0.3 | 0.0 | 0.3 HRS | | | 139.2 | 5.78 | 5.80 | 06/08/96 | 06:49 PM | 06/08/96 | 07:09 PM | 12.2 Lℓ 3.0 L/SF/Hr or 0.61 LPM |
| 370 | STORE | 0.7 | 0.0 | 0.7 HRS | | | 139.8 | 5.80 | 5.83 | 06/08/96 | 07:09 PM | 06/08/96 | 07:49 PM | 24.4 Lℓ 3.0 L/SF/Hr or 0.61 LPM |
| 371 | CIP | 1.0 | 0.0 | 1.0 HRS | | | 140.8 | 5.83 | 5.87 | 06/08/96 | 07:49 PM | 06/08/96 | 08:49 PM | |
| 372 | SIP | 1.0 | 0.0 | 1.0 HRS | | | 141.8 | 5.87 | 5.91 | 06/08/96 | 08:49 PM | 06/08/96 | 09:49 PM | |
| 373 | CLEAN UP | 1.0 | 0.0 | 1.0 HRS | | | 142.8 | 5.91 | 5.95 | 06/08/96 | 09:49 PM | 06/08/96 | 10:49 PM | |
| 374 | SUBTOTAL | 7.3 | | 7.3 HRS | | 138.8 | | | | | | | | MAX FR 0.61 LPM |
| 375 | | | | | | | | | | | | | | |
| 376 | 19 A P/A HPLC | | | | | | | | | | | | | 7.0 L.CV 0.4 H/D 28.81 CM DIA. |
| 377 | | | | | | | | | | | | | | |
| 378 | EQUILIBRATION | 0.5 | 0.0 | 0.5 HRS | 138.5 | | | 5.75 | 5.77 | 06/08/96 | 05:59 PM | 06/08/96 | 06:31 PM | 34.8 Lℓ 100.0 CM/HR or 1.09 LPM |
| 379 | LOAD | 0.2 | 0.0 | 0.2 HRS | | 139.1 | | 5.78 | 5.79 | 06/08/96 | 06:49 PM | 06/08/96 | 07:03 PM | 7.3 Lℓ 50.0 CM/HR or 0.54 LPM |
| 380 | WASH | 0.6 | 0.0 | 0.6 HRS | | 139.7 | | 5.79 | 5.82 | 06/08/96 | 07:03 PM | 06/08/96 | 07:41 PM | 20.9 Lℓ 50.0 CM/HR or 0.54 LPM |
| 381 | ELUTE A | 0.6 | 0.0 | 0.6 HRS | | 140.3 | | 5.82 | 5.85 | 06/08/96 | 07:41 PM | 06/08/96 | 08:20 PM | 20.9 Lℓ 50.0 CM/HR or 0.54 LPM |
| 382 | ELUTE B | 0.0 | 0.0 | 0.0 HRS | | 140.3 | | 5.85 | 5.85 | 06/08/96 | 08:20 PM | 06/08/96 | 08:20 PM | 0.0 Lℓ 30.0 CM/HR or 0.33 LPM |
| 383 | REGENERATE | 0.1 | 0.0 | 0.1 HRS | | | 140.4 | 5.85 | 5.85 | 06/08/96 | 08:20 PM | 06/08/96 | 08:26 PM | 7.0 Lℓ 100.0 CM/HR or 1.09 LPM |

FIG. 12G-2

| | | | | | | | | | | | | | | |
|---|---|---|---|---|---|---|---|---|---|---|---|---|---|---|
| 384 | STORE | 0.2 | 0.0 | 0.2 HRS | | | 140.7 | 5.85 | 5.86 | 06/08/96 | 08:26 PM | 06/08/96 | 08:39 PM | 13.9 L@ 100.0 CM/HR or 1.09 LPM |
| 385 | CIP | 1.0 | 0.0 | 1.0 HRS | | | 141.7 | 5.86 | 5.90 | 06/08/96 | 08:39 PM | 06/08/96 | 09:39 PM | |
| 386 | SIP | 1.0 | 0.0 | 1.0 HRS | | | 142.7 | 5.90 | 5.94 | 06/08/96 | 09:39 PM | 06/08/96 | 10:39 PM | |
| 387 | CLEAN UP | 1.0 | 0.0 | 1.0 HRS | | | 143.7 | 5.94 | 5.99 | 06/08/96 | 10:39 PM | 06/08/96 | 11:39 PM | |
| 388 | SUBTOTAL | 5.4 | | 5.4 HRS | | 140.3 | | | | | | | | MAX FR 1.09 LPM |
| 389 | | | | | | | | | | | | | | |
| 390 | 20 A FLOW DIALYSIS | | | | | | | | | | | | | 2.43 SF |
| 391 | | | | | | | | | | | | | | |
| 392 | SET UP | 0.0 | 0.0 | 0.0 HRS | 139.0 | | | 5.79 | 5.79 | 06/08/96 | 07:00 PM | 06/08/96 | 07:00 PM | |
| 393 | FLUSH | 0.7 | 0.0 | 0.7 HRS | 139.7 | | | 5.79 | 5.82 | 06/08/96 | 07:00 PM | 06/08/96 | 07:40 PM | 4.9 L@ 3.0 L/SF/HR or 0.12 LPM |
| 394 | PRIME | 0.7 | 0.0 | 0.7 HRS | 140.3 | | | 5.82 | 5.85 | 06/08/96 | 07:40 PM | 06/08/96 | 08:20 PM | 4.9 L@ 3.0 L/SF/HR or 0.12 LPM |
| 395 | DIALYSIS | 2.0 | 0.0 | 2.0 HRS | | 142.3 | | 5.85 | 5.93 | 06/08/96 | 08:20 PM | 06/08/96 | 10:20 PM | 14.6 L@ 3.0 L/SF/HR or 0.12 LPM |
| 396 | WASH | 0.0 | 0.0 | 0.0 HRS | | 142.3 | | 5.93 | 5.93 | 06/08/96 | 10:20 PM | 06/08/96 | 10:20 PM | 0.0 L@ 3.0 L/SF/HR or 0.12 LPM |
| 397 | FLUSH | 0.3 | 0.0 | 0.3 HRS | | | 142.7 | 5.93 | 5.94 | 06/08/96 | 10:20 PM | 06/08/96 | 10:40 PM | 2.4 L@ 3.0 L/SF/HR or 0.12 LPM |
| 398 | STORE | 0.7 | 0.0 | 0.7 HRS | | | 143.3 | 5.94 | 5.97 | 06/08/96 | 10:40 PM | 06/08/96 | 11:20 PM | 4.9 L@ 3.0 L/SF/HR or 0.12 LPM |
| 399 | CIP | 0.0 | 0.0 | 0.0 HRS | | | 143.3 | 5.97 | 5.97 | 06/08/96 | 11:20 PM | 06/08/96 | 11:20 PM | |
| 400 | SIP | 0.0 | 0.0 | 0.0 HRS | | | 143.3 | 5.97 | 5.97 | 06/08/96 | 11:20 PM | 06/08/96 | 11:20 PM | |
| 401 | CLEAN UP | 0.0 | 1.0 | 1.0 HRS | | | 144.3 | 5.97 | 6.01 | 06/08/96 | 11:20 PM | 06/08/96 | 12:20 AM | |
| 402 | SUBTOTAL | 4.3 | | 5.3 HRS | | 142.3 | | | | | | | | MAX FR 0.12 LPM |
| 403 | | | | | | | | | | | | | | |
| 404 | 17 A P/A HPLC | | | | | | | | | | | | | 5.3 L.CV 0.4 H/D 26.35 CM DIA. |
| 405 | | | | | | | | | | | | | | |
| 406 | EQUILIBRATION | 0.5 | 0.0 | 0.5 HRS | 142.0 | | | 5.89 | 5.91 | 06/08/96 | 09:28 PM | 06/08/96 | 09:57 PM | 26.6 L@ 100.0 CM/HR or 0.91 LPM |
| 407 | LOAD | 0.1 | 0.0 | 0.1 HRS | | 142.4 | | 5.93 | 5.94 | 06/08/96 | 10:20 PM | 06/08/96 | 10:26 PM | 2.9 L@ 50.0 CM/HR or 0.45 LPM |
| 408 | WASH | 0.6 | 0.0 | 0.6 HRS | | 143.0 | | 5.94 | 5.96 | 06/08/96 | 10:26 PM | 06/08/96 | 11:01 PM | 16.0 L@ 50.0 CM/HR or 0.45 LPM |
| 409 | ELUTE A | 0.6 | 0.0 | 0.6 HRS | | 143.6 | | 5.96 | 5.96 | 06/08/96 | 11:01 PM | 06/08/96 | 11:36 PM | 16.0 L@ 50.0 CM/HR or 0.45 LPM |
| 410 | ELUTE B | 0.0 | 0.0 | 0.0 HRS | | 143.6 | | 5.96 | 5.98 | 06/08/96 | 11:36 PM | 06/08/96 | 11:36 PM | 0.0 L@ 30.0 CM/HR or 0.27 LPM |
| 411 | REGENERATE | 0.1 | 0.0 | 0.1 HRS | | | 143.7 | 5.98 | 5.99 | 06/08/96 | 11:36 PM | 06/08/96 | 11:42 PM | 5.3 L@ 100.0 CM/HR or 0.91 LPM |
| 412 | STORE | 0.2 | 0.0 | 0.2 HRS | | | 143.9 | 5.99 | 6.00 | 06/08/96 | 11:42 PM | 06/08/96 | 11:54 PM | 10.6 L@ 100.0 CM/HR or 0.91 LPM |
| 413 | CIP | 0.0 | 0.0 | 0.0 HRS | | | 143.9 | 6.00 | 6.00 | 06/08/96 | 11:54 PM | 06/08/96 | 11:54 PM | |
| 414 | SIP | 0.0 | 0.0 | 0.0 HRS | | | 143.9 | 6.00 | 6.00 | 06/08/96 | 11:54 PM | 06/08/96 | 11:54 PM | |

FIG. 12H

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | TIME | FINISH DATE | TIME | CALCULATIONS |
|---|---|---|---|---|---|---|---|---|---|---|---|---|---|---|
| | | | | | | 15.5 | | | | 06/03/96 | 08:00 AM | | | |
| 415 | CLEAN UP | 1.0 | 0.0 | 1.0 HRS | | | 144.9 | 6.00 | 6.04 | 06/08/96 | 11:54 PM | 06/09/96 | 12:54 AM | |
| 416 | SUBTOTAL | 2.1 | | 2.1 HRS | | 143.6 | | | | | | | | MAX FR 0.91 LPM |
| 417 | | | | | | | | | | | | | | |
| 418 | 22 A STERILE FILTRATION | | | | | | | | | | | | | 0.09 SF |
| 419 | | | | | | | | | | | | | | |
| 420 | SET UP | 0.5 | 0.0 | 0.5 HRS | 152.6 | | | 6.34 | 6.36 | 06/09/96 | 08:06 AM | 06/09/96 | 06:36 AM | |
| 421 | FILTRATION | 0.5 | 0.0 | 0.5 HRS | | 144.1 | | 5.98 | 6.00 | 06/08/96 | 11:36 PM | 06/09/96 | 12:06 AM | 2.2 L@ 50.0 L/SF/Hr or 0.07 LPM |
| 422 | STORAGE | 0.5 | 0.0 | 0.5 HRS | | | 144.6 | 6.00 | 6.03 | 06/09/96 | 12:06 AM | 06/09/96 | 12:36 AM | |
| 423 | CIP | 0.0 | 0.0 | 0.0 HRS | | | 144.6 | 6.03 | 6.03 | 06/09/96 | 12:36 AM | 06/09/96 | 12:36 AM | |
| 424 | SIP | 0.0 | 0.0 | 0.0 HRS | | | 144.6 | 6.03 | 6.03 | 06/09/96 | 12:36 AM | 06/09/96 | 12:36 AM | |
| 425 | CLEAN UP | 1.0 | 0.0 | 1.0 HRS | | | 145.6 | 6.03 | 6.07 | 06/09/96 | 12:36 AM | 06/09/96 | 01:36 AM | |
| 426 | SUBTOTAL | 1.5 | | 1.5 HRS | | 144.1 | | | | | | | | MAX FR 0.07 LPM |

FIG. 14A

| | UNIT OPERATION TYPE | GROUP 1 | | |
|---|---|---|---|---|
| | | PARAMETER | SOLN. | |
| T1 | INNOCULUM PREP | NUMBER OF FLASKS<br>MEDIA VOLUME/FLASK | | 2<br>0.25 LITERS |
| T2 | FLASK GROWTH | SCALE UP RATIO<br>MEDIA VOLUME/FLASK | | 10 FOLD<br>1.25 L |
| T3 | FERMENTATION PRODUCTION | SCALE UP RATIO<br>FERMENTOR WORKING VOLUME<br>ANTIFOAM A<br>ANTIFOAM B<br>BASE<br>ACID | <br>S-101<br>S-102<br>S-103<br>S-104<br>S-105 | 10 FOLD<br>500 LITERS<br>1 MI/L<br>1 MI/L<br>5 MI/L<br>5 MI/L |
| T4 | INITIAL SEEDING | NUMBER OF AMPULES<br>VOLUME PER AMPULE<br>STARTING CELL DENSITY<br>AMPULE SPLIT RATIO<br>CULTURE VESSEL TYPE<br>FEED VOLUME | | 2<br>2 MI<br>300,000 CELLS/MI<br>1 VESSELS/AMPULE<br>ROLL. BOT.<br>100 MI |
| T5 | CULTURE VESSEL SPLIT | VESSEL SPLIT RATIO<br>NEW VESSEL TYPE<br>FEED VOLUME<br>SERUM CONTENT | | 2<br>RB<br>100 MI<br>2.0% FETAL BOVINE SERUM |
| T6 | SPINNER FLASK SEEDING | FLASK FEED VOLUME<br>VESSEL/FLASK RATIO<br>uCARRIER DENSITY<br>NUMBER OF PBS WASHES<br>NUMBER OF MEDIA WASHES<br>NO. OF MEDIA/SERUM WASHES | | 4 LITERS<br>0.1 L. CELLS/L FLASK<br>5 Gm/LITER<br>2<br>1<br>2 FBS |
| T7 | BIOSYNTHESIS BIOREACTOR PREPARATION (STIRRED TANK REACTOR) | REACTOR FEED VOLUME<br>SPINNER/REACTOR RATIO<br>uCARRIER DENSITY<br>NUMBER OF PBS WASHES<br>NUMBER OF MEDIA WASHES<br>NO. OF MEDIA/SERUM WASHES | | 500 LITERS<br>8.3<br>5 Gm/LITER<br>2<br>1<br>2 |
| T8 | BIOSYNTHESIS BIOREACTOR PREPARATION (HOLLOW FIBER REACTOR) | REACTOR FEED VOLUME<br>NUMBER OF PBS WASHES<br>NUMBER OF MEDIA WASHES<br>NO. OF MEDIA/SERUM WASHES<br>SERUM CONTENT | | 100 LITERS<br>2<br>2<br>2<br>2.0% FETAL BOVINE SERUM |
| T9 | BIOSYNTHESIS BIOREACTOR PREPARATION (FLUIDIZED BED REACTOR) | REACTOR FEED VOLUME<br>uCARRIER DENSITY<br>NUMBER OF PBS WASHES<br>NUMBER OF MEDIA WASHES<br>NO. OF MEDIA/SERUM WASHES<br>SERUM CONTENT | | LITERS<br>Gms/L |
| T10 | INITIAL SEEDING | NUMBER OF AMPULES<br>VOLUME PER AMPULE<br>STARTING CELL DENSITY<br>AMPULE SPLIT RATIO | | 2<br>2 MI<br>300,000 CELLS/MI<br>1 VESSELS/AMPULE |

FIG. 14B

| GROUP 2 | | | GROUP 3 | | |
|---|---|---|---|---|---|
| PARAMETER | SOLN. | | PARAMETER | SOLN. | |
| TEMPERATURE<br>AGITATION<br>DURATION | | 37 C<br>200 RPM<br>18 HOURS | FINAL OD | | 12 |
| TEMPERATURE<br>AGITATION<br>DURATION | | 37 C<br>200 HOURS<br>16 RPM | FINAL OD | | 12 |
| GROWTH TEMPERATURE<br>AGITATION<br>SPARGE RATE<br>BACK PRESSURE<br>TOTAL DURATION | | 37 HOURS<br>1 HP/100L<br>1.5 VVM<br>5 PSIG<br>21 HRS | FINAL OD<br>DRY CELL MASS<br>PRODUCT CONCENTRATION<br>CIP | | 12<br>9.96 Gms TDCM/L<br>0.3 Gms PRODUCT/L<br>Y |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |
| FEED RATE<br><br>DAYS TO CONFLUENCE | | 1 FEED PER VESSEL PER<br>2 DAYS<br>2 DAYS | AMPLIFICATION FACTOR | | 100% |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |
| SERUM CONTENT<br>FEED RATE<br><br>DAYS TO CONFLUENCE<br>SERUM FREE MEDIA WASHES | | 2.0% FETAL BOVINE SERUM<br>1 FEED PER VESSEL PER<br>2 DAYS<br>10 DAYS<br>2 | PRODUCT CONCENTRATION<br>TOTAL PROTEIN CONCEN. | | 2500% Mg PROD/L<br>0.125 Mg TP/MI |
| NUMBER OF REACTORS<br>FEED RATE<br><br>DAYS TO CONFLUENCE | | 1<br>1 FEED PER VESSEL PER<br>1 DAYS<br>10 DAYS | HARVEST VOLUME<br>PRODUCT CONCENTRATION<br>TOTAL PROTEIN CONCEN. | | 500% LITERS<br>25 Mg PROD/L<br>0.125 Mg TP/MI |
| NUMBER OF REACTORS<br>FEED RATE<br><br>DAYS TO CONFLUENCE | | 1<br>1 FEED PER VESSEL PER<br>1 DAYS<br>10 DAYS | PRODUCT CONCENTRATION<br>TOTAL PROTEIN CONCEN. | | 2500% Mg PROD/L<br>0.125 Mg TP/MI |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |

FIG. 15A

| | UNIT OPERATION TYPE | GROUP 1 PARAMETER | SOLN. | |
|---|---|---|---|---|
| | | CULTURE VESSEL TYPE<br>FEED VOLUME | | ROLL. BOT.<br>100 MI |
| T11 | CULTURE VESSEL SPLIT | VESSEL SPLIT RATIO<br>NEW VESSEL TYPE<br>FEED VOLUME<br>SERUM CONTENT | | 2<br>RB<br>100 MI<br>2.0% FETAL BOVINE SERUM |
| T12 | SPINNER FLASK SPLIT | FLASK FEED VOLUME<br>VESSEL/FLASK RATIO<br>uCARRIER DENSITY<br>NUMBER OF PBS WASHES<br>NUMBER OF MEDIA WASHES<br>NO. OF MEDIA/SERUM WASHES | | 4 LITERS<br>0.1 L CELLS/L FLASK<br>5 Gm/LITER<br>2<br>1<br>2 |
| T13 | BIOSYNTHESIS BIOREACTOR PREPARATION (STIRRED TANK REACTOR) | REACTOR FEED VOLUME<br>SPINNER/REACTOR RATIO<br>uCARRIER DENSITY<br>NUMBER OF PBS WASHES<br>NUMBER OF MEDIA WASHES<br>NO. OF MEDIA/SERUM WASHES | | 500 LITERS<br>8.3<br>5 Gm/LITER<br>2<br>1<br>2 |
| T14 | BIOSYNTHESIS BIOREACTOR PREPARATION (FLUIDIZED BED REACTOR) | REACTOR FEED VOLUME<br>uCARRIER DENSITY<br>NUMBER OF PBS WASHES<br>NUMBER OF MEDIA WASHES<br>NO. OF MEDIA/SERUM WASHES<br>SERUM CONTENT | | LITERS<br>GmS/L |
| T15 | INITIAL COUPLING | FLASK FEED VOLUME<br>VESSEL/FLASK RATIO<br>uCARRIER DENSITY<br>NUMBER OF PBS WASHES<br>NUMBER OF MEDIA WASHES<br>NO. OF MEDIA/SERUM WASHES | | 4 LITERS<br>0.1 L CELLS/L FLASK<br>5 Gm/LITER<br>2<br>1<br>2 FBS |
| T16 | ADDITIONAL COUPLING | REACTOR FEED VOLUME<br>SPINNER/REACTOR RATIO<br>uCARRIER DENSITY<br>NUMBER OF PBS WASHES<br>NUMBER OF MEDIA WASHES<br>NO. OF MEDIA/SERUM WASHES | | 500 LITERS<br>8.3<br>5 Gm/LITER<br>2<br>1<br>2 |
| T17 | PEPTIDE CLEAVAGE | REACTOR FEED VOLUME<br>NUMBER OF PBS WASHES<br>NUMBER OF MEDIA WASHES<br>NO. OF MEDIA/SERUM WASHES<br>SERUM CONTENT | | 100 LITERS<br>2<br>2<br>2<br>2.0% FETAL BOVINE SERUM |
| T18 | TISSUE THAWING | CRUDE PRODUCT YEILD<br>ENVIRONMENTAL TEMPERATURE<br>THAW DURATION | | 25 Gm CRUDE PROD./Kg TISSUE<br>25 C<br>16 HOURS |
| T19 | HOMOGENIZATION | CRUDE PRODUCT YEILD<br>LIQUID/SOLID RATIO<br>HOMMOGENIZATION TEMP.<br>HOMMOGENIZER TYPE<br>ENERGY INPUT<br>DURATION | | 25 Gm CRUDE PROD./Kg TISSUE<br>10 L SOLUTION/KG TISSUE<br>4 C<br>RS<br>200 HP/100L/HR<br>4 HOURS |
| T20 | LIQUID THAWING | | | |

FIG. 15B

| GROUP 2 | | | GROUP 3 | | |
|---|---|---|---|---|---|
| PARAMETER | SOLN. | | PARAMETER | SOLN. | |
| PBS WASHES<br>TRYPSIN WASH | | 200 Ml<br>100 Ml | | | |
| FEED RATE<br><br>DAYS TO CONFLUENCE<br>PBS WASHES<br>TRYPSIN WASH | | 1 FEED PER VESSEL PER<br>2 DAYS<br>2 DAYS<br>200 Ml<br>100 Ml | AMPLIFICATION FACTOR | | 100% |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |
| SERUM CONTENT<br>FEED RATE<br><br>DAYS TO CONFLUENCE<br>SERUM FREE MEDIA WASHES | | 2.0% FETAL BOVINE SERUM<br>1 FEED PER VESSEL PER<br>2 DAYS<br>10 DAYS<br>2 | PRODUCT CONCENTRATION<br>TOTAL PROTEIN CONCEN. | | 2500% Mg PROD/L<br>0.125 Mg TP/Ml |
| NUMBER OF REACTORS<br>FEED RATE<br><br>DAYS TO CONFLUENCE | | 1<br>1 FEED PER VESSEL PER<br>1 DAYS<br>10 DAYS | PRODUCT CONCENTRATION<br>TOTAL PROTEIN CONCEN. | | 2500% Mg PROD/L<br>0.125 Mg TP/Ml |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | | 100% |
| SERUM CONTENT<br>FEED RATE<br><br>DAYS TO CONFLUENCE<br>SERUM FREE MEDIA WASHES | | 2.0% FETAL BOVINE SERUM<br>1 FEED PER VESSEL PER<br>2 DAYS<br>10 DAYS<br>2 | PRODUCT CONCENTRATION<br>TOTAL PROTEIN CONCEN. | | 2500% Mg PROD/L<br>0.125 Mg TP/Ml |
| NUMBER OF REACTORS<br>FEED RATE<br><br>DAYS TO CONFLUENCE | | 1<br>1 FEED PER VESSEL PER<br>1 DAYS<br>10 DAYS | HARVEST VOLUME<br>PRODUCT CONCENTRATION<br>TOTAL PROTEIN CONCEN. | | 500% LITERS<br>25 Mg PROD/L<br>0.125 Mg TP/Ml |
| CONTAMINANT PROTEIN CONC. | | 100 Gm/L | TEMPERATURE REGULATION<br>CIP<br>SIP | | Y<br>Y<br>Y |
| CONTAMINANT PROTEIN CONC. | | 100 Gm/L | TEMPERATURE REGULATION<br>CIP<br>SIP | | Y<br>Y<br>Y |
| | | | AMPLIFICATION FACTOR | | 100% |

FIG. 16A

| | UNIT OPERATION TYPE | GROUP 1 | | |
|---|---|---|---|---|
| | | PARAMETER | SOLN. | |
| T21 | PRODUCT Ppt BY SOLIDS | REAGENT CONCENTRATION | | 1 M |
| T22 | PRODUCT Ppt BY LIQUIDS | REAGENT CONCENTRATION | | 1 M |
| T23 | CONTAINMENT Ppt BY SOLIDS | REAGENT CONCENTRATION | | 1 M |
| T24 | CONTAINMENT Ppt BY LIQUIDS | REAGENT CONCENTRATION | | 1 M |
| T25 | SOLIDS HARVEST TANGENTIAL FLOW MF | POROSITY<br>AVERAGE FLUX RATE<br><br><br>TOTAL THROUGHPUT<br>FILTRATION TIME | | 0.2 MICRON<br>11 L/SF/HR AT<br>40 PSIG AT<br>4 C<br>400 LITERS/SF<br>1 HR |
| T26 | CONTINUOUS CENTRIFUGATION SOLIDS HARVEST | SYSTEM VOID VOLUME | | 5 LITERS |
| T27 | CONTINUOUS CENTRIFUGATION SUPERNATANT HARVEST | SYSTEM VOID VOLUME | | 6 LITERS |
| T28 | DILUTION | SYSTEM VOID VOLUME | | 6 LITERS |
| T29 | BATCH CENTRIFUGATION SOLIDS HARVEST | SYSTEM VOID VOLUME | | 6 LITERS |

FIG. 16B

| GROUP 2 | | | GROUP 3 | | |
|---|---|---|---|---|---|
| PARAMETER | SOLN. | | PARAMETER | SOLN. | |
| Kgms OF REAGENT/LITERS PRODUCT | | 0.25 Kg/L | STEP RECOVERY OF PRODUCT | | 95% |
| TEMPERATURE | | 4 C | STEP RECOVERY OF T.P. | | 95% |
| ADDITION TIME | | 0.5 HOURS | | | |
| ADDITIONAL MIX TIME | | 2 HOURS | TEMPERATURE REGULATION | | Y |
| | | | CIP | | Y |
| | | | SIP | | Y |
| LITERS REAGENT/LITERS PRODUCT | | 0.25 L/L | STEP RECOVERY OF PRODUCT | | 95% |
| TEMPERATURE | | 4 C | STEP RECOVERY OF T.P. | | 95% |
| ADDITION TIME | | 0.5 HOURS | | | |
| ADDITIONAL MIX TIME | | 2 HOURS | TEMPERATURE REGULATION | | Y |
| | | | CIP | | Y |
| | | | SIP | | Y |
| Kgms OF REAGENT/LITERS PRODUCT | | 0.25 Kg/L | STEP RECOVERY OF PRODUCT | | 95% |
| TEMPERATURE | | 4 C | STEP RECOVERY OF T.P. | | 95% |
| ADDITION TIME | | 0.5 HOURS | | | |
| ADDITIONAL MIX TIME | | 2 HOURS | TEMPERATURE REGULATION | | Y |
| | | | CIP | | Y |
| | | | SIP | | Y |
| LITERS REAGENT/LITERS PRODUCT | | 0.25 L/L | STEP RECOVERY OF PRODUCT | | 95% |
| TEMPERATURE | | 4 C | STEP RECOVERY OF T.P. | | 95% |
| ADDITION TIME | | 0.5 HOURS | | | |
| ADDITIONAL MIX TIME | | 2 HOURS | TEMPERATURE REGULATION | | Y |
| | | | CIP | | Y |
| | | | SIP | | Y |
| FLUSH | | 2 L/SF | STEP RECOVERY OF PRODUCT | | 95% |
| PRIME | | 2 L/SF | STEP RECOVERY OF T.P. | | 95% |
| CONCENTRATION FACTOR | | 10 FOLD | | | |
| WASH | | 0.5 L/SF | TEMPERATURE REGULATION | | Y |
| REGENERATE | | 1 L/SF | CIP | | Y |
| STORE | | 2 L/SF | SIP | | Y |
| RCF | | 10,000 X G | STEP RECOVERY OF PRODUCT | | 95% |
| TIME | | 60 MINUTES | STEP RECOVERY OF T.P. | | 95% |
| VOLUME REDUCTION | | 30 X VOL. REDUCTION | | | |
| WASH VOLUME | | 0.2 X SYSTEM VOID VOLUME | TEMPERATURE REGULATION | | Y |
| | | | CIP | | Y |
| | | | SIP | | Y |
| RCF | | 10,000 X G | STEP RECOVERY OF PRODUCT | | 85% |
| TIME | | 30 MINUTES | STEP RECOVERY OF T.P. | | 0.3 |
| VOLUME REDUCTION | | 0.062 VOL. REDUCTION | | | |
| WASH VOLUME | | 1.5 X SYSTEM VOID VOLUME | TEMPERATURE REGULATION | | Y |
| | | | CIP | | Y |
| | | | SIP | | Y |
| RCF | | 10,000 X G | STEP RECOVERY OF PRODUCT | | 95% |
| TIME | | 30 MINUTES | STEP RECOVERY OF T.P. | | 0.95 |
| VOLUME REDUCTION | | 16 X VOL. REDUCTION | | | |
| WASH VOLUME | | 1.5 X SYSTEM VOID VOLUME | TEMPERATURE REGULATION | | Y |
| | | | CIP | | Y |
| | | | SIP | | Y |
| RCF | | 10,000 X G | STEP RECOVERY OF PRODUCT | | 95% |
| TIME | | 30 MINUTES | STEP RECOVERY OF T.P. | | 0.95 |

FIG. 17A

| | UNIT OPERATION TYPE | GROUP 1 PARAMETER | SOLN. | |
|---|---|---|---|---|
| | | | | |
| T30 | BATCH CENTRIFUGATION SUPERNATANT HARVEST | SYSTEM VOID VOLUME | | 6 LITERS |
| T31 | CELL DISRUPTION HIGH PRESS. HOMOGEN. | PRODUCT TEMPERATURE<br>UTILITY TEMPERATURE<br>VOID VOLUME | | 8 C<br>2 C<br>5 LITERS |
| T32 | CELL DISRUPTION BEAD MILL | NUMBER OF PASSES<br>BEAD SIZE<br>VOID VOLUME<br>FLOW RATE | | 2<br><br><br>0.5 LPM |
| T33 | CELL DISRUPTION CHEMICAL LYSIS | REAGENT<br>TEMPERATURE<br>EXPOSURE TIME | | 0.5 M NaOH<br>4 C<br>2 HOURS |
| T34 | MICROFILTRATION TANGENTIAL FLOW | POROSITY<br>AVERAGE FLUX RATE<br><br><br>TOTAL THROUGHPUT<br>FILTRATION TIME | | 0.2 MICRON<br>50 L/SF/HR AT<br>40 PSIG AT<br>4 C<br>400 LITERS/SF<br>2 HR |
| T35 | MICROFILTRATION DEAD END | POROSITY<br>AVERAGE FLUX RATE<br><br><br>TOTAL THROUGHPUT<br>FILTRATION TIME | | 0.2 MICRON<br>50 L/SF/HR AT<br>40 PSIG AT<br>4 C<br>400 LITERS/SF<br>0.5 HR |
| T36 | ULTRAFILTRATION CONCENTRATION/DILUTION | POROSITY<br>AVERAGE FLUX RATE<br><br><br>CONCENTRATION TIME | | 60 K NMWL<br>3 L/SF/HR AT<br>40 PSIG AT<br>4 C<br>2 HR. |
| T37 | ULTRAFILTRATION FLOW DIALYSIS | POROSITY<br>AVERAGE FLUX RATE | | 60 K NMWL<br>3 L/SF/HR AT<br>40 PSIG AT<br>4 C |

FIG. 17B

| GROUP 2 | | | GROUP 3 | | |
|---|---|---|---|---|---|
| PARAMETER | SOLN. | | PARAMETER | SOLN. | |
| VOLUME REDUCTION | | 16 X VOL. REDUCTION | | | |
| WASH VOLUME | | 1.5 X SYSTEM VOID VOLUME | TEMPERATURE REGULATION | | Y |
| | | | CIP | | Y |
| | | | SIP | | Y |
| RCF | | 10000 X G | STEP RECOVERY OF PRODUCT | | 95% |
| TIME | | 30 MINUTES | STEP RECOVERY OF T.P. | | 0.95 |
| VOLUME REDUCTION | | 16 X VOL. REDUCTION | | | |
| WASH VOLUME | | 1.5 X SYSTEM VOID VOLUME | TEMPERATURE REGULATION | | Y |
| | | | CIP | | Y |
| | | | SIP | | Y |
| NUMBER OF PASSES | | 6 TIMES | RINSE | | 500% VOID VOLUMES |
| PRESSURE | | 12,000 PSI | STEP RECOVERY OF PRODUCT | | 95% |
| FLOW RATE | | 5 LPM | STEP RECOVERY OF T.P. | | 95% |
| TEMPERATURE INCREASE | | 1.8 DEGREES C/1,000 PSI | TEMPERATURE REGULATION | | Y |
| | | | CIP | | Y |
| | | | SIP | | Y |
| | | | STEP RECOVERY OF PRODUCT | | 95% |
| | | | STEP RECOVERY OF T.P. | | |
| | | | TEMPERATURE REGULATION | | Y |
| | | | CIP | | Y |
| | | | SIP | | Y |
| LITERS REAGENT/Gm PRODUCT | | 0.4 L/Gm | STEP RECOVERY OF PRODUCT | | 95% |
| TITRATION | | 0 MI/LITER | STEP RECOVERY OF T.P. | | |
| | | | TEMPERATURE REGULATION | | Y |
| | | | CIP | | Y |
| | | | SIP | | Y |
| FLUSH | | 2.00 L/SF | STEP RECOVERY OF PRODUCT | | 95% |
| PRIME | | 2.00 L/SF | STEP RECOVERY OF T.P. | | 95% |
| WASH | | 0.50 L/SF | | | |
| SOLIDS | | 0.30% OF PRODUCT SOLUTION | TEMPERATURE REGULATION | | Y |
| REGENERATE | | 1.00 L/SF | CIP | | Y |
| STORE | | 2.00 L/SF | SIP | | Y |
| FLUSH | | 0 L/SF | STEP RECOVERY OF PRODUCT | | 95% |
| PRIME | | 0 L/SF | STEP RECOVERY OF T.P. | | 0.95 |
| WASH | | 0.5 L/SF | | | |
| SOLIDS | | 0.003 OF PRODUCT SOLUTION | TEMPERATURE REGULATION | | N |
| REGENERATE | | 1 L/SF | CIP | | N |
| STORE | | 2 L/SF | SIP | | N |
| FLUSH | | 2.00 L/SF | STORE | | 2.00 L/SF |
| PRIME | | 2.00 L/SF | STEP RECOVERY OF PRODUCT | | 95% |
| WASH | | 0.50 L/SF | STEP RECOVERY OF T.P. | | 95% |
| DILUTE CONCENTRATE | | 10.0 FOLD | TEMPERATURE REGULATION | | Y |
| SOLIDS | | 0.30% OF PRODUCT SOLUTION | CIP | | Y |
| REGENERATE | | 1.00 L/SF | SIP | | Y |
| FLUSH | | 2 L/SF | STORE | | 200% L/SF |
| PRIME | | 2.00 L/SF | STEP RECOVERY OF PRODUCT | | 95% |
| DIALYSIS BUFFER | | 5.0 X FEED STREAM VOLUME | STEP RECOVERY OF T.P. | | 95% |
| WASH | | 0.50 L/SF | TEMPERATURE REGULATION | | Y |

FIG. 18A

| | UNIT OPERATION TYPE | GROUP 1 | | |
|---|---|---|---|---|
| | | PARAMETER | SOLN. | |
| | | DIALYSIS TIME | | 2 HR |
| T38 | PROD. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 10 Mg PROD./Ml OF PACKING<br>1.5 FOLD<br>0.37 H/D<br>100 Cm/HR AT<br>45 PSIG AND<br>4 C |
| T39 | PROD. ADS. CHROMATOGRAPHY MPLC | COLUMN CAPACITY<br>COLUMN OVERSIZE FACTOR<br>COLUMN ASPECT RATIO<br>MAX. LINEAR VELOCITY | | 10 Mg PROD./Ml OF PACKING<br>1.5 FOLD<br>0.37 H/D<br>100 Cm/HR AT<br>45 PSIG AND<br>4 C |
| T40 | PROD. ADS. CHROMATOGRAPHY LPLC | COLUMN CAPACITY<br>COLUMN OVERSIZE FACTOR<br>COLUMN ASPECT RATIO<br>MAX. LINEAR VELOCITY | | 10 Mg PROD./Ml OF PACKING<br>1.5 FOLD<br>0.37 H/D<br>100 Cm/HR AT<br>45 PSIG AND<br>4 C |
| T41 | CONT. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 30 Mg CONT./Ml OF PACKING<br>1.5 FOLD<br>0.37 H/D<br>100 Cm/HR AT<br>45 PSIG AND<br>4 C |
| T42 | CONT. ADS. CHROMATOGRAPHY MPLC | COLUMN CAPACITY<br>COLUMN OVERSIZE FACTOR<br>COLUMN ASPECT RATIO<br>MAX. LINEAR VELOCITY | | 10 Mg CONT./Ml OF PACKING<br>1.5 FOLD<br>0.37 H/D<br>100 Cm/HR AT<br>45 PSIG AND<br>400% C |
| T43 | CONT. ADS. CHROMATOGRAPHY LPLC | COLUMN CAPACITY<br>COLUMN OVERSIZE FACTOR<br>COLUMN ASPECT RATIO<br>MAX. LINEAR VELOCITY | | 10 Mg CONT./Ml OF PACKING<br>1.5 FOLD<br>0.37 H/D<br>100 Cm/HR AT<br>45 PSIG AND<br>4 C |
| T44 | SIZE EXCL. CHROMATOGRAPHY HPLC | LOAD CAPACITY<br>LENGTH<br>MAX. LINEAR VELOCITY<br><br><br>VOID VOLUME | | 5% OF TOTAL COLUMN VOLUME<br>100 Cm<br>100 Cm/HR AT<br>45 PSIG AND<br>4 C<br>25% COLUMN VOLUME |
| T45 | SIZE EXCL. CHROMATOGRAPHY MPLC | LOAD CAPACITY<br>LENGTH<br>MAX. LINEAR VELOCITY<br><br><br>VOID VOLUME | | 5% OF TOTAL COLUMN VOLUME<br>100 Cm<br>100 Cm/HR AT<br>45 PSIG AND<br>4 C<br>25% COLUMN VOLUME |

FIG. 18B

| GROUP 2 | | | GROUP 3 | | |
|---|---|---|---|---|---|
| PARAMETER | SOLN. | | PARAMETER | SOLN. | |
| SOLIDS | | 0.30% OF PRODUCT SOLUTION | CIP | | Y. |
| REGENERATE | | 1.00 L/SF | SIP | | Y |
| COLUMN EQUILIBRATION | | 5 COLUMN VOLUMES | PROD. ELUTION VOLUME | | 80% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 0 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 80% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 0 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 5 COLUMN VOLUMES | PROD. ELUTION VOLUME | | 42% COLUMNS VOLUMES |
| COLUMN WASH | | 3 COLUMN VOLUMES | STEP RECOVERY OF PRODUCT | | 95% |
| COLUMN ELUTE A | | 3 COLUMN VOLUMES | STEP RECOVERY OF T.P. | | 95% |
| COLUMN ELUTE B | | 2 COLUMN VOLUMES | TEMPERATURE REGULATION | | N |
| COLUMN REGENERATE | | 1 COLUMN VOLUMES | CIP | | Y |
| COLUMN STORE | | 2 COLUMN VOLUMES | SIP | | Y |
| COLUMN EQUILIBRATION | | 4 COLUMN VOLUMES | PROD. ELUTION VOLUME | | 42% COLUMNS VOLUMES |
| COLUMN WASH | | 1 COLUMN VOLUMES | STEP RECOVERY OF PRODUCT | | 95% |
| COLUMN REGENERATE | | 1 COLUMN VOLUMES | STEP RECOVERY OF T.P. | | 95% |
| COLUMN STORE | | 2 COLUMN VOLUMES | TEMPERATURE REGULATION | | N |
| | | | CIP | | Y |
| | | | SIP | | Y |
| COLUMN EQUILIBRATION | | 4 COLUMN VOLUMES | PROD. ELUTION VOLUME | | 42% COLUMNS VOLUMES |
| COLUMN WASH | | 1 COLUMN VOLUMES | STEP RECOVERY OF PRODUCT | | 95% |
| COLUMN REGENERATE | | 1 COLUMN VOLUMES | STEP RECOVERY OF T.P. | | 95% |
| COLUMN STORE | | 2 COLUMN VOLUMES | TEMPERATURE REGULATION | | N |
| | | | CIP | | Y |
| | | | SIP | | Y |

FIG. 19A

| | UNIT OPERATION TYPE | GROUP 1 | | |
|---|---|---|---|---|
| | | PARAMETER | SOLN. | |
| T46 | SIZE EXCL. CHROMATOGRAPHY LPLC | LOAD CAPACITY<br>LENGTH<br>MAX. LINEAR VELOCITY<br><br><br>VOID VOLUME | | 5% OF TOTAL COLUMN VOLUME<br>100 Cm<br>100 Cm/HR AT<br>45 PSIG AND<br>4 C<br>25% COLUMN VOLUME |
| T47 | DILUTION | DILUTION FACTOR | | 3 LITERS/LITER |
| T48 | RESOLUBILIZATION | REGEANT/PRODUCT RATIO<br>DISSOLUTION TIME<br>ADDITIONAL MIX TIME | | 0 L/Kg PRODUCT<br>0.50 HOURS<br>0.50 HOURS |
| T49 | ENZYMATIC MODIFICTAION | ENZYME TO PRODUCT RATIO<br><br>ENZYME CONCENTRATION<br>REACTION TEMP.<br>REACTION DURATION | | 0.084 LITERS OF ENZYME STOCK PER LITER OF START. PROC. VOL.<br><br>2 Mg/Ml<br>37 DEGREES C<br>30 MINUTES<br>100% |
| T50 | LYOPHILIZATION | PRODUCT CAPACITY/LOAD<br>PRODUCT UNIT SIZE | | 8 UNITS<br>100 GRAMS/UNIT |
| T51 | HEAT EXCHANGE | PROCESS INITIAL TEMP<br>PROCESS FINAL TEMP<br>UTILITY INITIAL TEMP<br>UTILITY FINAL TEMP<br>PROCESS SPECIFIC HEAT<br>DESIGN TYPE (P,T,C) | | 98.6 DEGREES C<br>39.2 DEGREES C<br>34 DEGREES C<br>5 DEGREES C<br>38.6 K BTU/HR<br>P |
| T52 | STORAGE | | | |
| T53 | FERMENTATION SEED | SCALE UP RATIO<br>FERMENTOR WORKING VOLUME<br>ANTIFOAM A<br>ANTIFOAM B<br>BASE<br>ACID | | 10 FOLD<br>50 LITERS<br>1 Ml/L<br>1 Ml/L<br>5 Ml/L<br>5 Ml/L |
| T54 | INITIAL SEEDING | FLASK FEED VOLUME<br>SPINNER SPLIT RATIO | | 12 LITERS<br>4 |

FIG. 19B

| GROUP 2 | | | GROUP 3 | | |
|---|---|---|---|---|---|
| PARAMETER | SOLN. | | PARAMETER | SOLN. | |
| COLUMN EQUILIBRATION<br>COLUMN WASH<br>COLUMN REGENERATE<br>COLUMN STORE | | 4 COLUMN VOLUMES<br>1 COLUMN VOLUMES<br>1 COLUMN VOLUMES<br>2 COLUMN VOLUMES | PROD. ELUTION VOLUME<br>STEP RECOVERY OF PRODUCT<br>STEP RECOVERY OF T.P.<br>TEMPERATURE REGULATION<br>CIP<br>SIP | | 42% COLUMN VOLUMES<br>95%<br>95%<br>N<br>Y<br>Y |
| DILUTION TIME<br>ADDITIONAL MIX TIME | | 0.5 HOURS<br>1 HOURS | STEP RECOVERY OF PRODUCT<br>STEP RECOVERY OF T.P.<br>TEMPERATURE REGULATION<br>CIP<br>SIP | | 95%<br>95%<br>Y<br>Y<br>Y |
| REGEANT 1<br>CONCENTRATION | | WATER<br>DIST. | STEP RECOVERY OF PRODUCT<br>STEP RECOVERY OF T.P.<br>TEMPERATURE REGULATION<br>CIP<br>SIP | | 95%<br>95%<br>Y<br>Y<br>Y |
| TITRATION SOLUTION-1<br>TITRATION SOLUTION-2<br>NEUTRALIZATION | | 0.067 L/L PROCESS<br>0.02 L/L PROCESS<br>0.57 L/L PROCESS | STEP RECOVERY OF PRODUCT<br>STEP RECOVERY OF T.P.<br>TEMPERATURE REGULATION<br>CIP<br>SIP | | 95%<br>95%<br>Y<br>Y<br>Y |
| LYOPHILIZATION TIME<br>PRODUCT WEIGHT REDUCTION | | 18 HOURS<br>0.95 | STEP RECOVERY OF PRODUCT<br>STEP RECOVERY OF T.P.<br>CIP<br>SIP | | 95%<br>95%<br>Y<br>Y<br>Y |
| EXPOSURE TIME | | 1 HOURS | STEP RECOVERY OF PRODUCT<br>STEP RECOVERY OF T.P.<br>TEMPERATURE REGULATION<br>CIP<br>SIP | | 100%<br>100%<br>Y<br>Y<br>Y |
| | | | STEP RECOVERY OF PRODUCT<br>STEP RECOVERY OF T.P.<br>TEMPERATURE REGULATION<br>CIP<br>SIP | | 95%<br>95%<br>Y<br>Y<br>Y |
| GROWTH TEMPERATURE<br>AGITATION<br>SPARGE RATE<br>BACK PRESSURE<br>TOTAL DURATION | | 37 HOURS<br>1 HP/100L<br>1.5 VVM<br>5 PSIG<br>21 HRS | FINAL OD<br>CIP | | 12<br>Y |
| SERUM CONTENT<br>FEED RATE | | 2% FBS<br>1 FEED PER VESSEL PER | AMPLIFICATION FACTOR | | 1 |

FIG. 20A

| | UNIT OPERATION TYPE | GROUP 1 | | |
|---|---|---|---|---|
| | | PARAMETER | SOLN. | |
| | | uCARRIER DENSITY<br>NUMBER OF PBS WASHES<br>NUMBER OF MEDIA WASHES<br>NO. OF MEDIA/SERUM WASHES | | 5 Gm/LITER<br>2<br>1<br>2 FBS |
| T55 | CULTURE VESSEL SPLIT | FLASK FEED VOLUME<br><br>SPINNER SPLIT RATIO<br>uCARRIER DENSITY<br>NUMBER OF PBS WASHES<br>NUMBER OF MEDIA WASHES<br>NO. OF MEDIA/SERUM WASHES | | 12 LITERS<br><br>4<br>5 Gm/LITER<br>2<br>1<br>2 FBS |
| T56 | CULTURE FLASK SPLIT | | | |
| T57 | STIRRED TANK REACTOR | | | |
| T58 | FLUIDIZED BED REACTOR | PROCESS INITIAL TEMP<br>PROCESS FINAL TEMP<br>UTILITY INITIAL TEMP<br>UTILITY FINAL TEMP<br>PROCESS SPECIFIC HEAT<br>DESIGN TYPE (P,T,C) | | 37 DEGREES C<br>4 DEGREES C<br>2 DEGREES C<br>5 DEGREES C<br>12 K BTU/HR<br>P |
| T59 | LIQUID/LIQUID EXTRACTION | LIQUID/LIQUID RATIO<br>EXTRACTION TEMPERATURE<br>ADDITION DURATION<br>ADDITIONAL MIX. DURATION<br>MIX ENERGY | | 1 L EXTRACTION/L PRODUCT<br>4 C<br>0.5 HOURS<br>4 HOURS<br>0.3 HP/100L |
| T60 | SOLID/LIQUID EXTRACTION | LIQUID/LIQUID RATIO<br>EXTRACTION TEMPERATURE<br>DURATION<br>MIX ENERGY | | 1 L EXTRACTION/L PRODUCT<br>4 C<br>4 HOURS<br>0.3 HP/100 L |

FIG. 20B

| GROUP 2 | | | GROUP 3 | | |
|---|---|---|---|---|---|
| PARAMETER | SOLN. | | PARAMETER | SOLN. | |
| | | | | | |
| DAYS TO CONFLUENCE | | 2 DAYS<br>2 DAYS | | | |
| SERUM CONTENT<br>FEED RATE<br>DAYS TO CONFLUENCE | | 2% FBS<br>1 FEED PER VESSEL PER<br>2 DAYS<br>2 DAYS | AMPLIFICATION FACTOR | | 1 |
| | | | | | |
| | | | STEP RECOVERY OF PRODUCT<br>STEP RECOVERY OF T.P.<br>CIP<br>SIP | | 0.95<br>95%<br>Y<br>Y<br>Y |
| EXPOSURE TIME | | 50% HOURS | STEP RECOVERY OF PRODUCT<br>STEP RECOVERY OF T.P.<br>TEMPERATURE REGULATION<br>CIP<br>SIP | | 0.95<br>100%<br>Y<br>Y<br>Y |
| PHASE SEPARATION TIME<br>PRODUCT PHASE (TOP/BOTTOM)<br>HARVEST TIME | | 1600% HOURS<br>TOP<br>0.5 HOURS | STEP RECOVERY OF PRODUCT<br>STEP RECOVERY OF T.P.<br>TEMPERATURE REGULATION<br>CIP<br>SIP | | 0.9<br>50%<br>Y<br>Y<br>Y |
| PHASE SEPARATION TIME<br>PRODUCT PHASE (TOP/BOTTOM)<br>HARVEST TIME | | 1600% HOURS<br>TOP<br>0.5 HOURS | STEP RECOVERY OF PRODUCT<br>STEP RECOVERY OF T.P.<br>TEMPERATURE REGULATION<br>CIP<br>SIP | | 0.9<br>50%<br>Y<br>Y<br>Y |

| UOP Seq. No. | Code | Unit Operation Type | Process Design Cycles | | | | | | | | | |
|---|---|---|---|---|---|---|---|---|---|---|---|---|
| | | | Unit Op | | Unit Op Cluster | | | | Batch | | | |
| | | | | Offset (Hrs) | | UnOp Start | UnOp End | Offset (Hrs) | | UnOp Start | UnOp End | Offset (Hrs) |
| 1 | 68 | STR-Suspension Production | 1 | 0 | 1 | | | 0 | 1 | | | 0 |
| 2 | 74 | Harvest/Feed-Suspension Production | 3 | 24 | 1 | | | 0 | 20 | 2 | 4 | 72 |
| 3 | 34 | Tangential Flow-Clarification | 1 | 0 | 1 | | | 0 | 20 | 2 | 4 | 72 |
| 4 | 47 | Dilution | 1 | 0 | 1 | | | 0 | 20 | 2 | 4 | 72 |
| 5 | 99 | End | | | | | | | | | | |

| UOP Seq. No. | Code | Unit Operation Type | Process Design Cycles | | | | | | | | |
|---|---|---|---|---|---|---|---|---|---|---|---|
| | | | Unit Op | | Unit Op Cluster | | | | Batch | | |
| | | | | Offset (Hrs) | | UnOp Start | UnOp End | Offset (Hrs) | | UnOp Start | UnOp End | Offset (Hrs) |
| 10301 | 87 | Pool | 1 | | 1 | | | | 1 | | | |
| 10302 | 51 | Heat Exchange | 1 | | 1 | | | | 1 | | | |
| 10303 | 26 | Cont. Centrifugation - Solids Harvest | 1 | | 1 | | | | 1 | | | |
| 10304 | 48 | Resolubilization | 1 | | 1 | | | | 1 | | | |
| 10305 | 61 | Inlet Heat Exchange | 1 | | 3 | 5 | 7 | | 1 | | | |
| 10306 | 31 | High Pressure Homogenization | 1 | | 3 | 5 | 7 | S | 1 | | | |
| 10307 | 51 | Outlet Heat Exchange | 1 | | 3 | 5 | 7 | S | 1 | | | |
| 10308 | 29 | Batch Centrifugation - Solids Harvest | 1 | | 1 | | | | 1 | | | |
| 10309 | 29 | Dilution - IB Wash | 1 | | 2 | 9 | 10 | | 1 | | | |
| 10310 | 29 | Batch Centrifugation - Solids Harvest | 1 | | 2 | 9 | 10 | | 1 | | | |
| 10311 | 63 | Storage | 1 | | 1 | | | | 1 | | | |
| 10312 | 99 | End | 1 | | 1 | | | | 1 | | | |
| 2202 | 2204 | 2206 | 2208 | 2210 | 2212 | 2214 | 2216 | 2218 | 2220 | 2222 | 2224 | 2226 |

FIG. 22

| OPERATION | CALCULATIONS | | | | |
|---|---|---|---|---|---|
| 1.1.1.1 176 MUTI-STAGE POOL | LINK | | | | |
| | SOURCE | | | | |
| SET UP | | | | | |
| INPUT 1 | PE-0102e | 20272.98 LITERS @ | 104.00 HOURS, TRANSFER IN | 0.0 HOURS= | 0.0 LPM |
| INPUT 2 | | 0 LITERS @ | 0.00 HOURS, TRANSFER IN | 0.0 HOURS= | 0.0 LPM |
| INPUT 3 | | 0 LITERS @ | 0.00 HOURS, TRANSFER IN | 0.0 HOURS= | 0.0 LPM |
| INPUT 4 | | 0 LITERS @ | 0.00 HOURS, TRANSFER IN | 0.0 HOURS= | 0.0 LPM |
| INPUT 5 | | 0 LITERS @ | 0.00 HOURS, TRANSFER IN | 0.0 HOURS= | 0.0 LPM |
| INPUT 6 | | 0 LITERS @ | 0.00 HOURS, TRANSFER IN | 0.0 HOURS= | 0.0 LPM |
| POOL INPUTS | | 20272.98 LITERS IN | 0.00 HOURS, TRANSFER IN | 0.0 HOURS= | 0.0 LPM |
| SUB TOTAL | | | 104.00 TOTAL TRANSFER | 0 HOURS | LPM MISC. |
| 2.1.1.1 51 OUTLET HEAT EXCHANGE | | | | | |
| SET UP | | | | | |
| TRANSFER | 20,273.0 L IN | 2.50 HRS = | 135.2 LPM | | |
| WASH | | | | | |
| CIP | | | | | |
| SIP | | | | | |
| CLEAN UP | | | | | |
| SUB TOTAL | | | 135.2 | | |
| 3.1.1.1 26 CONT. CERT/SOLIDS | | | | | |
| SET UP | | | | | |
| CENTRIFUGATION | 20,273.0 L IN | 5.00 HRS = | 56.3 LPM | | |
| WASH | 30.0 L IN | 0.01 HRS = | 56.3 LPM | | |
| CIP | | | | | |
| SIP | | | | | |
| CLEAN UP | | | | | |
| SUB TOTAL | | | 56.3 LPM | | |
| 4.1.1.1 48 RESOLUBILIZATION | | | | | |
| SET UP | | | | | |
| DILUTION | 6,476.0 L IN | 3.0 HOURS | 38.0 LPM | | |
| MO | | 0.0 HOURS | | | |
| CIP | | | | | |
| SIP | | | | | |
| CLEAN UP | | | | | |
| SUB TOTAL | | | 36.0 | | |
| 5.1.1.1 61 INLET HEAT EXCHANGE | | | | | |
| SET UP | | | | | |
| TRANSFER | 8,634.7 L IN | 2.5 HRS = | 57.56 LPM | | |
| WASH | 0.0 L IN | 0.0 HRS = | 0.0 LPM | | |

PROCESS TIME LINE

| DURATION (HRS) | | | REL. TIME SCALE (HRS) | | | ABS. HOURS | | ABS. DAYS | | START | | FINISH | |
|---|---|---|---|---|---|---|---|---|---|---|---|---|---|
| CALC. | LOG | ADJ. | PREP | EXEC. | COMPL. | START | END | START | END | DATE | TIME | DATE | TIME |
| 0.0 | 0.0 | 0.0 HRS | 104.0 | | | 104.0 | 104.0 | 4.33 | 4.33 | 01/08/99 | 06:00 AM | 01/08/99 | 08:00 AM |
| 0.0 | 0.0 | 0.0 HRS | | 104.0 | | 104.0 | 104.0 | 4.33 | 4.33 | 01/08/99 | 06:00 AM | 01/08/99 | 08:00 AM |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | 104.0 | | 104.0 | 104.0 | 4.33 | 4.33 | 01/08/99 | 06:00 AM | 01/08/99 | 08:00 AM |
| 0.0 | | 0.0 HRS | | 104.0 | | | 0.0 | | | 01/08/99 | 06:00 AM | 01/08/99 | 08:00 AM |
| | | | | | | | | | | HRS/CY | 0.0 | | |
| | | | | | | | | | | OK | | | |
| 1.0 | 0.0 | 1.0 HRS | 104.0 | | | 103.0 | 104.0 | 4.28 | 4.33 | 01/08/99 | 07:00 AM | 01/08/99 | 08:00 AM |
| 2.50 | 0.0 | 2.5 HRS | | 106.5 | | 104.0 | 105.5 | 4.33 | 4.44 | 01/08/99 | 08:00 AM | 01/08/99 | 10:30 AM |
| 0.63 | 0.0 | 0.5 HRS | | 107.1 | | 106.5 | 107.1 | 4.44 | 4.46 | 01/08/99 | 10:30 AM | 01/08/99 | 11:07 AM |
| 0.0 | 0.0 | 0.0 HRS | | | 107.1 | 107.1 | 107.1 | 4.46 | 4.46 | 01/08/99 | 11:07 AM | 01/08/99 | 11:07 AM |
| 0.0 | 0.0 | 0.0 HRS | | | 107.1 | 107.1 | 107.1 | 4.46 | 4.46 | 01/08/99 | 11:07 AM | 01/08/99 | 11:07 AM |
| 2.0 | 0.0 | 2.0 HRS | | | 109.1 | 107.1 | 109.1 | 4.46 | 4.55 | 01/08/99 | 11:07 AM | 01/08/99 | 01:07 PM |
| 5.1 | | 5.1 HRS | | 106.5 | | | | | | 01/08/99 | 07:00 AM | 01/08/99 | 01:07 PM |
| | | | | | | | | | | HRS/CY | 5.1 | | |
| | | | | | | | | | | OK | | | |
| 1.0 | 0.0 | 1.0 HRS | 105.6 | | | 105.6 | 106.5 | 4.00 | 4.44 | 01/08/99 | 09:30 AM | 01/08/99 | 10:30 AM |
| 6.0 | 0.0 | 6.0 HRS | | 112.5 | | 106.5 | 112.5 | 4.64 | 4.64 | 01/08/99 | 10:30 AM | 01/08/99 | 04:30 PM |
| 0.0 | 0.0 | 0.0 HRS | | 112.5 | | 112.5 | 112.5 | 4.68 | 4.68 | 01/08/99 | 04:10 PM | 01/08/99 | 04:30 PM |
| 0.0 | 0.0 | 0.0 HRS | | | 112.5 | 112.5 | 112.5 | 4.68 | 4.68 | 01/08/99 | 04:10 PM | 01/08/99 | 04:30 PM |
| 0.0 | 0.0 | 0.0 HRS | | | 112.5 | 112.5 | 112.5 | 4.68 | 4.68 | 01/08/99 | 04:30 PM | 01/08/99 | 04:30 PM |
| 0.0 | 0.0 | 0.0 HRS | | | 112.5 | 112.5 | 112.5 | 4.68 | 4.68 | 01/08/99 | 04:30 PM | 01/08/99 | 04:30 PM |
| 7.0 | | 7.0 HRS | | 112.5 | | | 112.5 | | | 01/08/99 | 09:30 AM | 01/08/99 | 04:30 PM |
| | | | | | | | | | | HRS/CY | 3.0 | | |
| | | | | | | | | | | OK | | | |
| 1.0 | 0.0 | 1.0 HRS | 112.6 | | | 111.0 | 112.0 | 4.85 | 4.68 | 01/08/99 | 03:30 PM | 01/08/99 | 04:30 PM |
| 3.00 | 0.0 | 3.0 HRS | | 115.5 | | 112.5 | 115.5 | 4.88 | 4.81 | 01/08/99 | 04:30 PM | 01/08/99 | 07:30 PM |
| 0.00 | 0.0 | 0.0 HRS | | 115.5 | | 115.5 | 115.5 | 4.81 | 4.81 | 01/08/99 | 07:30 PM | 01/08/99 | 07:30 PM |
| 0.0 | 0.0 | 0.0 HRS | | | 115.5 | 115.5 | 115.5 | 4.81 | 4.81 | 01/08/99 | 07:30 PM | 01/08/99 | 07:30 PM |
| 0.00 | 0.0 | 0.0 HRS | | | 115.5 | 115.5 | 115.5 | 4.81 | 4.81 | 01/08/99 | 07:30 PM | 01/08/99 | 07:30 PM |
| 1.00 | 0.0 | 1.0 HRS | | | 116.5 | 115.5 | 118.5 | 4.81 | 4.85 | 01/08/99 | 07:30 PM | 01/08/99 | 08:30 PM |
| 5.00 | | 5.00 HRS | | 115.5 | | | | | | 01/08/99 | 03:30 PM | 01/08/99 | 08:30 PM |
| | | | | | | | | | | HRS/CY | 5.0 | | |
| | | | | | | | | | | OK | | | |
| 1.0 | 0.0 | 1.0 HRS | 115.5 | | | 114.5 | 115.5 | 4.77 | 4.81 | 01/08/99 | 06:30 PM | 01/08/99 | 07:30 PM |
| 2.50 | 0.0 | 2.5 HRS | | 118.0 | | 115.5 | 118.0 | 4.81 | 4.92 | 01/08/99 | 07:30 PM | 01/08/99 | 10:00 PM |
| 0.00 | 0.0 | 0.0 HRS | | 118.0 | | 118.0 | 118.0 | 4.92 | 4.92 | 01/08/99 | 10:00 PM | 01/08/99 | 10:00 PM |

| OPERATION | CALCULATIONS | | |
|---|---|---|---|
| CIP<br>SIP<br>CLEAN UP | | | |
| SUB TOTAL | | 57.6 | |
| 6.1.1.1 31 HOMMOGENIZATION | | | |
| SET UP | | | |
| LYCIS | 3834.7 L IN | 2.5 HRS = | 57.6 LPM |
| WASH | 0.0 L IN | 0.0 HRS = | 0.0 LPM |
| CIP<br>SIP<br>CLEAN UP | | | |
| SUB TOTAL | | 57.564344 | |
| 7.1.1.1 51 OUTLET HEAT EXCHANGE | | | |
| SET UP | | | |
| TRANSFER | 3543.7 L IN | 2.5 HRS = | 57.58 LPM |
| WASH | 0.0 L IN | 0.0 HRS = | 0.0 LPM |
| CIP<br>SIP<br>CLEAN UP | | | |
| SUB TOTAL | | | 57.56 |
| 5.1.2.1 61 INLET HEAT EXCHANGE | | | |
| SET UP | | | |
| TRANSFER | 8634.7 L IN | 2.5 HRS = | 57.56 LPM |
| WASH | 0.0 L IN | 0.0 HRS = | 0.0 LPM |
| CIP<br>SIP<br>CLEAN UP | | | |
| SUB TOTAL | | | |
| 6.1.2.1 31 HOMMOGENIZATION | | | |
| SET UP | | | |
| DILUTION | 6834.7 L IN | 2.5 HRS = | 57.6 LPM |
| MO | 0.0 L IN | 0.0 HRS = | 0.0 LPM |
| CIP<br>SIP<br>CLEAN UP | | | |
| SUB TOTAL | | 57.56 | |
| 7.1.2.1 51 OUTLET HEAT EXCHANGE | | | |

FIG.23B-1

| PROCESS TIME LINE | | | | | | | | | | | | | |
|---|---|---|---|---|---|---|---|---|---|---|---|---|---|
| DURATION (HRS) | | | REL. TIME SCALE (HRS) | | | ABS. HOURS | | ABS. DAYS | | START | | FINISH | |
| CALC. | LOG | ADJ. | PREP | EXEC. | COMPL. | START | END | START | END | DATE | TIME | DATE | TIME |
| 0.0 | 0.0 | 0.0 HRS | | | 118.0 | 118.0 | 118.0 | 4.92 | 4.92 | 01/08/99 | 10:00 PM | 01/08/99 | 10:00 PM |
| 0.0 | 0.0 | 0.0 HRS | | | 118.0 | 118.0 | 118.0 | 4.92 | 4.92 | 01/08/99 | 10:00 PM | 01/08/99 | 10:00 PM |
| 0.0 | 0.0 | 0.0 HRS | | | 118.0 | 118.0 | 118.0 | 4.92 | 4.92 | 01/08/99 | 10:00 PM | 01/08/99 | 10:00 PM |
| 2.5 | | 2.5 HRS | | 116.0 | | | | | | 01/08/99 | 06:30 PM | 01/08/99 | 10:00 PM |
| | | | | | | | | | | HRS/CY | 3.5 | | |
| | | | | | | | | | | OK | | | |
| 1.0 | 0.0 | 1.0 HRS | 118.0 | | | 117.0 | 118.0 | 4.88 | 4.92 | 01/08/99 | 08:00 AM | 01/08/99 | 10:00 PM |
| 2.5 | 0.0 | 2.5 HRS | | 120.5 | | 118.0 | 120.5 | 4.92 | 5.02 | 01/08/99 | 10:00 PM | 01/08/99 | 12:30 AM |
| 0.00 | 0.0 | 0.0 HRS | | 120.5 | | 120.5 | 120.5 | 5.02 | 5.02 | 01/08/99 | 12:30 AM | 01/08/99 | 12:30 AM |
| 0.0 | 0.0 | 0.0 HRS | | | 120.5 | 120.5 | 120.5 | 5.02 | 5.02 | 01/08/99 | 12:30 AM | 01/08/99 | 12:30 AM |
| 0.0 | 0.0 | 0.0 HRS | | | 120.5 | 120.5 | 120.5 | 5.02 | 5.02 | 01/08/99 | 12:30 AM | 01/08/99 | 12:30 AM |
| 0.0 | 0.0 | 0.0 HRS | | | 120.5 | 120.5 | 120.5 | 5.02 | 5.02 | 01/08/99 | 12:30 AM | 01/08/99 | 12:30 AM |
| 3.5 | | 3.5 HRS | | 120.5 | | | 120.5 | | | 01/08/99 | 09:00 PM | 01/08/99 | 12:30 AM |
| | | | | | | | | | | HRS/CY | 3.5 | | |
| | | | | | | | | | | OK | | | |
| 1.0 | 0.0 | 1.0 HRS | 120.5 | | | 118.5 | 120.0 | 4.88 | 5.02 | 01/08/99 | 11:30 PM | 01/08/99 | 12:30 AM |
| 2.50 | 0.0 | 2.5 HRS | | 123.0 | | 120.5 | 123.0 | 5.02 | 5.13 | 01/08/99 | 12:30 AM | 01/08/99 | 03:00 AM |
| 0.00 | 0.0 | 0.0 HRS | | 123.0 | | 123.0 | 123.0 | 5.13 | 5.13 | 01/08/99 | 03:00 AM | 01/08/99 | 03:00 AM |
| 0.0 | 0.0 | 0.0 HRS | | | 123.0 | 123.0 | 123.0 | 5.13 | 5.13 | 01/08/99 | 03:00 AM | 01/08/99 | 03:00 AM |
| 0.0 | 0.0 | 0.0 HRS | | | 123.0 | 123.0 | 123.0 | 5.13 | 5.13 | 01/08/99 | 03:00 AM | 01/08/99 | 03:00 AM |
| 0.0 | 0.0 | 0.0 HRS | | | 123.0 | 123.0 | 123.0 | 5.13 | 5.13 | 01/08/99 | 03:00 AM | 01/08/99 | 03:00 AM |
| 2.5 | | 2.5 HRS | | 123.0 | | | | | | 01/08/99 | 11:30 PM | 01/08/99 | 03:00 AM |
| | | | | | | | | | | HRS/CY | 3.5 | | |
| | | | | | | | | | | OK | | | |
| 0.0 | 0.0 | 0.0 HRS | 123.0 | | | 123.0 | 123.0 | 5.13 | 5.13 | 01/08/99 | 03:00 AM | 01/08/99 | 03:00 AM |
| 2.50 | 0.0 | 2.5 HRS | | 125.5 | | 123.0 | 125.5 | 5.13 | 5.23 | 01/08/99 | 03:00 AM | 01/08/99 | 05:30 AM |
| 0.00 | 0.0 | 0.0 HRS | | 125.5 | | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 2.5 | | 2.5 HRS | | 125.5<br>01F895 | | | | | | 01/08/99 | 03:00 AM | 01/08/99 | 05:30 AM |
| | | | | | | | | | | HRS/CY | 2.5 | | |
| | | | | | | | | | | OK | | | |
| 1.0 | 0.0 | 0.0 HRS | 123.0 | | | 123.0 | 123.0 | 5.13 | 5.13 | 01/08/99 | 03:00 AM | 01/08/99 | 03:00 AM |
| 2.5 | 0.0 | 2.5 HRS | | 125.5 | | 123.0 | 125.5 | 5.13 | 5.23 | 01/08/99 | 03:00 AM | 01/08/99 | 05:30 AM |
| 0.00 | 0.0 | 0.0 HRS | | 125.5 | | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 2.5 | | 2.5 HRS | | 125.5 | | | 125.5 | | | 01/08/99 | 03:00 AM | 01/08/99 | 05:30 AM |
| | | | | | | | | | | HRS/CY | 2.5 | | |
| | | | | | | | | | | OK | | | |

FIG. 23B-2

| OPERATION | CALCULATIONS | | | |
|---|---|---|---|---|
| SET UP | | | | |
| TRANSFER | 8543.7 L IN | 2.5 HRS | = | 57.56 LPM |
| WASH | 0.0 L IN | 0.0 HRS | = | 0.0 LPM |
| CIP | | | | |
| SIP | | | | |
| CLEAN UP | | | | |
| SUB TOTAL | | | | |
| 5.1.3.1 61 INLET HEAT EXCHANGE | | | | |
| SET UP | | | | |
| TRANSFER | 8634.7 L IN | 2.5 HRS | = | 57.58 LPM |
| WASH | 9.0 L IN | 0.0 HRS | = | 57.6 LPM |
| CIP | | | | |
| SIP | | | | |
| CLEAN UP | | | | |
| SUB TOTAL | | | | |
| 6.1.3.1 31 HOMMOGENIZATION | | | | |
| SET UP | | | | |
| LYCIS | 8634.7 L IN | 2.5 HRS | = | 57.6 LPM |
| WASH | 9.0 L IN | 0.0 HRS | = | 57.6 LPM |
| CIP | | | | |
| SIP | | | | |
| CLEAN UP | | | | |
| SUB TOTAL | | | | 57.56 LPM |
| 7.1.3.1 51 OUTLET HEAT EXCHANGE | | | | |
| SET UP | | | | |
| TRANSFER | 8643.7 L IN | 2.5 HRS | = | 57.50 LPM |
| WASH | 9.0 L IN | 0.0 HRS | = | 57.6 LPM |
| CIP | | | | |
| SIP | | | | |
| CLEAN UP | | | | |
| SUB TOTAL | | | | |

FIG.23C-1

| PROCESS TIME LINE | | | | | | | | | | | | | |
|---|---|---|---|---|---|---|---|---|---|---|---|---|---|
| DURATION (HRS) | | | REL. TIME SCALE (HRS) | | | ABS. HOURS | | ABS. DAYS | | START | | FINISH | |
| CALC. | LOC | ADJ. | PREP | EXEC. | COMPL. | START | END | START | END | DATE | TIME | DATE | TIME |
| 0.0 | 0.0 | 0.0 HRS | 123.0 | | | 123.0 | 123.0 | 5.13 | 5.13 | 01/08/99 | 03:00 AM | 01/08/99 | 03:00 AM |
| 2.50 | 0.0 | 2.5 HRS | | 125.5 | | 123.0 | 125.5 | 5.13 | 5.23 | 01/08/99 | 03:00 AM | 01/08/99 | 05:30 AM |
| 0.00 | 0.0 | 0.0 HRS | | 125.5 | | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 2.5 | | 2.5 HRS | | 125.5 | | | | | | 01/08/99 | 03:00 AM | 01/08/99 | 05:30 AM |
| | | | | | | | | | | HRS/CY | 2.5 | | |
| | | | | | | | | | | OK | | | |
| 0.0 | 0.0 | 0.0 HRS | 125.5 | | | 125.5 | 125.5 | 5.23 | 5.23 | 01/08/99 | 05:30 AM | 01/08/99 | 05:30 AM |
| 2.50 | 0.0 | 2.5 HRS | | 128.0 | | 125.5 | 128.0 | 5.33 | 5.33 | 01/08/99 | 05:30 AM | 01/08/99 | 08:00 AM |
| 0.0 | 0.0 | 0.0 HRS | | 128.0 | | 128.0 | 128.0 | 5.33 | 5.33 | 01/08/99 | 08:00 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 2.5 | | 2.5 HRS | | 128.0 | | | | | | 01/08/99 | 05:30 AM | 01/08/99 | 08:01 AM |
| | | | | | | | | | | HRS/CY | 2.5 | | |
| | | | | | | | | | | OK | | | |
| 0.0 | 0.0 | 0.0 HRS | 125.5 | | | 125.5 | 125.5 | 5.23 | 5.23 | 01/08/99 | 05:30 AM | 01/08/99 | 05:30 AM |
| 2.5 | 0.0 | 2.5 HRS | | 128.0 | | 125.5 | 128.0 | 5.23 | 5.33 | 01/08/99 | 05:30 AM | 01/08/99 | 08:00 AM |
| 0.0 | 0.0 | 0.0 HRS | | 128.0 | | 128.0 | 128.0 | 5.33 | 5.33 | 01/08/99 | 08:00 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 2.5 | | 2.5 HRS | | 128.0 | | | 128.0 | | | 01/08/99 | 05:30 AM | 01/08/99 | 08:01 AM |
| | | | | | | | | | | HRS/CY * | 2.5 | | |
| | | | | | | | | | | OK | | | |
| 0.0 | 0.0 | 0.0 HRS | 125.5 | | | 125.5 | 125.5 | 5.23 | 5.23 | 01/08/99 | 05:30 AM | 01/08/99 | 05:30 AM |
| 2.50 | 0.0 | 2.5 HRS | | 128.0 | | 125.5 | 128.0 | 5.23 | 5.33 | 01/08/99 | 05:30 AM | 01/08/99 | 08:01 AM |
| 0.0 | 0.0 | 0.0 HRS | | 128.0 | | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 2.5 | | 2.5 HRS | | 128.0 | | | 128.0 | | | 01/08/99 | 05:30 AM | 01/08/99 | 08:01 AM |
| | | | | | | | | | | HRS/CY | 2.5 | | |
| | | | | | | | | | | OK | | | |

FIG.23C-2

| | FIRST SHIFT | | | | SECOND SHIFT | | | |
|---|---|---|---|---|---|---|---|---|
| | START 07:00 AM | | FINISH 03:00 PM | | START 03:00 PM | | FINISH 11:00 PM | |
| OPERATION | DATE | TIME | DATE | TIME | DATE | TIME | DATE | TIME |
| 1.1.1.1 T76 MULTI-STAGE POOL | 01/08/99 | 08:00 AM | 01/08/99 | 08:00 AM | | | | |
| | 01/08/99 | 08:00 AM | 01/08/99 | 08:00 AM | | | | |
| SET UP | | | | | | | | |
| INPUT 1 | | | | | | | | |
| INPUT 2 | | | | | | | | |
| INPUT 3 | | | | | | | | |
| INPUT 4 | | | | | | | | |
| INPUT 5 | | | | | | | | |
| INPUT 6 | | | | | | | | |
| POOL INPUTS | 01/08/99 | 08:00 AM | 01/08/99 | 08:00 AM | | | | |
| SUB TOTAL | | | | | | | | |
| 2.1.1.1 51 OUTLET HEAT EXCHANGE | | | | | | | | |
| SET UP | | | 01/08/99 | 08:00 AM | | | | |
| TRANSFER | 01/08/99 | 08:00 AM | 01/08/99 | 10:30 AM | | | | |
| WASH | 01/08/99 | 10:30 AM | 01/08/99 | 11:07 AM | | | | |
| CIP | 01/08/99 | 11:07 AM | 01/08/99 | 11:07 AM | | | | |
| SIP | 01/08/99 | 11:07 AM | 01/08/99 | 11:07 AM | | | | |
| CLEAN UP | 01/08/99 | 11:07 AM | 01/08/99 | 01:07 PM | | | | |
| SUB TOTAL | | | | | | | | |
| 3.1.1.1 26 CONT. CERT/SOLIDS | | | | | | | | |
| SET UP | 01/08/99 | 09:30 AM | 01/08/99 | 10:30 AM | | | 01/08/99 | 04:30 PM |
| CENTRIFUGATION | 01/08/99 | 10:30 AM | | | 01/08/99 | 04:30 PM | 01/08/99 | 04:30 PM |
| WASH | | | | | 01/08/99 | 04:30 PM | 01/08/99 | 04:30 PM |
| CIP | | | | | 01/08/99 | 04:30 PM | 01/08/99 | 04:30 PM |
| SIP | | | | | 01/08/99 | 04:30 PM | 01/08/99 | 04:30 PM |
| CLEAN UP | | | | | 01/08/99 | 04:30 PM | 01/08/99 | 04:30 PM |
| SUB TOTAL | | | | | | | | |
| 4.1.1.1 48 RESOLUBILIZATION | | | | | | | | |
| SET UP | | | | | 01/08/99 | 03:30 PM | 01/08/99 | 04:30 PM |
| DILUTION | | | | | 01/08/99 | 04:30 PM | 01/08/99 | 07:30 PM |
| MO | | | | | 01/08/99 | 07:30 PM | 01/08/99 | 07:30 PM |
| CIP | | | | | 01/08/99 | 07:30 PM | 01/08/99 | 07:30 PM |
| SIP | | | | | 01/08/99 | 07:30 PM | 01/08/99 | 07:30 PM |
| CLEAN UP | | | | | 01/08/99 | 07:30 PM | 01/08/99 | 08:30 PM |
| SUB TOTAL | | | | | | | | |
| 5.1.1.1 61 INLET HEAT EXCHANGE | | | | | | | | |
| SET UP | | | | | 01/08/99 | 06:30 PM | 01/08/99 | 07:30 PM |
| TRANSFER | | | | | 01/08/99 | 07:30 PM | 01/08/99 | 10:00 PM |
| WASH | | | | | 01/08/99 | 10:00 PM | 01/08/99 | 10:00 PM |

FIG.23D-1

| THIRD SHIFT | | | |
|---|---|---|---|
| START | 11:04 PM | FINISH | 04:07 AM |
| DATE | TIME | DATE | TIME |
| | | | |
| | | | |
| | | | |
| 01/08/99 | 07:00 AM | | |
| | | | |
| | | | |
| | | | |

FIG.23D-2

| | FIRST SHIFT | | | | SECOND SHIFT | | | |
|---|---|---|---|---|---|---|---|---|
| | START 07:00 AM | | FINISH 03:00 PM | | START 01:00 PM | | FINISH 11:00 PM | |
| OPERATION | DATE | TIME | DATE | TIME | DATE | TIME | DATE | TIME |
| | | | | | | | | |
| CIP | | | | | 01/08/99 | 10:00 PM | 01/08/99 | 10:00 PM |
| SIP | | | | | 01/08/99 | 10:00 PM | 01/08/99 | 10:00 PM |
| CLEAN UP | | | | | 01/08/99 | 10:00 PM | 01/08/99 | 10:00 PM |
| SUB TOTAL | | | | | | | | |
| 6.1.1.1 31 HOMMOGENIZATION | | | | | | | | |
| SET UP | | | | | 01/08/99 | 09:00 PM | 01/08/99 | 10:00 PM |
| LYCIS | | | | | 01/08/99 | 10:00 PM | | |
| WASH | | | | | | | | |
| CIP | | | | | | | | |
| SIP | | | | | | | | |
| CLEAN UP | | | | | | | | |
| SUB TOTAL | | | | | | | | |
| 7.1.1.1 51 OUTLET HEAT EXCHANGE | | | | | | | | |
| SET UP | | | | | | | | |
| TRANSFER | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 5.1.2.1 61 INLET HEAT EXCHANGE | | | | | | | | |
| SET UP | | | | | | | | |
| TRANSFER | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 6.1.2.1 31 HOMMOGENIZATION | | | | | | | | |
| SET UP | | | | | | | | |
| LYCIS | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 7.1.2.1 51 OUTLET HEAT EXCHANGE | | | | | | | | |

FIG.23E-1

| THIRD SHIFT | | | |
|---|---|---|---|
| START | 11:00 PM | FINISH | 08:00 AM |
| DATE | TIME | DATE | TIME |
| | | | |
| | | | |
| | | | |
| | | 01/08/99 | 12:30 AM |
| 01/08/99 | 12:30 AM | 01/08/99 | 12:30 AM |
| 01/08/99 | 12:30 AM | 01/08/99 | 12:30 AM |
| | | | |
| 01/08/99 | 11:30 PM | 01/08/99 | 12:30 AM |
| 01/08/99 | 12:30 AM | 01/08/99 | 03:00 AM |
| 01/08/99 | 03:00 AM | 01/08/99 | 03:00 AM |
| 01/08/99 | 03:00 AM | 01/08/99 | 03:00 AM |
| 01/08/99 | 03:00 AM | 01/08/99 | 03:00 AM |
| 01/08/99 | 03:00 AM | 01/08/99 | 03:00 AM |
| | | | |
| 01/08/99 | 03:00 AM | 01/08/99 | 03:00 AM |
| 01/08/99 | 03:00 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| | | | |
| 01/08/99 | 03:00 AM | 01/08/99 | 03:00 AM |
| 01/08/99 | 03:00 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| | | | |
| | | | |

FIG.23E-2

| | FIRST SHIFT | | | | SECOND SHIFT | | | |
|---|---|---|---|---|---|---|---|---|
| | START | 07:00 AM | FINISH | 03:00 PM | START | 03:00 PM | FINISH | 11:00 PM |
| OPERATION | DATE | TIME | DATE | TIME | DATE | TIME | DATE | TIME |
| | | | | | | | | |
| SET UP | | | | | | | | |
| TRANSFER | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 5.1.3.1 61 INLET HEAT EXCHANGE | | | | | | | | |
| SET UP | | | | | | | | |
| TRANSFER | | | 01/08/99 | 08:00 AM | | | | |
| WASH | 01/08/99 | 08:00 AM | 01/08/99 | 08:01 AM | | | | |
| CIP | 01/08/99 | 08:01 AM | 01/08/99 | 08:01 AM | | | | |
| SIP | 01/08/99 | 08:01 AM | 01/08/99 | 08:01 AM | | | | |
| CLEAN UP | 01/08/99 | 08:01 AM | 01/08/99 | 08:01 AM | | | | |
| SUB TOTAL | | | | | | | | |
| 6.1.3.1 31 HOMMOGENIZATION | | | | | | | | |
| SET UP | | | | | | | | |
| LYCIS | | | 01/08/99 | 08:00 AM | | | | |
| WASH | 01/08/99 | 08:00 AM | 01/08/99 | 08:01 AM | | | | |
| CIP | 01/08/99 | 08:01 AM | 01/08/99 | 08:01 AM | | | | |
| SIP | 01/08/99 | 08:01 AM | 01/08/99 | 08:01 AM | | | | |
| CLEAN UP | 01/08/99 | 08:01 AM | 01/08/99 | 08:01 AM | | | | |
| SUB TOTAL | | | | | | | | |
| 7.1.3.1 51 OUTLET HEAT EXCHANGE | | | | | | | | |
| SET UP | | | | | | | | |
| TRANSFER | | | 01/08/99 | 08:01 AM | | | | |
| WASH | 01/08/99 | 08:01 AM | 01/08/99 | 08:01 AM | | | | |
| CIP | 01/08/99 | 08:01 AM | 01/08/99 | 08:01 AM | | | | |
| SIP | 01/08/99 | 08:01 AM | 01/08/99 | 08:01 AM | | | | |
| CLEAN UP | 01/08/99 | 08:01 AM | 01/08/99 | 08:01 AM | | | | |
| SUB TOTAL | | | | | | | | |

FIG.23F-1

| THIRD SHIFT | | | |
|---|---|---|---|
| START | 11:00 PM | FINISH | 05:30 AM |
| DATE | TIME | DATE | TIME |
| | | | |
| 01/08/99<br>01/08/99<br>01/08/99<br>01/08/99<br>01/08/99<br>01/08/99 | 03:00 AM<br>03:00 AM<br>05:30 AM<br>05:30 AM<br>05:30 AM<br>05:30 AM | 01/08/99<br>01/08/99<br>01/08/99<br>01/08/99<br>01/08/99<br>01/08/99 | 03:00 AM<br>05:30 AM<br>05:30 AM<br>05:30 AM<br>05:30 AM<br>05:30 AM |
| | | | |
| 01/08/99<br>01/08/99 | 05:30 AM<br>05:30 AM | 01/08/99 | 05:30 AM |
| | | | |
| 01/08/99<br>01/08/99 | 05:30 AM<br>05:30 AM | 01/08/99 | 05:30 AM |
| | | | |
| 01/08/99<br>01/08/99 | 05:30 AM<br>05:30 AM | 01/08/99 | 05:30 AM |
| | | | |

FIG.23F-2

SYSTEM AND METHOD FOR SIMULATION AND MODELING OF BATCH PROCESS MANUFACTURING FACILITIES USING PROCESS TIME LINES

CROSS-REFERENCE TO RELATED APPLICATION

This application is a continuation-in-part application of and claims priority to U.S. patent application Ser. No. 09/019,777, filed Feb. 6, 1998, now U.S. Pat. No. 6,311,095, which claims priority to U.S. Provisional Patent Application No. 60/037,387, filed Feb. 7, 1997, the contents of both of which are incorporated herein by reference in their entirety.

BACKGROUND OF THE INVENTION

1. Field of the Invention

The present invention relates generally to the design of large scale batch manufacturing facilities, and specifically to the design of biopharmaceutical drug manufacturing processes.

2. Related Art

Biopharmaceutical plants produce biopharmaceutical products through biological methods. Typical biopharmaceutical synthesis methods are mammalian cell culture, microbial fermentation and insect cell culture. Occasionally, biopharmaceutical products are produced from natural animal or plant sources or by a synthetic technique called solid phase synthesis. Mammalian cell culture, microbial fermentation and insect cell culture involve the growth of living cells and the extraction of biopharmaceutical products from the cells or the medium surrounding the cells. Solid phase synthesis and crude tissue extraction are processes by which biopharmaceuticals are synthesized from chemicals or extracted from natural plant or animal tissues, respectively.

The process for producing biopharmaceuticals is complex. In addition to basic synthesis, additional processing steps of separation, purification, conditioning and formulation are required to produce the end product biopharmaceutical. Each of these processing steps includes additional unit operations. For example, the step of purification may include the step of Product Adsorption Chromatography, which may further include the unit operations of High Pressure Liquid Chromatography (HPLC), Medium Pressure Liquid Chromatography (MPLC), Low Pressure Liquid Chromatography (LPLC), etc. The production of biopharmaceuticals is complex because of the number, complexity and combinations of synthesis methods and processing steps possible. Consequently, the design of a biopharmaceutical plant is expensive.

Tens of millions of dollars can be misspent during the design and construction phases of biopharmaceutical plants due to inadequacies in the design process. Errors and inefficiencies are introduced in the initial design of the biopharmaceutical production process because no effective tools for modeling and simulating a biopharmaceutical production process exists. The inadequacies in the initial process design carry through to all phases of the biopharmaceutical plant design and construction. Errors in the basic production process design propagate through all of the design and construction phases, resulting in increased cost due to change orders late in the facility development project. For example, detailed piping and instrumentation diagrams (P&IDs) normally cost thousands of dollars per diagram. Problems in the biopharmaceutical production process design frequently necessitate the re-working of these detailed P&IDs. This adds substantially to the overall cost of design and construction of a biopharmaceutical plant.

There are generally three phases of biopharmaceutical plants which coincide with the different levels of drug approval by the FDA. A Clinical Phase I/II biopharmaceutical plant produces enough biopharmaceutical product to support both phase I and phase II clinical testing of the product which may involve up to a few hundred patients. A Clinical Phase III biopharmaceutical plant produces enough biopharmaceutical product to support two to three-thousand patients during phase III clinical testing. A Clinical Phase III plant will also produce enough of the biopharmaceutical drug to support an initial commercial offering upon the licensing of the drug by the FDA for commercial sale. The successive phases represent successively larger biopharmaceutical facilities to support full scale commercial production after product licensing. Often the production process design is repeated for each phase, resulting in increased costs to each phase of plant development.

The design, architecture and engineering of biopharmaceutical plants is a several hundred million dollars per year industry because of the complex nature of biopharmaceutical production. Design of biopharmaceutical plants occurs in discrete phases. The first phase is the conceptual design phase. The first step in the conceptual design phase is identifying the high-level steps of the process that will produce the desired biopharmaceutical. Examples of high-level steps are synthesis, separation, purification and conditioning. After the high-level process steps have been identified, the unit operations associated with each of the high-level steps are identified. Unit operations are discrete process steps that make up the high-level process steps. In a microbial fermentation process, for example, the high-level step of synthesis may include the unit operations of inoculum preparation, flask growth, seed fermentation and production fermentation.

The unit operation level production process is typically designed by hand and is prone to errors and inefficiencies. Often, in the conceptual design phase, the specifications for the final production process are not complete. Therefore some of the equipment design parameters, unit operation yields and actual production rates for the various unit operations must be estimated. These factors introduce errors into the initial design base of the production process. Additionally, since the production process is designed by hand, attempting to optimize the process for efficiency and production of biopharmaceutical products is impractically time consuming.

Scale calculations for each of the unit operations are performed to determine the size and capacity of the equipment necessary to produce the desired amount of product per batch. Included in the scale calculations is the number of batches per year needed to produce the required amount of biopharmaceutical product. A batch is a single run of the biopharmaceutical process that produces the product. Increasing the size and capacity of the equipment increases the amount of product produced per batch. The batch cycle time is the amount of time required to produce one batch of product. The amount of product produced in a given amount of time, therefore, is dependent upon the amount produced per batch, and the batch cycle time. The scale calculations are usually executed by hand to determine the size and capacity of the equipment that will be required in each of the unit operations. Since the scale calculations are developed from the original conceptual design parameters, they are also subject to the same errors inherent in the initial conceptual design base.

Typically a process flow diagram is generated after the scale calculations for the unit operations have been performed. The process flow diagram graphically illustrates the process equipment such as tanks and pumps necessary to accommodate the process for a given batch scale. The process flow diagram illustrates the different streams of product and materials through the different unit operations. Generally associated with the process flow diagram is a material balance table which shows the quantities of materials consumed and produced in each step of the biopharmaceutical production process. The material balance table typically includes rate information of consumption of raw materials and production of product. The process flow diagram and material balance table provides much of the information necessary to develop a preliminary equipment list. The preliminary equipment list shows the equipment necessary to carry out all of the unit operations in the manufacturing procedure. Since the process flow diagram, material balance table and preliminary equipment list are determined from the original conceptual design parameters, they are subject to the same errors inherent in the initial conceptual design base.

A preliminary facility layout for the plant is developed from the process flow diagram, material balance table and preliminary equipment list. The preliminary facility layout usually begins with a bubble or block diagram of the plant that illustrates the adjacencies of rooms housing different high-level steps, as well as a space program which dimensions out the space and square footage of the building. From this information a preliminary equipment layout for the plant is prepared. The preliminary equipment layout attempts to show all the rooms in the plant, including corridors, staircases, etc. Mechanical, electrical and plumbing engineers estimate the mechanical, electrical and plumbing needs, respectively, of the facility based on the facility design layout and the utility requirements of the manufacturing equipment. Since the preliminary facility layout is developed from the original conceptual design parameters, they are subject to the same errors inherent in the initial conceptual design base.

Typically the next phase of biopharmaceutical plant design is preliminary piping and instrumentation diagram (P&ID) design. Preliminary P&IDs are based on the process flow diagram from the conceptual design phase. Often the calculations on the process design are re-run and incorporated into the preliminary P&ID. The preliminary P&IDs incorporate the information from the material balance table with the preliminary equipment list to show the basic piping and instrumentation required to run the manufacturing process.

Detailed design is the next phase of biopharmaceutical plant design. Plans and specifications which allow vendors and contractors to bid on portions of the biopharmaceutical plant are developed during the detailed design. Detailed P&IDs are developed which schematically represent every detail of the process systems for the biopharmaceutical plant. The detailed P&IDs include for example, the size and components of process piping, mechanical, electrical and plumbing systems; all tanks, instrumentation, controls and hardware. A bill of materials and detailed specification sheets on all of the equipment and systems are developed from the P&IDs. Detailed facility architecture diagrams are developed that coincide with the detailed P&IDs and equipment specifications. The detailed P&IDs and facility construction diagrams allow builders and engineering companies to bid on the biopharmaceutical plant project. Since the preliminary and detailed P&IDs are developed from the original conceptual design parameters, they are subject to the same errors inherent in the initial conceptual design base. Reworking the preliminary and detailed P&IDs due to errors in the conceptual design phase can cost thousands of dollars per diagram.

The inability to accurately model and simulate the biopharmaceutical production process drives inaccurate initial design. Often, these inaccuracies result in changes to the design and construction diagrams at the plant construction site, or repair and reconstruction of the plant during the construction phase resulting in millions of dollars in additional cost.

What is needed, therefore, is a system and method for accurately simulating and modeling a biopharmaceutical production process. A method and system for simulating and modeling biopharmaceutical production process would allow designers to reduce the number of errors introduced into plant design at the earliest stages. Such a system and method would allow an engineer to validate the production process design and maximize the efficiency of the plant by finding the optimum equipment configurations. Such a system and method would generate detailed specifications for the equipment and process steps that would smooth the transition throughout all of the design phases and fix the cost of design and construction of a biopharmaceutical facility. The present invention can also be used for determining the cost of goods for a product.

SUMMARY OF THE INVENTION

The present invention satisfies the above-stated needs by providing a method and system for simulating and modeling of batch process manufacturing facilities using process time lines. The method includes the steps of identifying a production process sequence, the production process sequence including a plurality of subprocesses. At least one of the plurality of subprocesses includes a plurality of batch cycles, each of which includes a plurality of unit operations. Each of the unit operations are identified by unit operation identifiers. Next, the system and method retrieves the process parameter information from a master list for each of the unit operation identifiers in the process sequence. The process parameter information includes information on discrete tasks associated with each unit operation. After the steps of identifying and retrieving, the system and method generates a process schedule that identifies initiation and completion times for each of the discrete tasks in the process sequence. Next, a process time line using the operational parameters, the block flow diagram, the set of scheduling cycles for each of the sequence of unit operations is generated. The process time line is used as a tool for batch processing and facility design.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 3 illustrates a unit operation list for a microbial fermentation process.

FIG. 4 illustrates a unit operation list for a mammalian cell culture process.

FIGS. 6A-6B illustrate an exemplary process parameters table.

FIGS. 10–11 illustrate a high-level process time line according to the present invention.

FIGS. 12A–12H illustrate a detailed process time line according to the present invention.

FIGS. 14A-B–20A-B are detailed examples of a process parameters table showing a list of unit operations and their associated parameters.

FIG. 21 illustrates a refined unit operation list for a mammalian cell culture process according to an embodiment of the present invention.

FIG. 22 illustrates a refined unit operation list for a microbial fermentation process according to an embodiment of the present invention.

FIG. 23A–F illustrate a refined process time line for a mammalian cell culture process according an embodiment of the present invention.

DETAILED DESCRIPTION OF THE PREFERRED EMBODIMENTS

The preferred embodiment of the present invention is a computer based system and method for the simulation and modeling of batch process manufacturing facilities. The preferred embodiment is based on a method for generating scheduling information which accurately defines the complex manufacturing operations of batch manufacturing processes. This scheduling capability system allows the definition of manufacturing costs in a more detailed and accurate manner than previously possible. As a result, this invention allows the rapid and accurate evaluation of numerous batch manufacturing alternatives in order to arrive at an optimal process design early in a facility development project. In so doing the invention minimizes project cost over runs which result from inaccuracies that can carry forward from the early stages of design into construction. The invention also defines operations scheduling in a manner that improves the accuracy of material resource planning and preventative maintenance programs for operating manufacturing plants.

Figure 1:
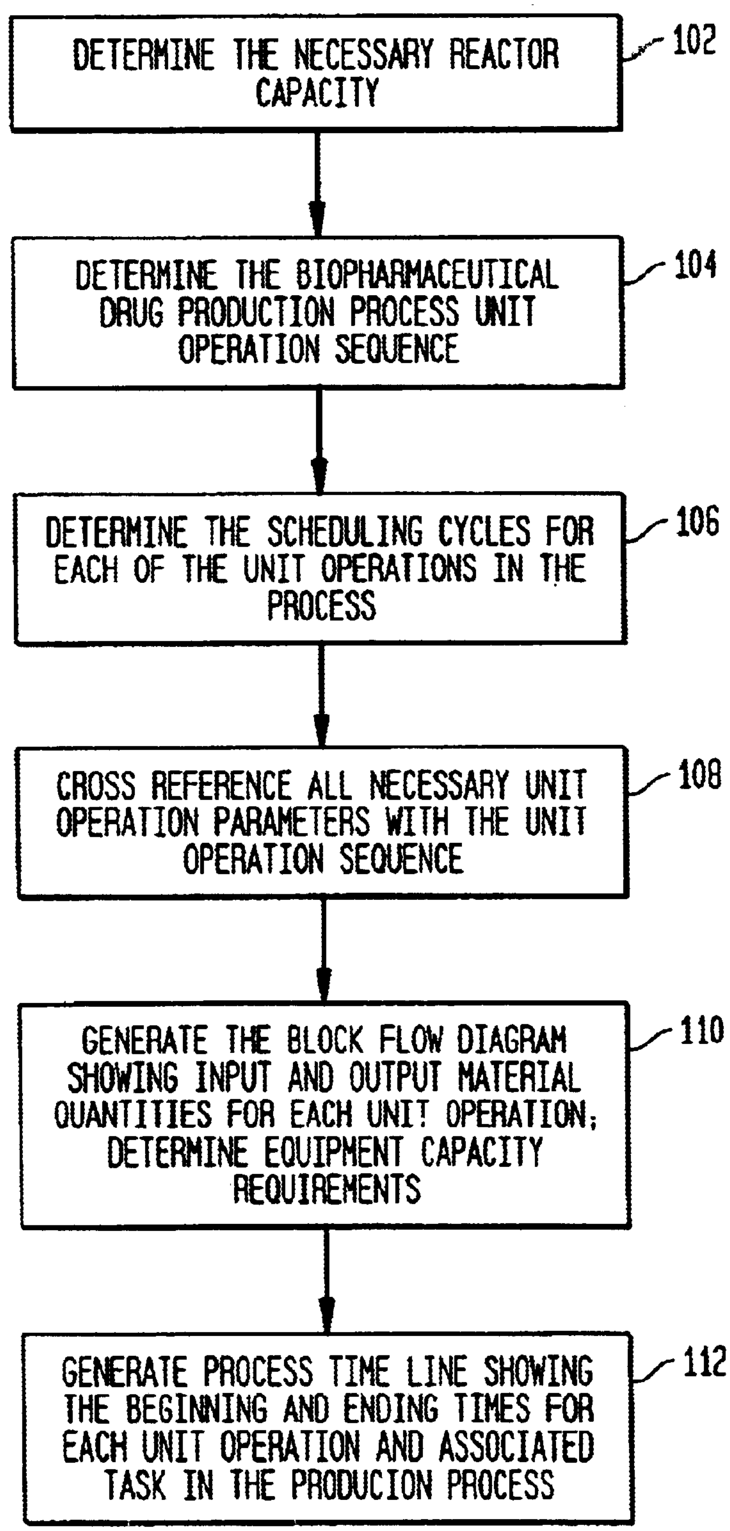
FIG. 1 illustrates a flow diagram of the process to generate a block flow diagram and a process time line according to the present invention.

FIG. 1 illustrates a high-level flow diagram of the preferred embodiment. The process begins by determining the necessary reactor vessel capacity at step 102. The reactor vessel is the container in which the crude product is first synthesized. For example, in mammalian cell culture processes, the reactor vessel houses the mammalian cells suspended in growth media. Next, the unit operation sequence for production of the biopharmaceutical product is determined at step 104. The unit operation sequence is the series of unit operations that are required to produce the biopharmaceutical product. Each unit operation is an individual step in the biopharmaceutical manufacturing process with an associated set of manufacturing equipment. The unit operation list is the list of unit operations that make up the unit operation sequence and their associated sequence information. The unit operation sequence information is the information that defines the scheduling cycles for each of the unit operations in the unit operation list. Scheduling cycles are iterations of unit operations in the unit operation sequence. Together, the unit operation list and the unit operation sequence information define the unit operation sequence. The desired biopharmaceutical product dictates the particular unit operations and their order in the biopharmaceutical production process. Some examples of unit operations are: inoculum preparation, initial seeding of the reactor vessel, solids harvest by centrifugation, high-pressure homogenization, dilution, etc.

Scheduling cycles and cycle offset duration for each of the unit operations in the biopharmaceutical production process are determined at step 106. Scheduling cycles are iterations of unit operations (the default being one (1)) in the unit operation sequence, and occur in three levels. Additionally, each level of scheduling cycle has an associated offset duration that dictates the time period between the beginnings of successive scheduling cycles.

"Cycles per Unit Operation" or preferably, "Unit Operation Cycles" (UC) is the first level of scheduling cycles. Unit Operation Cycles are defined as the number of iterations a unit operation is repeated in a process by itself before proceeding to the next unit operation. For example, the harvest and feed unit operation in a mammalian cell culture process has multiple Unit Operation Cycles. Product-rich media is drawn from the reactor vessel and nutrient-rich media is fed into the reactor vessel multiple times during one harvest and feed unit operation. The multiple draws of product-rich reactor media are pooled for processing in the next unit operation.

The second level of scheduling cycles is "Cycles per Batch" or preferably, "Unit Operation Cluster Cycles" (CC). Unit Operation Cluster Cycles are defined as the number of iterations a set of consecutive unit operations are repeated as a group before proceeding to the next unit operation after the set of consecutive unit operations. The set of consecutive unit operations repeated as a group are also referred to as a subprocess. For example, the set of unit operations including inoculum preparation, flask growth, seed fermentation, production fermentation, heat exchange, and continuous centrifugation/whole-cell harvest in a microbial fermentation process are often cycled together. Running through each of the six steps results in a single harvest from the microbial fermentation reactor vessel. Multiple harvests from a reactor vessel may be needed to achieve a batch of sufficient quantity. Each additional harvest is pooled with the previous harvest, resulting in a single batch of cell culture for the process.

The third level of scheduling cycles is "Cycles per Process" or preferably, "Batch Cycles" (BC). Batch Cycles are defined as the number of iterations a batch cycle is repeated for a process that employs continuous or semi-continuous product synthesis. In such a case, a single biopharmaceutical production process may result in multiple batches of product. For example, in a mammalian cell-culture process a single cell culture is typically in continuous production for 60–90 days. During this period multiple harvests of crude product are collected and pooled on a batch basis to be processed into the end product biopharmaceutical. The pooling of multiple harvests into a batch of material will occur several times during the cell culture period resulting in multiple Batch Cycles.

In step 108, a process parameters table master list is referenced to obtain all operational parameters for each unit operation in the unit operation list. The process parameters table contains a list of all unit operations and operational parameters necessary to simulate a particular unit operation. Examples of operational parameters are the solutions involved in a particular unit operation, temperature, pressure, duration, agitation, scaling volume, etc. Additionally, the process parameters table supplies all of the individual tasks and task durations involved in a particular unit operation. For example, the unit operation of inoculum preparation includes the individual tasks of setup, preincubation, incubation, and cleanup. Examples of unit operations for biopharmaceutical manufacturing and their associated operational parameters are shown in FIGS. 14A-B–20A-B.

A block flow diagram is generated at step 110 after unit operation list has obtained the operational parameters from the process parameters table at step 108. The block flow diagram illustrates each unit operation in the manufacturing process as a block with inputs for both incoming product and new material, as well as outputs for both processed product and waste. The block flow diagram is a simple yet convenient tool for quantifying material flows through the process in a way that allows the sizing of many key pieces of equipment relative to a given process scale.

The information in each block of the block flow diagram is generated from the parameters and sizing ratios from the process parameters table in the unit operation list, and block flow diagram calculation sets. A calculation set is a set of algebraic equations. The parameters and calculation sets are used to calculate the quantities of material inputs, product and waste outputs required for that unit operation based on the quantity of product material being received from the previous unit operation. Likewise, a given block flow diagram block calculates the quantity of product to be transferred to the next unit operation block in the manufacturing procedure. These calculations take into account the unit operation scheduling cycles identified at step 106, as further explained below.

A process time line is generated at step 112 after the block flow diagram is generated at step 110. The process time line is a very useful feature of the present invention. The process time line is generated from the unit operation list, the tasks associated with each of the unit operations, the scheduling cycles for each of the unit operations in the process, the process parameters from the master process parameters table and the volume of the material as calculated from the block flow diagram. The process time line is a relative time line in hours and minutes from the start date of the production process. The relative time is converted into days and hours to provide a time line for the beginning and ending times of each unit operation and its associated tasks for the entire biopharmaceutical drug production process.

The process time line is a very powerful tool for process design. The process time line can be used to accurately size pumps, filters and heat exchangers used in unit operations, by calculating the flow rate from the known transfer time and the volume of the material to be transferred, filtered or cooled. The process time line accurately predicts loads for labor, solution preparation, equipment cleaning, reagent, process utilities, preventative maintenance, quality control testing, etc.

Figure 2:
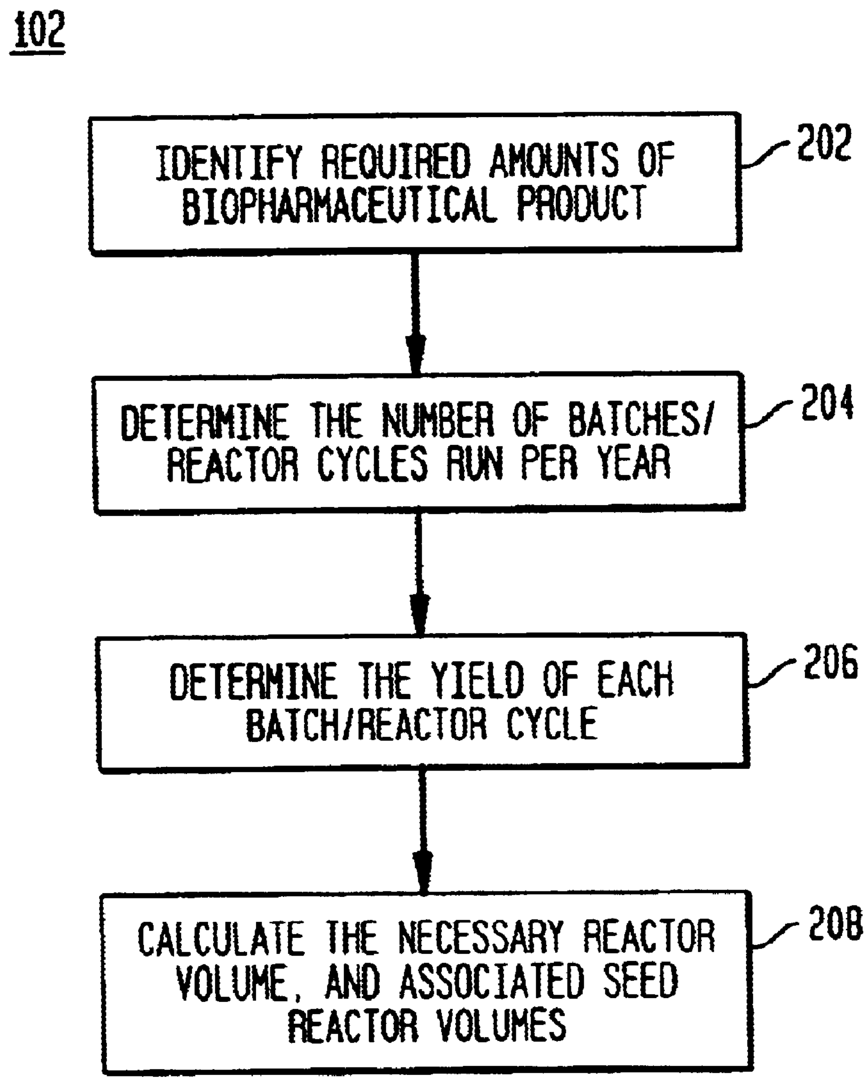
FIG. 2 illustrates a flow diagram of the process for determining the necessary reactor volume according to the present invention.

FIG. 2 further illustrates step 102 of determining the necessary reactor vessel capacity. The amount of biopharmaceutical product to be produced in a given amount of time is determined in step 202. Normally, the amount of biopharmaceutical product required is expressed in terms of mass produced per year. The number of reactor vessel runs for a particular biopharmaceutical product per year is determined at step 204. Factors considered when determining the number of reactor vessel cycles for a particular biopharmaceutical product are, for example, the number of biopharmaceutical products produced in the reactor vessel (i.e., the reactor vessel is shared to produce different products), the reaction time for each cycle of the reactor vessel and the percentage of up-time for the reactor vessel over the year.

The yield of each batch or reactor cycle is calculated at step 206. The yield from each batch or a reactor cycle is process-dependent and is usually expressed in grams of crude product per liter of broth. Given the required amount of biopharmaceutical product per year from step 202, the number of reactor cycles available to produce the required biopharmaceutical product from step 204, and the yield of each reactor cycle from step 206, the necessary reactor volume to produce the required amount of biopharmaceutical product is calculated at step 208.

FIG. 3 illustrates a unit operation list for an exemplary microbial fermentation biopharmaceutical production process. The far left-hand column, column 302, lists the unit operation sequence numbers for each of the unit operations in the process. The exemplary microbial fermentation unit operation list includes 23 unit operations. The unit operation sequence number defines the order in which the unit operations occur. For example, unit operation sequence number 1, inoculum preparation, occurs first, before unit operation sequence number 2, flask growth. Column 304 shows the unit operation identifier codes associated with each of the unit operations in the unit operation list (see step 108). The unit operation identifier codes are used to bring operational parameters from the process parameters table into the unit operation list. For example, heat exchange, unit operation list numbers 5, 8 and 10, has a unit operation identifier code 51.

As described above with reference to FIG. 1, after the unit operation sequence for a particular biopharmaceutical production process has been determined at step 104, the scheduling cycles associated with each unit operation is determined at step 106. Columns 306, 310 and 318 list the number of scheduling cycles for the microbial fermentation process of FIG. 3. Scheduling cycles are iterations of unit operations in the unit operation sequence, and occur in three levels. Additionally, each level of scheduling cycle has an associated offset duration that dictates the time period between the beginnings of successive scheduling cycles, shown in columns 308, 316 and 324. The latter two levels of scheduling cycles have an associated unit operation starting point and unit operation end point. That is, columns 312 and 314 specify the start and end unit operations, respectively, for Unit Operation Cluster Cycles, and columns 320 and 322 specify the start and end unit operations, respectively, for Batch Cycles.

Column 306 lists the number of Unit Operation Cycles for each of the unit operations in the microbial fermentation unit operation sequence. In the exemplary microbial fermentation unit operation sequence, each of the unit operations has only one cycle per unit operation. Again, Unit Operation Cycles define the number of iterations a unit operation is repeated in a process by itself before proceeding to the next unit operation.

Column 308 lists the cycle offset duration in hours for the Unit Operation Cycles. Since each of the unit operations in the microbial fermentation example of FIG. 3 has only one cycle per unit operation, there is no cycle offset duration for any of the unit operations. Cycle offset duration defines the time period between the beginnings of successive scheduling cycles.

Column 310 lists the Unit Operation Cluster Cycles for each of the unit operations in the microbial fermentation unit operation sequence. Unit operation sequence numbers 1–6 are defined as having three Unit Operation Cluster Cycles. Unit Operation Cluster Cycles defines the number of iterations a set of consecutive unit operations are repeated as a group before proceeding to the next unit operation. In FIG. 3, for example, the set of unit operations 1–6, as defined in unit operation start column 312 and unit operation end column 314, cycle together as a group (e.g., the sequence of unit operations for the exemplary microbial fermentation process is 1, 2, 3, 4, 5, 6, 1, 2, 3, 4 ,5, 6, 1, 2, 3, 4, 5, 6 and 7). Unit operations 1–6 cycle together as a group three times before the process continues to unit operation 7, as defined in column 310.

After unit operation sequence numbers 1–6 have cycled consecutively three times, the microbial fermentation production process continues at unit operation sequence number 7, resuspension of cell paste. After unit operation sequence number 7, the process continues with three Unit Operation Cluster Cycles of unit operation sequence numbers 8–10. The unit operations of heat exchange, cell disruption, and heat exchange are cycled consecutively three times, as defined in columns 310, 312 and 314. After unit operation sequence numbers 8–10 have cycled three times, the microbial fermentation production process continues at resuspension/surfactant, unit operation sequence number 11.

Unit operation sequence numbers 11 and 12 cycle together two times, as defined by columns 310, 312 and 314. After unit operation sequence numbers 11 and 12 have been cycled two times, the microbial fermentation production process continues without cycling from unit operation sequence number 13 through unit operation sequence number 23 to conclude the microbial fermentation production process.

Columns 326–332 of FIG. 3 represent the step wise recover (SWR) and overall recovery (OAR) percentages of the product and total proteins. SWR is the recovery of protein for the individual unit operation for which it is listed. OAR is the recovery of protein for the overall process up to and including the unit operation for which it is listed. The product recovery columns represent the recovery of the desired product protein from the solution in the process. The protein recovery columns represent the recovery of contaminant proteins from the solution which result in higher purity of the product solution.

FIG. 4 illustrates a unit operation list for an exemplary mammalian cell culture production process. Column 402 lists unit operation sequence numbers 1–19. Unit operation sequence numbers 1–19 define the order in which the unit operations of the mammalian cell culture production process occur. The most notable differences between the microbial fermentation process of FIG. 3 and the mammalian cell culture process of FIG. 4 are the multiple Unit Operation Cycles of unit operation sequence number 8 and the multiple Batch Cycles of unit operation sequence numbers 8–18.

Unit operation sequence number 8 of FIG. 4 illustrates the concept of multiple Unit Operation Cycles. Unit operation sequence number 8 is the unit operation of harvesting product rich growth media from and feeding fresh growth media into the mammalian cell reactor vessel. In most mammalian cell culture processes, the product is secreted by the cells into the surrounding growth media in the reactor vessel. To harvest the product, some of the product rich growth media is harvested from the reactor vessel to be processed to remove the product, and an equal amount of fresh growth media is fed into the reactor vessel to sustain production in the reactor vessel. The process of harvesting and feeding the reactor vessel can continue for many weeks for a single biopharmaceutical production process. Unit operation sequence number 8 is repeated seven times, or 7 Unit Operation Cycles (e.g., the unit operation sequence is 7, 8, 8, 8, 8, 8, 8, 8, 9). Note that the offset duration for unit operation sequence number 8 is 24 hours. The offset duration defines the time period between the Unit Operation Cycles. In the example of FIG. 4, unit operation sequence number 8 is repeated 7 times (7 Unit Operation Cycles) and each cycle is separated from the next by 24 hours, or one day. This corresponds to unit operation sequence number 8 having a duration of one week, with a harvest/feed step occurring each day.

FIG. 4 also illustrates the feature of multiple Batch Cycles. Batch Cycles is defined as the number of iterations a batch cycle is repeated in a given process that employs continuous or semi-continuous product synthesis. Each batch cycle results in a batch of product. A single biopharmaceutical production process, therefore, may result in multiple batches of product. In the mammalian cell culture process example of FIG. 4, unit operation sequence numbers 8–18 are repeated together as a group eight times (column 418). Each of these cycles of unit operation sequence numbers 8–18 produce one batch of product (columns 420–422). The offset between each cycle of unit operation sequence numbers 8–18 is 168 hours, or one week (column 424).

In the example of FIG. 4, unit operation sequence numbers 8–18 proceed as follows: the reactor vessel is harvested and fed once each day for seven days; the results of the harvest/feed operation are pooled in unit operation sequence number 9 at the end of the seven days; unit operations 9–18 are then executed to process the pooled harvested growth media from unit operation sequence number 8. Unit operation sequence numbers 8–18 are cycled sequentially once each week to process an additional seven day batch of harvested growth media from unit operation sequence number 8. At the end of eight weeks, the mammalian cell culture process is completed.

Figure 5:
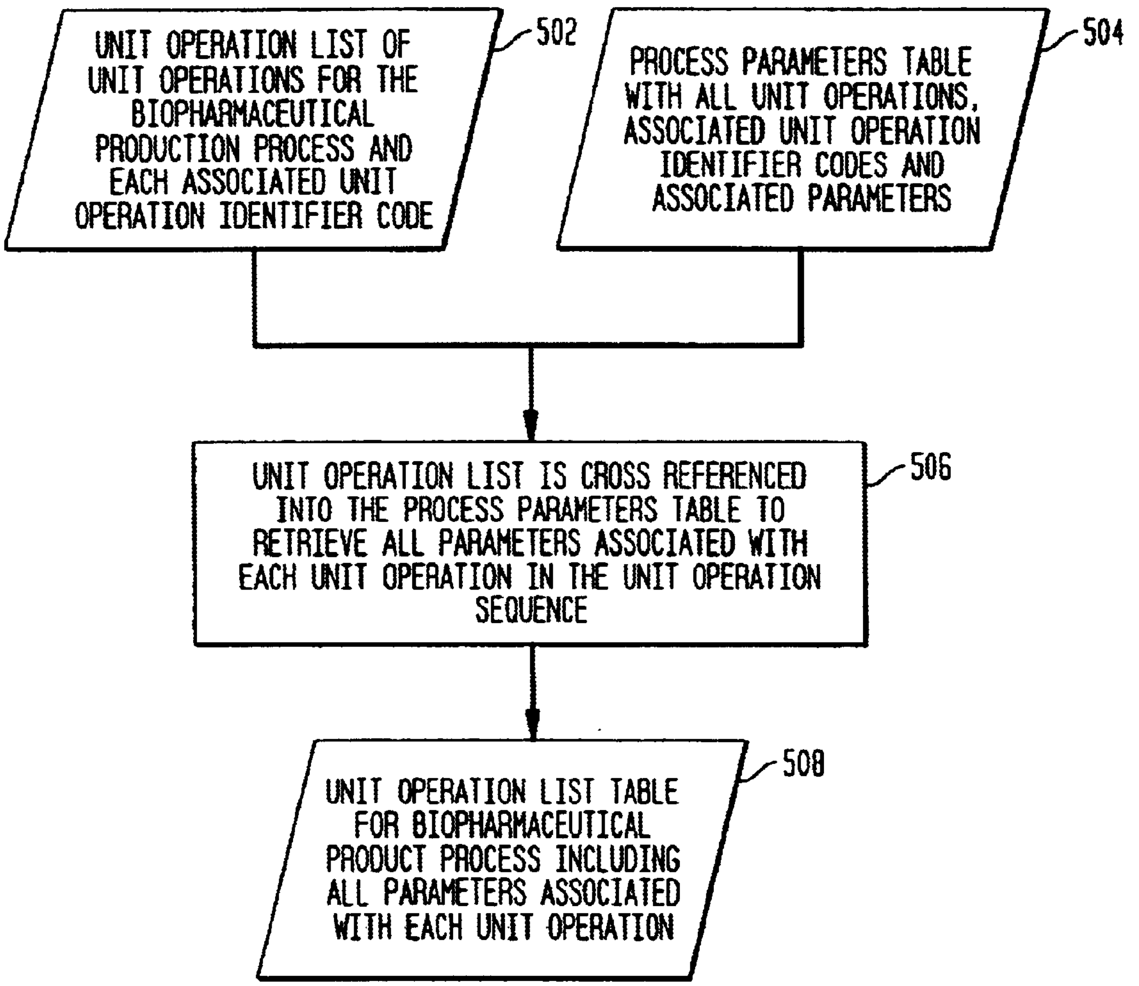
FIG. 5 illustrates a file and process flow diagram for cross-referencing a unit operation list with a process parameters table according to the present invention.

FIG. 5 further illustrates step 108, cross referencing the unit operation sequence with the master process parameters table. The operational parameters in the process parameters table are those parameters necessary to simulate a particular unit operation. The parameters from the process parameters table define the key operational parameters and equipment sizing ratios for each unit operation in the unit operation sequence. The values for these parameters and ratios are variables which can be easily manipulated and ordered to model and evaluate alternative design scenarios for a given process scale. Examples of the process parameters associated with each unit operation are shown in FIGS. 14A-B–20A-B. It should be noted, however, that the list of unit operations, parameters, values, and scaling ratios is not exhaustive. One, of ordinary skill in the art could expand the process parameters table to encompass additional unit operations and production processes for other batch process industries such as chemical pharmaceutical, specialty chemical, food, beverage, and cosmetics. Such expansion would allow the present invention to simulate and schedule additional batch production processes for other such batch processes.

FIG. 5 illustrates the files necessary to cross-reference the unit operation list with the process parameters table in step 108. Exemplary unit operation list 502 for the biopharmaceutical production process and process parameters table 504 are input into processing step 506. Step 506 cross-references the unit operation list and process parameters table based on unit operation identification code (see FIG. 3). The parameters are copied from the process parameters table 504 into the unit operation list 502 to generate unit operation list 508.

FIGS. 6A-B further illustrate exemplary process parameters table, 504. The operational parameters in the process parameters table are those parameters necessary to simulate a particular unit operation. The unit operation identification codes of process parameters table 504 are used in the cross-reference step 506 to assign the parameters from the process parameters table 504 to the unit operation list 502. Examples of operational parameters are the solutions involved in a particular unit operation, temperature, pressure, duration, agitation, scaling volume, etc. Additionally, the process parameters table defines all of the individual tasks and task durations involved in each unit operation. It should be noted, however, one of ordinary skill in the art could expand the process parameters table to encompass additional unit operations and production processes for other batch process industries such as chemical pharmaceutical, specialty chemical, food, beverage, and cosmetics. Such expansion would allow the present invention to simulate and schedule additional batch production processes for other such batch processes.

Figure 7:
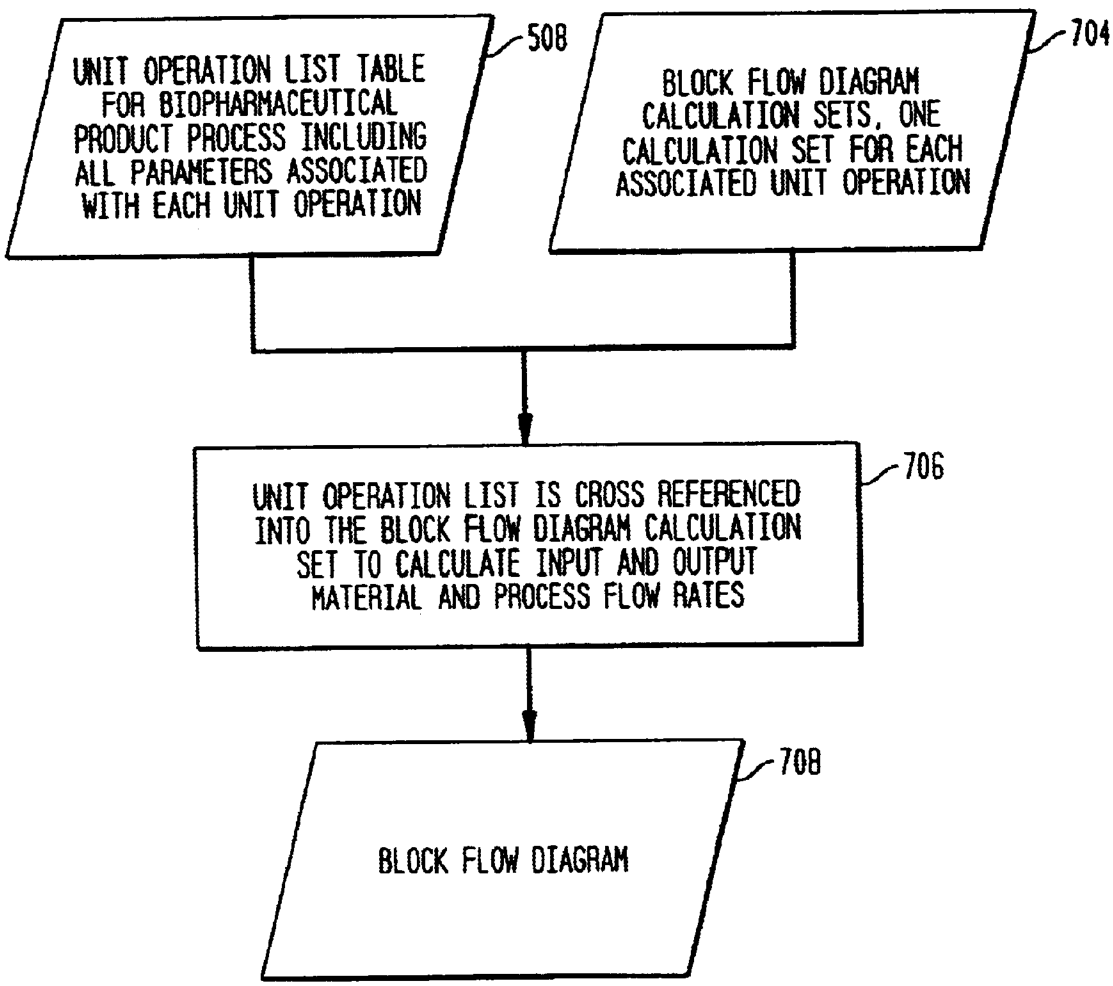
FIG. 7 illustrates the process for generating a block flow diagram according to the present invention.

FIG. 7 further illustrates step 110, generating a block flow diagram. A block flow diagram depicts each unit operation in the biopharmaceutical production process as a block with inputs for both incoming product and new material, as well as outputs for both processed product and waste. The material that flows through each of the unit operation blocks is quantified by calculation sets in each of the block flow diagram blocks. A unit operation block in a block flow diagram is a graphical representation of a unit operation. A calculation set is a set of algebraic equations describing a unit operation. Some examples of outputs of the calculation sets are: required process materials for that unit operation, equipment performance specifications and process data outputs to be used for the next unit operation. Some examples of inputs to the calculation sets are: product quantity (mass) or volume (liters) from a previous unit operation, other parameters and/or multipliers derived from the process parameters table, as well as the design cycles defined in the unit operation list.

Block flow diagram 708 is generated from unit operation list 508 and block flow diagram calculation set 704. Block flow diagram calculation set 704 is an exhaustive list of unit operation identifier codes and the calculation sets associated with each unit operation identifier. Unit operation list 508 and block flow diagram calculation set 704 are linked together based on unit operation identifier code.

Step 706 calculates the block flow diagram material flow requirements and basic equipment sizing requirements from unit operation list 508 which includes all of the associated operational parameters from the process parameters table, and the block flow diagram calculation set 704. Block flow diagram 708 allows the sizing of many key pieces of equipment relative to a given process scale. Since the material flow quantities into and out of each unit operation is determined at step 706, the capacity of many equipment items involved in each unit operation can be determined. The block flow diagram also manages important information in the unit operation list 502 such as the percent recovery, percent purity and purification factor of the product in each unit operation. This information helps identify the steps in the process that may need optimization.

The following is an example calculation set for a tangential flow micro-filtration (TFMF) system unit operation. Tangential flow micro-filtration is an important process technology in biopharmaceutical manufacturing. This technology significantly extends the life of the filtration media and reduces the replacement cost of expensive filters.

TFMF generically requires the same steps to prepare the membrane for each use as well as for storage after use. The design parameters for each unit operation such as TFMF have been developed around these generic design requirements.

| Generic Parameters (Variables) from the Process Parameters Table | |
|---|---|
| Equipment Design Type | Plate & Frame |
| Membrane Porosity | 0.2 micron |
| Membrane Flux rate | 125 Liters/square meter/hour |
| Process Time | 2 Hours |
| Retentate/Filtrate Rate | 20 to 1 |
| Flush Volume | 21.5 Liters/square meter |
| Prime Volume | 21.5 Liters/square meter |
| Wash Volume | 0.5% of Process Volume |
| Regenerate Volume | 10.8 Liters/square meter |
| Storage Volume | 21.5 Liters/square meter |
| % Recovery of Product | 95% |
| % Recovery of Total Protein | 80% |
| Clean In Place (CIP) | Yes |
| Steam In Place (CIP) | Yes |
| Input Values from Previous Unit Operation | |
| Product Volume | 1,000 Liters |
| Product Quantity | 1.5 Kg |
| Total Protein Quantity | 3.0 Kg |

The calculation set for this unit operation first takes the incoming process volume and uses it as a basis of sizing the filtration membrane for the filtration system based on the above flux rate and required processing time:

1,000 Liters/125L/SM/Hr/2 Hours=4.0 SM of 0.2 micron membrane

After calculating the square meter (SM) of membrane required by this unit operation, the volumes of each of the support solutions can be calculated based on the above volume ratios:

| | |
|---|---|
| Flush volume | 21.5 Liters/SM × 4.0 SM = 86 Liters |
| Prime volume | 21.5 Liters/SM × 4.0 SM = 86 Liters |
| Wash Volume | 5% of 1,000 Liters = 50 Liters |
| Regenerate | 21.5 Liters/SM × 4.0 SM = 86 Liters |
| Storage | 10.8 Liters /SM × 4.0 SM = 42 Liters |

The flow rate of the filtrate is calculated from the volume to be filtered and the required process time:

1,000 liters/2 hours=8.3 liters/minute

The flow rate of the retentate is calculated based on the above retentate/filtrate ratio:

8.3 liters/minute×20=167 liters/minute

Based on the input of the process volume to this unit operation and the above parameters, the equipment size, the filtration apparatus, the retentate pump, the support linkage and associated systems can be designed.

In addition, the input values for the quantity of product and contaminant protein received from the previous unit operation together with the recovery factors listed in the parameters allow the calculation of the cumulative recovery of product through this step, as well the percent purity of the product and the product purification factor for this step. This information is helpful for identifying steps in the manufacturing process which require optimization.

Figure 8:
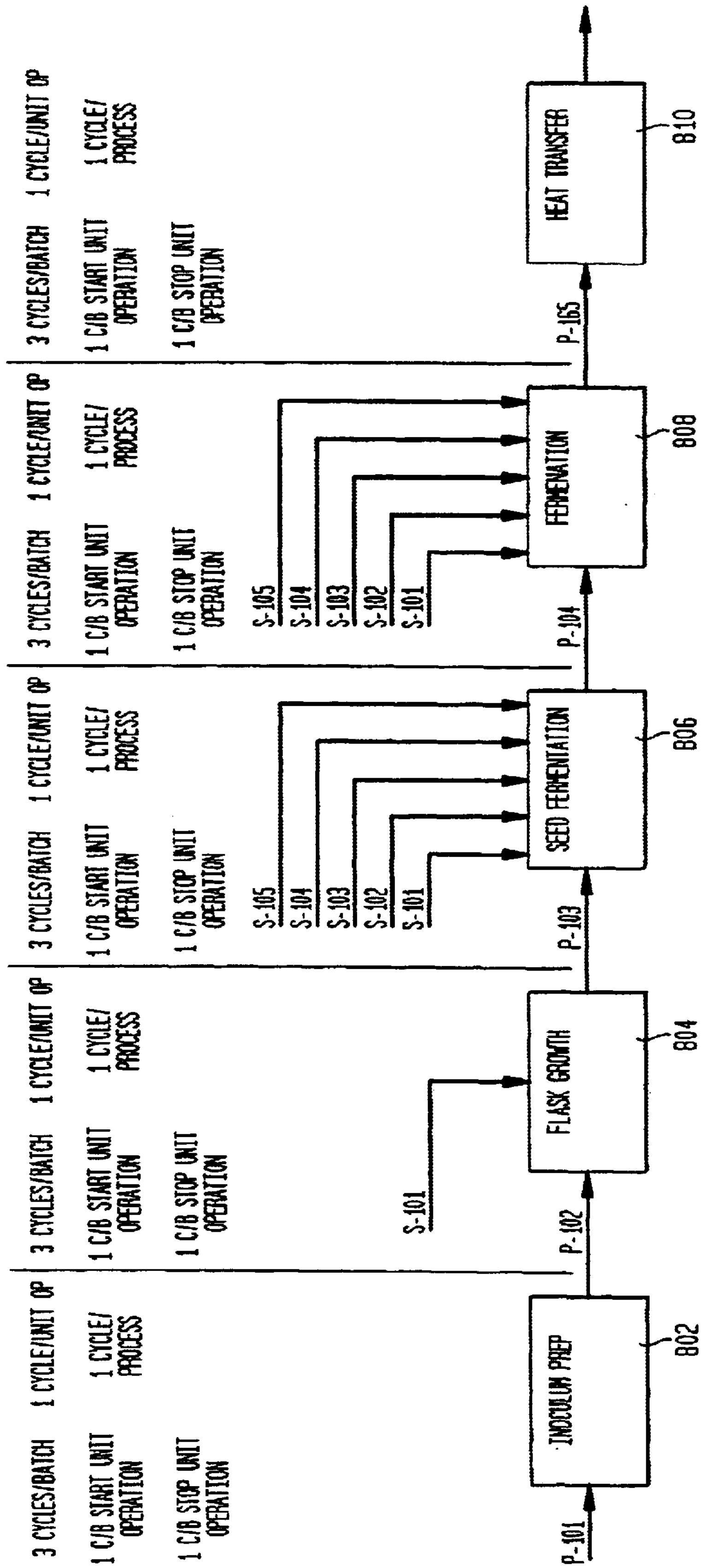
FIG. 8 illustrates an exemplary block flow diagram according to the present invention.

FIG. 8 illustrates an exemplary block flow diagram for the first five unit operations of the microbial fermentation process unit operation list of FIG. 3. Unit operations 1 through 5 are shown as blocks 802, 804, 806, 808 and 810. The input solutions to each of the steps are shown as arrows tagged with solution identifier information from the unit operation list 508. The process streams to which these solutions are added at each unit operation are also shown as arrows tagged with process stream identifier information. Working from the initial process stream characteristics (P-101) in unit operation 1, inoculum prep, the volumes of input materials (solutions) and subsequent process streams in each of the unit operations is determined using scale-up ratios which are included in the information from the unit operation list 508 for each respective unit operation. For example, the volume of solutions and process streams flowing into and out of each of unit operation blocks 802–810 in FIG. 8 is determined by the initial starting characteristics of the process stream P-101 and the volume of its associated input material S-101 in the first unit operation, block 802 and the scale up ratio in each of the successive unit operations, blocks 804–810. The solutions involved in each of unit operation blocks 802–810 are likewise part of the information for each respective unit operation in the unit operation list 508.

Figure 9:
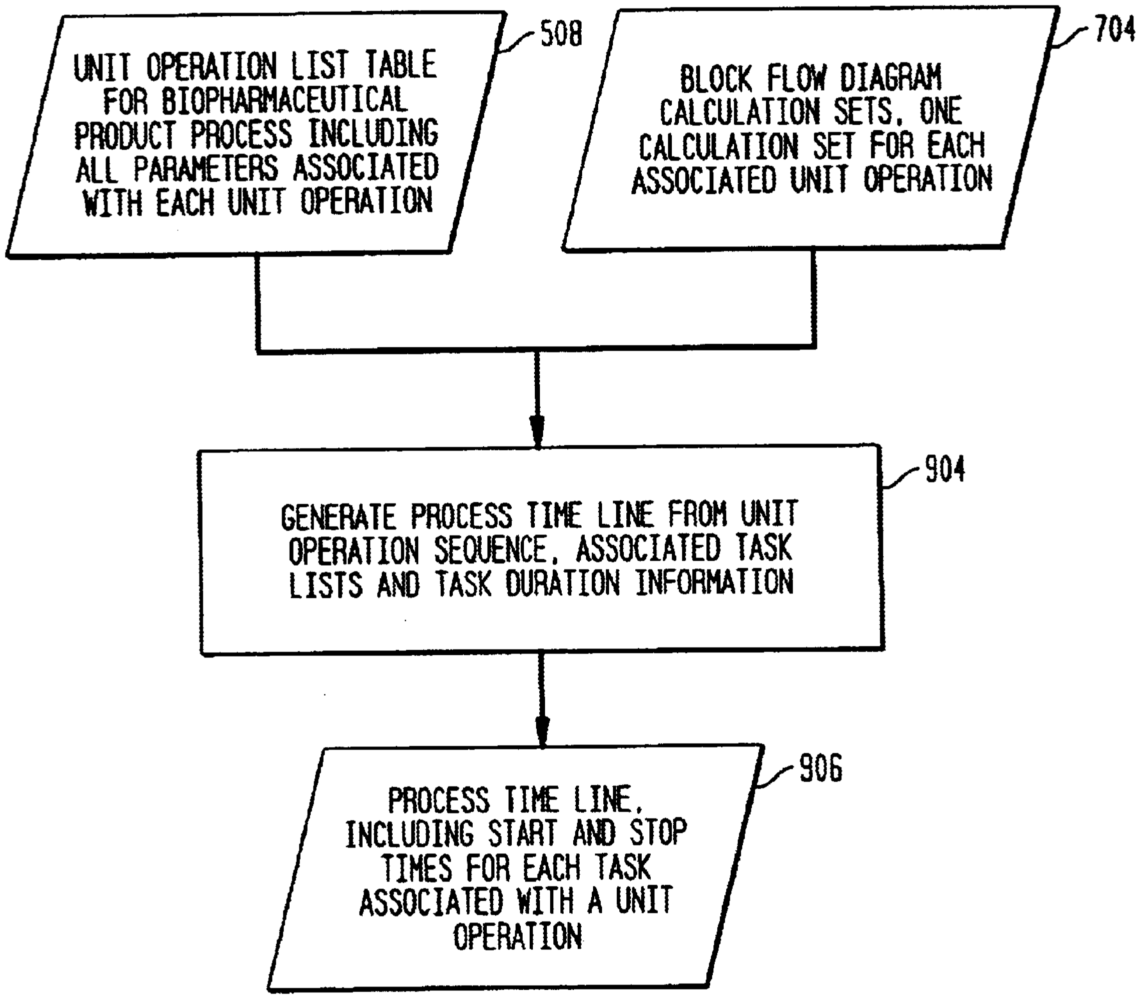
FIG. 9 illustrates a block flow diagram for the process of generating a process time line according to the present invention.

FIG. 9 further illustrates step 112, generating the process time line. The process time line is generated (steps 904 and 906) from unit operation list 508 and block flow diagram calculation set 704. Unit operation list 508 contains enough input information to generate a detailed process time line which includes the start and stop times for most of the tasks associated with each unit operation. The durations of some unit operation tasks are not scale dependent. The durations of other unit operation tasks are, however, scale dependent. In the latter case, as a process is scaled up, the amount of time required to complete a unit operation task increases. In such cases, where duration of a unit operation task is scale dependent, block flow diagram calculation set 704 is required to calculate the quantity of material handled by the unit operation task. After the quantity of material handled by a unit operation task is determined, its duration can be determined. Examples of scale dependent task durations are the time required to pump solutions from one storage tank to another, the amount of time required to heat or cool solutions in a heat exchanger, the amount of time required to filter product or contaminants from solution.

FIG. 10 is an example of a high-level process time line for a microbial fermentation process. The unit operation sequence of the process time line of FIG. 10 corresponds to the unit operation list of FIG. 3. The high-level process time line shown in FIG. 10 illustrates two Process Cycles of the microbial fermentation unit operation sequence, labeled “First Process Cycle” and “Second Process Cycle.” A “Process Cycle” (PC) is a complete run of the biopharmaceutical production process, as defined by the unit operation sequence for the process.

The first two columns of the process time line of FIG. 10 identify the unit operation sequence number and unit operation description of the unit operation being performed, respectively. The first three sets of unit operations correspond to the three Unit Operation Cluster Cycles of unit operation sequence numbers 1–6 of FIG. 3. Three cycles of unit operations 1–6 are performed and the results are pooled into unit operation 7, pool harvests. The two columns to the right of the duration column identify the week and day that the particular unit operation is occurring in the first Process Cycle.

The day and the week each unit operation is performed is calculated from the start time of the process, as well as the cumulative duration of each of the previous unit operations. In the example of FIG. 10, Sunday is defined as the first day of the week. In the example of FIG. 10, the process sequence begins at unit operation 1, inoculum prep, on Friday of the first week. After unit operation 1 has completed (24 hours later, since unit operation 1 has a 24 hour duration) unit operation 2 is performed on Saturday. The begin and end times for each successive unit operation are calculated from the duration of the unit operation and end time of the previous unit operation. Note that FIG. 10 is calculated to the day and week only for the purposes of explanation. Usually the process time line is determined for each of the tasks associated with a unit operation to the minute.

As illustrated in FIG. 10, unit operation 7 occurs on Monday of the third week in the first Process Cycle. The third column from the left is the duration of each of the unit operations. After the three cycles of unit operations 1 through 6 have been pooled in unit operation 7, the process continues at unit operations 8 through 10, heat exchange, cell disruption and heat exchange. Each of unit operations 8 through 10 are cycled three times and the associated scheduling information is contained in column to the right of the unit operation duration. Since each cycle of unit operations 8 through 10 have a duration of 0.5 hours, as shown in column 3, each cycle occurs on Monday of the third week in the process.

FIG. 11 illustrates the final unit operations of the process time line for the microbial fermentation process. After 3 cycles of unit operations 8 through 10 have been completed, unit operation sequence numbers 11 and 12 cycle together two times on Monday, week 3 of the first Process Cycle. After unit operation sequence numbers 11 and 12 have been cycled twice, the microbial fermentation production process continues without cycling from unit operation sequence number 13 through unit operation sequence number 22 to conclude the microbial fermentation production process. The durations and associated start times are listed for each of the unit operations 13–22.

FIGS. 12A–12H illustrate the preferred embodiment of a detailed process time line. The unit operation sequence of the process time line of FIGS. 12A–12H correspond to the unit operation list of FIG. 3. The process time line of FIGS. 12A–12H illustrates a single Process Cycle of the microbial fermentation unit operation sequence. The individual tasks associated with each unit operation are included after the unit operation. For example, in FIG. 12A, unit operation 1A, inoculum prep, consists of the individual tasks of set up, preincubation, incubation, and clean up. Columns 11–14 show the start date and time and finish date and time for each of the tasks in each unit operation. Since setup and clean up are not part of the critical path of the process, they do not directly affect the start and end times of following unit operations. The start and finish date and times for the set up and clean up operations of each of the unit operations are valuable because they ensure that the equipment will be available for each unit operation if the process time line is followed.

The process time line of FIGS. 12A–12H includes examples of unit operation task duration calculations. Row 20, column 15 of FIG. 12A, which corresponds to the harvest task of unit operation 3A, seed fermentation, is an example of a duration calculation. As stated above, the duration of some unit operations is process scale dependent (i.e., the duration is dependent upon the volume processed). The harvest task in the seed fermentation unit operation is an example of a task whose duration is process scale dependent. In column 15, the calculations column, information listed for the harvest task is 50 liters, 1.7 liters/minute (LPM), and 0.5 hours. Fifty liters represents the volume of material that is harvested during a harvest task. 1.7 liters/minute represents the rate at which the solution is harvested. Given the volume to be harvested and the flow rate of the harvest, the duration of the harvest task is calculated to be 0.5 hours. Each task in a unit operation that is volume dependent has its duration calculated in order to generate the process time line of FIGS. 12A–12H.

The process time line of FIGS. 12A–12H can be resolved to minutes and seconds, if necessary. The accuracy of the process time line allows the precise planning and scheduling of many aspects of the batch manufacturing process. The process time line scheduling information can be used to schedule manufacturing resources such as labor, reagents, reusables, disposables, etc., required directly by the manufacturing process. Pre-process support activities such as solution preparation, and equipment prep and sterilization, required to support the core process, including the labor, reagents, etc. can be scheduled, cost forecasted and provided for. Post-process support activities such as product formulation, aseptic fill, freeze drying, vial capping, vial labeling and packaging required to ship the purified product in a form ready for use may be added to the process time line and managed. Based on the process time line, labor, reagents, etc., required to support these post-process support functions can be acquired and managed. One of the most important aspects of the present invention is the determination of process utility loads such as USP Purified Water, Water For Injection, Pure Steam, etc., for all of the manufacturing equipment. The process time line can be used to determine the peak utility loading, and utility requirements for the facility. Building utility loads such as building steam, heating, ventilation, air conditioning, plumbing, etc., for all manufacturing equipment, process areas and facility equipment can be determined based on the process time line and the equipment associated with each of the unit operations. The process time line can be used to measure the time that the equipment has been in service to schedule preventative maintenance of all plant equipment, Quality Assurance activities including instrument calibration, automated batch documentation, etc. and Quality Control activities including process system maintenance, raw material testing, in process testing and final product testing, etc.

In an alternative embodiment of the present invention, a refinement can be made to the generation of a process time line (PTL), as shown in FIG. 9 (step 112 of FIG. 1), based on the three levels of scheduling cycles—"Unit Operation Cycles," "Unit Operation Cluster Cycles," and "Batch Cycles"—discussed above.

The refinement (i.e., new mechanism) focuses on how to apply the offsets associated with each design cycle to the PTL. In cases where the offset for any of the levels of scheduling cycles is equal to zero, as soon as the cycle is completed it immediately begins the next cycle at that same cycle level, assuming another cycle has been specified. Otherwise, the scheduling mechanism passes to the next unit operation specified and its respective set of cycle conditions. This new mechanism clarifies the impact an offset of greater than zero for any of the scheduling cycle levels has on the PTL.

To implement this new mechanism, a unit operation tagging convention based on a four-field delimited string is used to identify each cycle iteration of a unit operation module in a PTL (PTML) by its respective cycle level and cycle count. A PTML is a section of the PTL having a set of tasks with respective scheduling calculations that are associated with a given unit operation. The above delimited fields are defined as follows:

| DELIMITED FIELD | VALUE |
|---|---|
| Field 1 | Unit Operation Sequence Number |
| Field 2 | Batch Cycle Iteration |
| Field 3 | Cluster Cycle Iteration |
| Field 4 | Unit Operation Cycle |

Together, the four-fields of the delimited string makes up a Delimited String Code (DSC) (e.g., "3.2.1.1") that provides a unique identifier for each PTLM in the PTL. The DSCs are based upon the above-described sequence and design cycle information for each design cycle iteration for each unit operation in the PTL.

As discussed above, a PTL consists of unit operations decomposed into unit operation tasks that are required to complete a unit operation procedure. These tasks can be divided in to three basic categories: Unit Operation Set Up (i.e., equipment preparation), Unit Operation Execution (i.e., equipment usage), and Unit Operation Clean Up (i.e., equipment clean up). Tasks associated with Unit Operation Execution can be said to be on the critical path of the PTL and usually involve manipulation of the product in preparation for the next unit operation in the process procedure.

Unit Operation Set Up Tasks (SUTs) are performed before Unit Operation Execution Tasks in order to prepare equipment for the Unit Operation Tasks that are on the critical path of the PTL. Generally, SUTs can be performed any time before the first Unit Operation Execution task is scheduled to be started based on the availability of the product from the previous unit operation. However, SUTs cannot be back scheduled to the extent that they interfere with completion of the previous usage cycle for the respective set of equipment or compromise the integrity of the process or product in any way. Unit Operation Clean Up Tasks (CUTs) are required in order to clean and prepare equipment for its next use. The above definitions of the three basic tasks are important relevant to accurately defining the impact of the above design cycles and their associated offsets on task scheduling in the PTL.

An application of the offset refinement can be explained, for example, with reference to mammalian cell culture production process (see FIG. 4 described above) and microbial fermentation process (See FIG. 5 described above). Referring to FIG. 21, an example showing the harvest and initial purification steps associated with a mammalian cell culture process is presented. A mammalian cell culture process provides a good example of the use of Batch Cycles as well as Unit Operation Cycles and their respective offsets. It is based on a batch process that involves continuous or semi-continuous product synthesis with batch purification of the crude product produced by the cell culture reactor.

Because a mammalian cell culture reactor may be in production for 60–90 days, the product enriched media that the cells grow in is typically harvested either continuously or in batch harvest cycles every 1, 2 or 3 days. In each harvest cycle a fresh supply of media is fed to the reactors as the product enriched media is harvested. Thus, the mammalian cell process illustrated in FIG. 21 demonstrates how Batch Cycles and their offsets impact the generation of a consecutive PTL together with the Unit Operation Cycles and their offsets.

Referring to FIG. 22 an example showing the initial purification steps associated with a microbial fermentation process is presented. A microbial fermentation process provides a good example of the use of two types of Cluster Cycles and their respective offsets and how they and their offsets impact the generation of a consecutive PTL.

Referring again to FIG. 21, where media is batch harvested every 24 hours for 3 UC's (Unit Operation 1) and these daily harvests are pooled every 72 hours to be batch purified (Unit Operations 2–4), a base model which demonstrates the use of offsets for Batch Cycles (BC) as well as Unit Operation Cycles is present. In this case a BC is defined by unit operations 2–4 as a subset of the process cycle defined by unit operations 1–4. The Batch Cycle Offset (BCO) in this case is 72 (3 days). Every 3 days a new batch of material is begun. In a PTL for this example, if one were to demonstrate a consecutive time line with iterative Batch Cycles, the start of the First Critical Path Task (FCPT) would have to be offset from the beginning of the FCPT from the previous BC.

Referring again to FIG. 22, where a cluster of three concurrent unit operations is cycled 3 times in order to "disrupt" the cells harvested from a fermentor, a concurrent or simultaneous cluster cycle is presented (Unit Operations 10305–10307). In a simultaneous cluster cycle all the unit operations in a given cluster cycle operate simultaneously versus sequentially during each cluster cycle. In this case the inlet heat exchanger, cell disruption and outlet heat exchanger all operate simultaneously to each other during each Cluster Cycle. In Unit Operations 10309–10310, a sequential cluster cycle is presented where the first unit operation in the cluster completes is unit operation cycle before the next unit operation in the cluster cycle begins and so on during each cluster cycle.

Referring to FIGS. 23A–F, a PTL generated based on the design cycles defined in the Unit Operation List in FIG. 21 is shown. In this PTL, there is a PTL Module (PTLM) for each unit operation cycle required to generate a consecutive time line based on the design cycle patterns defined in the Unit Operation List. Column 2302 lists the DSC for each PTLM in the sample PTL. Column 2304 lists calculations required to determine the duration of each of the calculated tasks associated with a unit operation. Column 2306 lists the duration of each task as determined by either calculation or manual entry. Column 2308 lists schedule adjustment factors (SAF) to forward schedule or back schedule a task duration. Column 2310 lists the adjusted duration of a task based on the calculated duration in column 2306 and the adjustment factor in column 2308.

Column 2312 lists the finish times, in hours, for each of the SUTs. These finish times are back calculated from the FCPS time based on the task duration and SAF for each SUT (as further explained below). Column 2314 lists the finish times for each of the Critical Path Tasks (CPT) associated with a unit operation. The finish times are forward calculated from the First Critical Path Task End Time (FCTPE) based on the task duration and SAF for each respective CPT (further explained below). Column 2316 lists the finish times for the CUTs associated with a unit operation. Finish times for these CUTs are calculated from the finish time of the Critical Path End Time for the Current Unit Operation (CCPE) and the adjusted durations for each of the subsequent CUTs. Column 2318 lists the calculated start time for each task in the PTL based upon the end time for the respective task in columns 2312, 2314, or 2316, and their respective task duration and SAFs from columns 2306 and 2308, respectively. Column 2320 lists the calculated end time for each task in the PTL based on the end times determined in columns 2312, 2314 or 2316.

Figure 24:
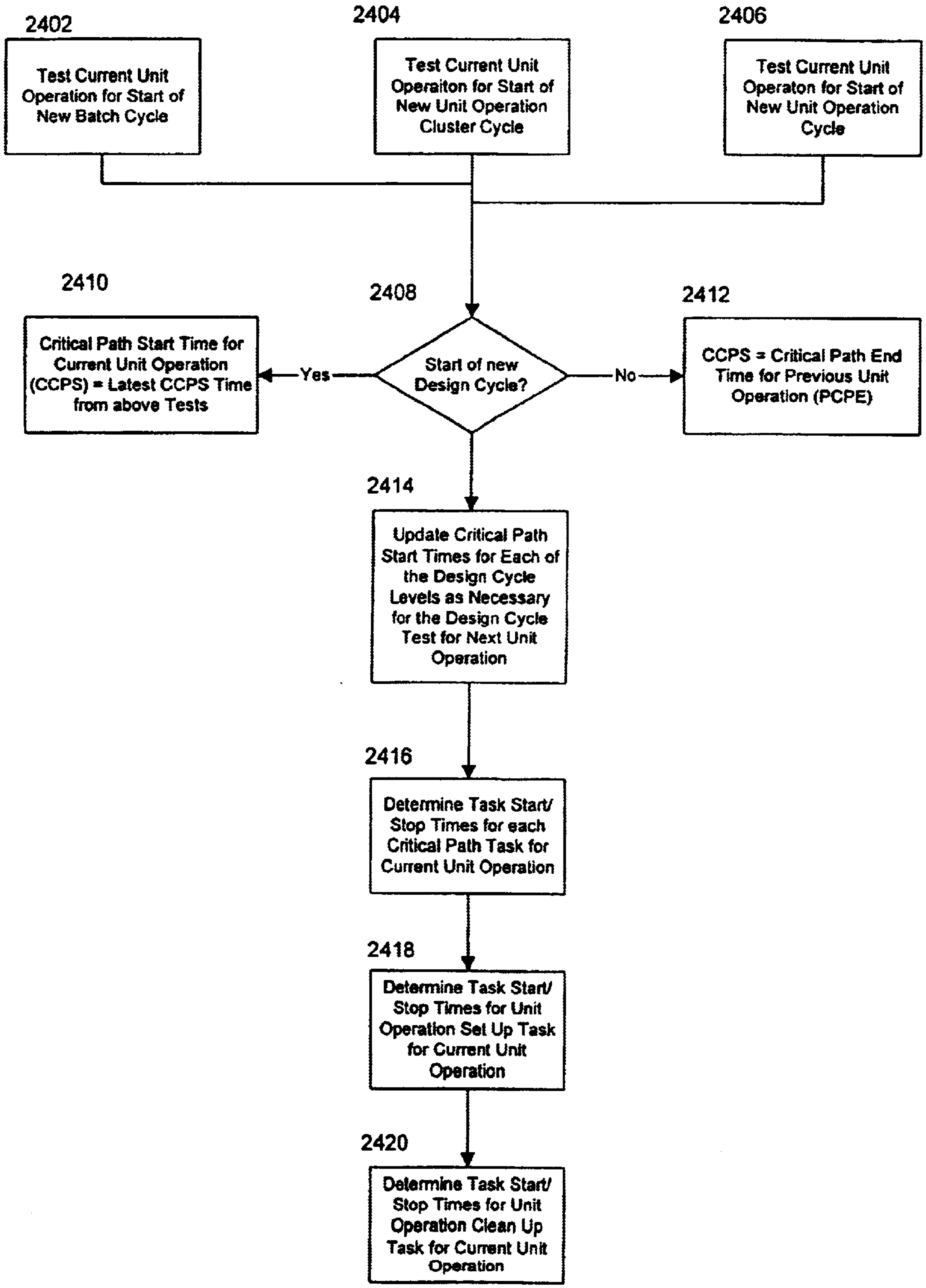
FIG. 24 is a flow chart that illustrates the method for determining the impact of design cycle offsets on the current critical path start time for a respective unit operation cycle.

Referring to FIG. 24, a high level flow chart that illustrates the method for determining the impact of design cycle offsets on the Current Critical Path Start Time (CCPS) for a respective Unit Operation Cycle in the PTL is shown. In Step 2402, the Batch Cycle Iteration Field (BCIF) for the PTLM (DCS Field 2) is evaluated to determine if the current unit operation sequence number is the start unit operation for a Batch Cycle Iteration as defined in column 2120 in FIG. 21. If it is, the CCPS time for the new Batch Cycle Iteration is calculated from the start time from the previous BC plus the BCO. If not, the BC test is ended and the cluster cycle conditions for the current unit operation are then evaluated in Step 2404.

Figure 25:
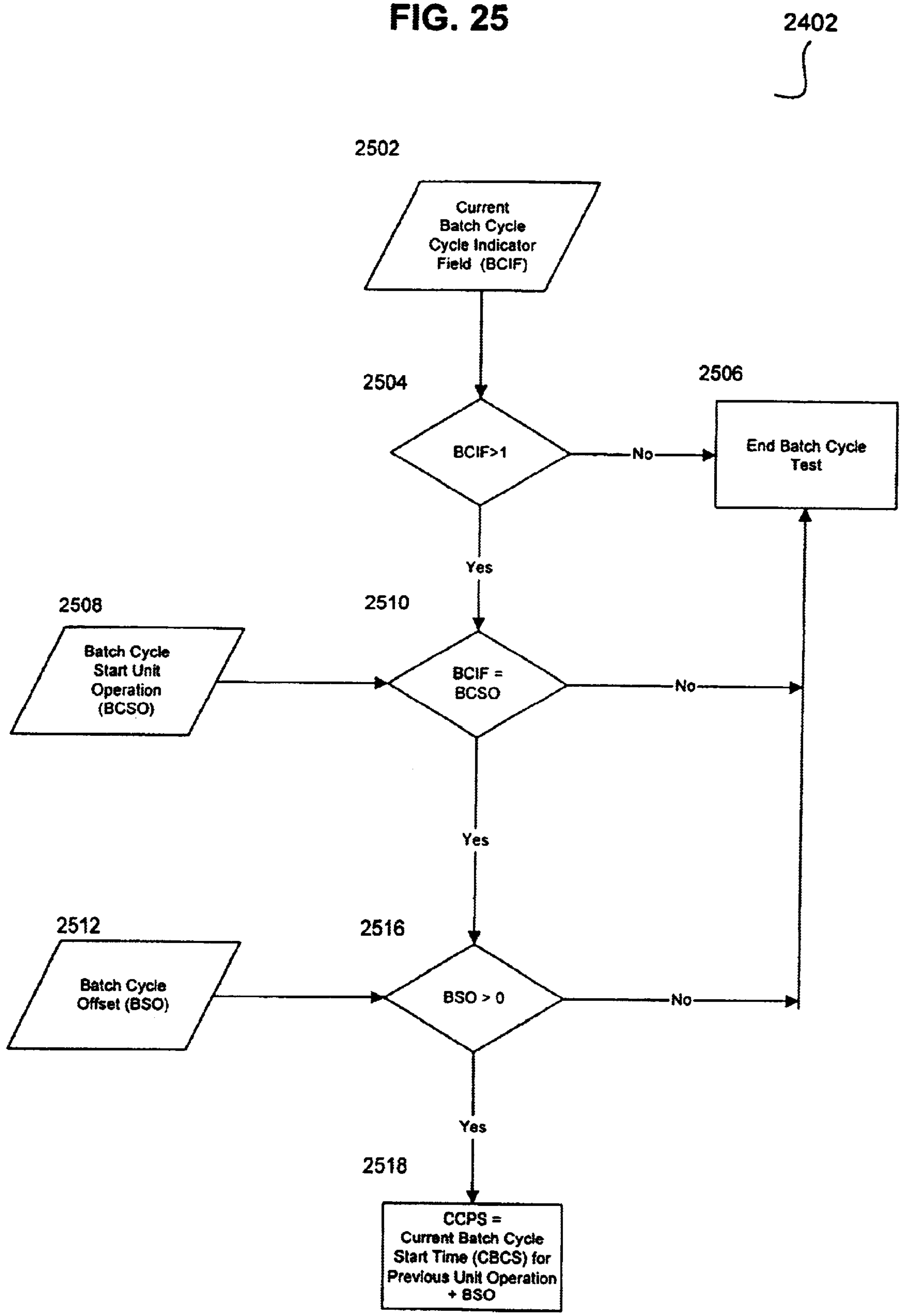
FIG. 25 is a flow chart that illustrates the test for a new batch cycle according to an embodiment of the present invention.

Referring to FIG. 25, the evaluation in step 2402 is further illustrated. The BCIF for the Current Unit Operation in Step 2502 is evaluated in step 2504. If the BCIF for the Current Unit Operation is not greater than one, the BC test is ended (Step 2506) and the Cluster Cycle Test is performed. If the BCIF is greater than one, the Batch Cycle Start Unit Operation (BCSO) is obtained from column 2122 from FIG. 21 (Step 2508). The BCIF is evaluated in Step 2510 to determine if it is equal to the BCSO. If the BCIF is not equal to the BCSO, the Batch Cycle Test is ended in Step 2506 and the Cluster Cycle Test is performed. If the BCIF is equal to the BCSO, then the BCO is obtained from Column 2126 in FIG. 21 (Step 2512). In Step 2516, the BSO is evaluated to determine if it is greater than zero. If the BCO for the Current Unit Operation is not greater than zero, the Batch Cycle Test is ended in Step 2506 and the Cluster Cycle Test is Performed. Otherwise, the CCPS is set equal to the PCPS plus the BCO (Step 2518). The resulting value from FIG. 25 is then stored for further evaluation in Step 2408.

A Cluster Cycle occurs when a set of two or more Unit Operations cycle together prior to the next steps in the manufacturing procedure within a BC. In some cases the Unit Operations in the Cluster Cycle follow each other sequentially where the CCPS of a subsequent Unit Operation in a CC follows the End Time for the Last Critical Path Task of the previous Unit Operation (PCPE) in the UC. An example of this type of CC is found in FIG. 22 in a sample case of the initial purification stage of a Microbial Fermentation Process. In this sample case, the Inclusion Body Wash steps in Unit Operations 10309–10310 are repeated twice before continuing with Unit Operation 10311. The Dilution Step is competed before the Centrifugation Step is started. After Unit Operation 10310 is completed Unit Operations 10309–10310 are repeated a second time in the same sequential manner before continuing with the next unit operation 10311, thus completing the second cluster cycle. In other CC cases the Unit Operations subsequent to the first Unit Operation in a CC occur concurrently to the first Unit Operation in the CC. In this latter case the CCPS of each Unit Operation in the CC that is subsequent to the first Unit Operation in the CC is set equal to the Critical Path Start Time of the First Unit Operation in the CC. An example of this type of CC is also found in FIG. 22. More specifically, the Cell Disruption Steps in Unit Operations 10305–10307 are repeated three times before continuing with Unit Operation 10308. In this case Unit Operations 10306 and 10307 each occur simultaneously to the first (10305). In other words, all three Unit Operations in the Cluster Cycle share the same CCPS.

Step 2404 of FIG. 24 illustrates a CC test being performed to determine if the current Unit Operation in the PTL is the start of a new CC. In Step 2404, the Cluster Cycle Iteration Field (CCIF) for the current unit operation (DCS Field 3) is evaluated to determine if the Current Unit. Operation sequence number in column 2202 is the start unit operation for a Cluster Cycle Iteration as defined in column 2214 in FIG. 22. If it is, the CCPS time for the new Cluster Cycle Iteration is calculated from the start time from the previous CC plus the Cluster Cycle Offset (CCO) from column 2218 as further explained below.

Figure 26:
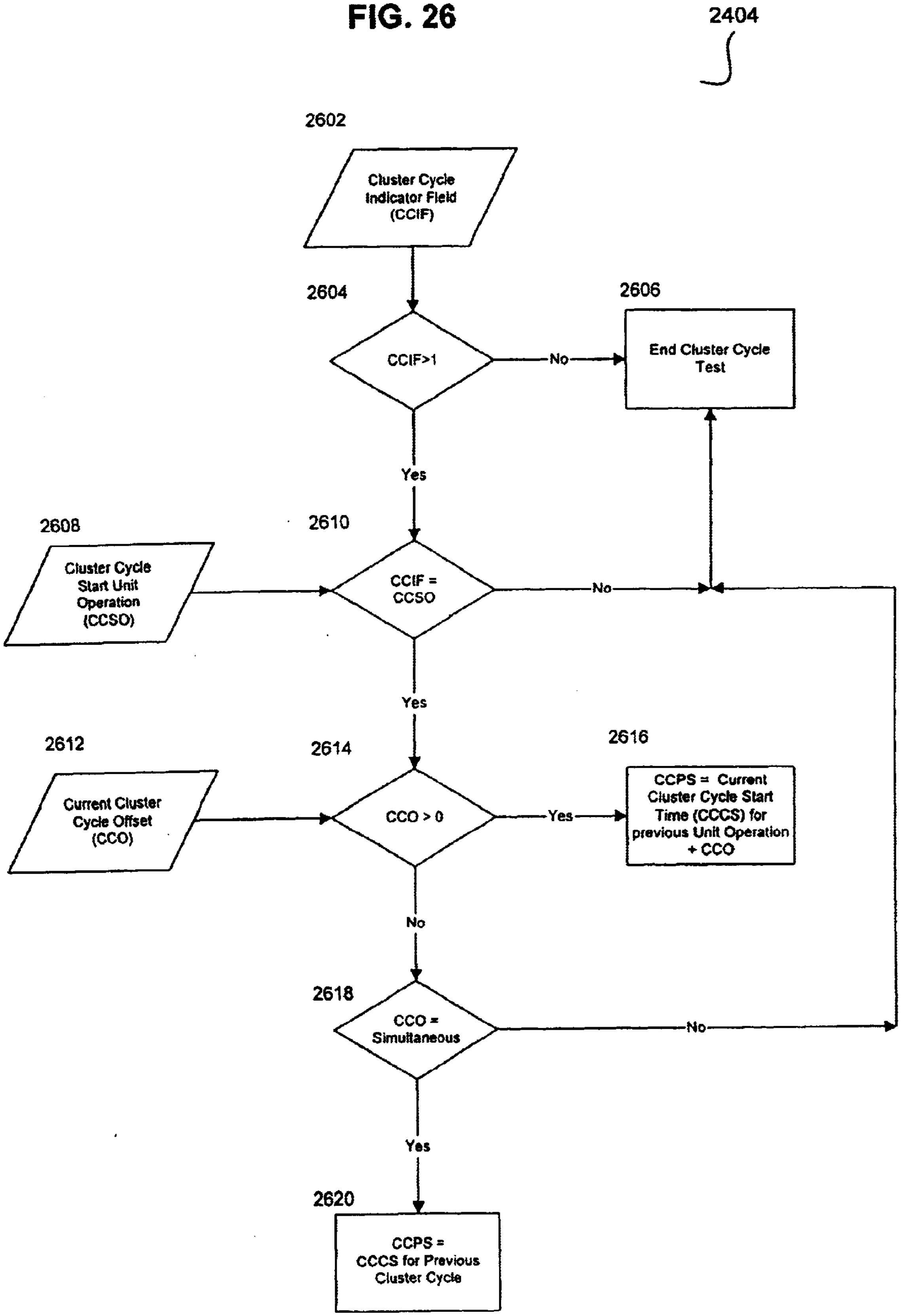
FIG. 26 is a flow chart that illustrates the test for a new unit operation cluster cycle according to an embodiment of the present invention.

Referring to FIG. 26, the CC test in step 2404 is further illustrated. The CCIF for the current Unit Operation in Step 2602 is evaluated in Step 2604. If the CCIF is not greater than one, the CC test is ended in step 2606 and the Unit Operation Cycle Test is performed as in Step 2406. If the CCIF is greater than one, the Cluster Cycle Start Unit Operation (CCSO) is obtained from column 2214 in FIG. 22 (Step 2608). In Step 2610, the CCIF is evaluated to determine if it is equal to the CCSO. If the CCIF is not equal to the CSCO the CC test is ended in Step 2606 and the Unit Operation Cycle Test is performed. If the CCIF is equal to the CSCO, then CCO for the Current Unit Operation is obtained from column 2218 (Step 2612). In step 2614 the CCO is evaluated to determine if it is greater than zero.

If the CCO is greater than zero, CCPS is set equal to Critical Path Start for the Previous Cluster Cycle plus the CCO (Step 2616). If the CCO is not greater than zero, the CCO is evaluated in Step 2618 to determine if it is equal to "S" meaning that the current Unit Operation is to start simultaneously (concurrently) to the first Unit Operation in the current Cluster Cycle. If the CCO is not equal to "S", the CC test is ended in Step 2606 and Unit Operation Cycle Test is performed. Otherwise, the CCPS is set equal to the Critical Path Start for the Previous Cluster Cycle (Step 2620). The resulting value from FIG. 26 is stored for further evaluation in Step 2408.

Step 2406 of FIG. 24 illustrates a UC test being performed after a CC test. In Step 2406, the Unit Operation Cycle Iteration Field (UCIF) for the current unit operation (DCS Field 4) is evaluated to determine if it is greater than one. If it is not, the Unit Operation Cycle Test ends. If it is, the CCPS time for the new Unit Operation Cycle Iteration is calculated from the start time from the previous UC plus the Unit Operation Cycle Offset (UCO) as further defined below. Otherwise the CCPS time for the current Unit Operation continues from the PCPE of the previous Unit Operation.

Figure 27:
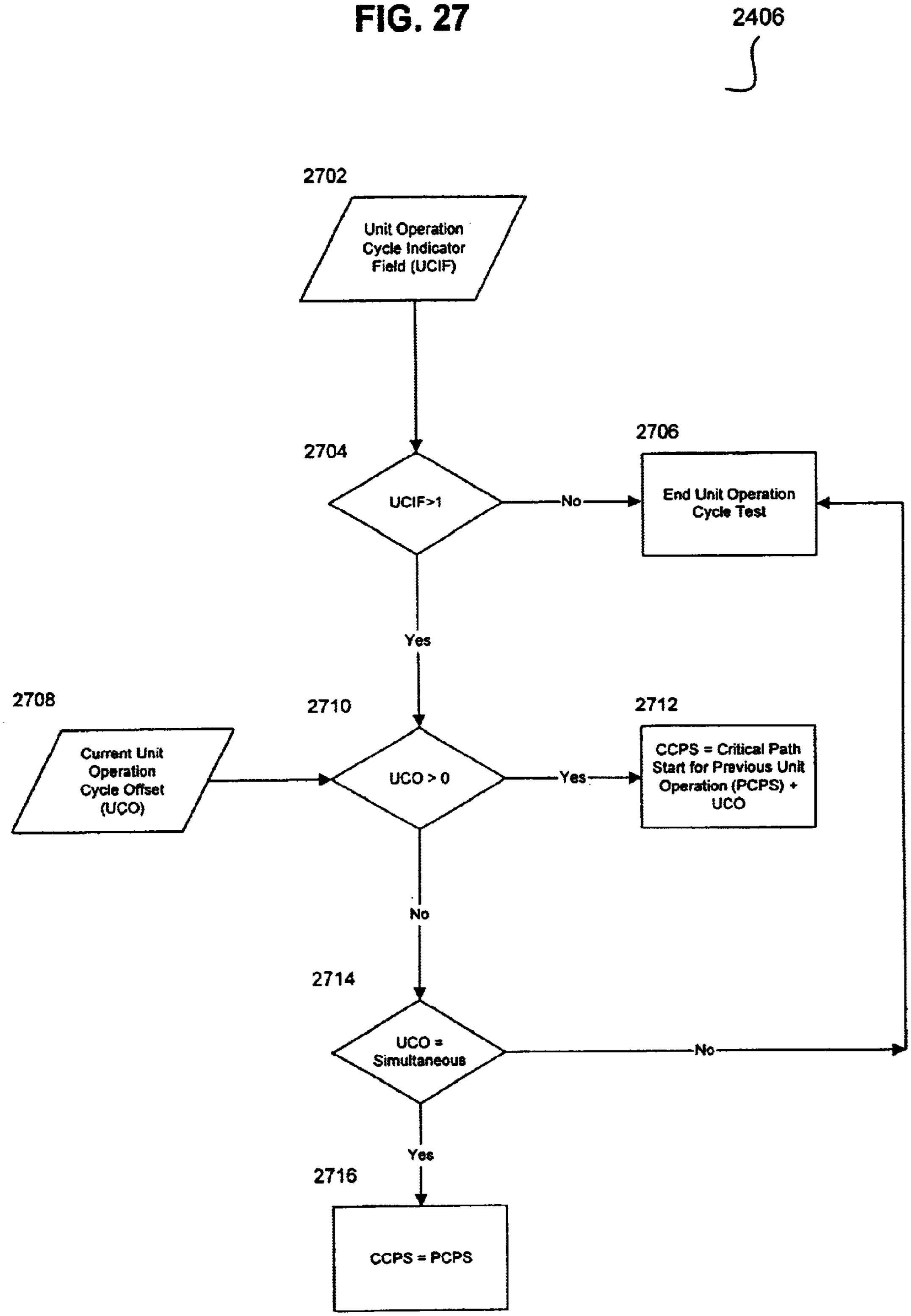
FIG. 27 is a flow chart that illustrates the test for a new unit operation cycle according to an embodiment of the present invention.

Referring to FIG. 27, the evaluation in step 2406 is further illustrated. In Step 2702, the UCIF for the current Unit Operation is obtained. In Step 2704 it is evaluated to determine if it is greater than one. If the UCIF is not greater than one, the Cycle Offset Test ends as indicated by Step 2706. If the UCIF is greater than one, then the UCO for the Current Unit Operation in column 2107 is obtained (step 2708). In step 2710, the UCO is evaluated to determine if it is greater than zero. If the UCO is greater than zero, CCPS is set equal to Critical Path Start for the Previous Unit Operation Cycle plus the UCO (Step 2712). If the UCO is not greater than zero, the UCO is evaluated in Step 2714 to determine if it is equal to "S" meaning that the current Unit Operation is to start simultaneously (concurrently) to the previous Unit Operation. If UCO is not equal to "S", the Unit Operation Cycle Test is ended (Step 2706). Otherwise, the CCPS is set equal to PCPS (Step 2716). The resulting value from FIG. 27 is stored for further evaluation in Step 2408.

Step 2408 of FIG. 24 evaluates the results of the above three Cycle Offset Tests do see if there is a positive result from any of them, indicating that the current unit operation is the beginning of an iteration of one of the three levels of design cycles to which a design cycle offset applies. If there is not a positive result, CCPS is set equal to PCPE (Step 2410). If it there is a positive result CCPS is set equal to the latest start time produced by the three tests (Step 2412).

Figure 28:
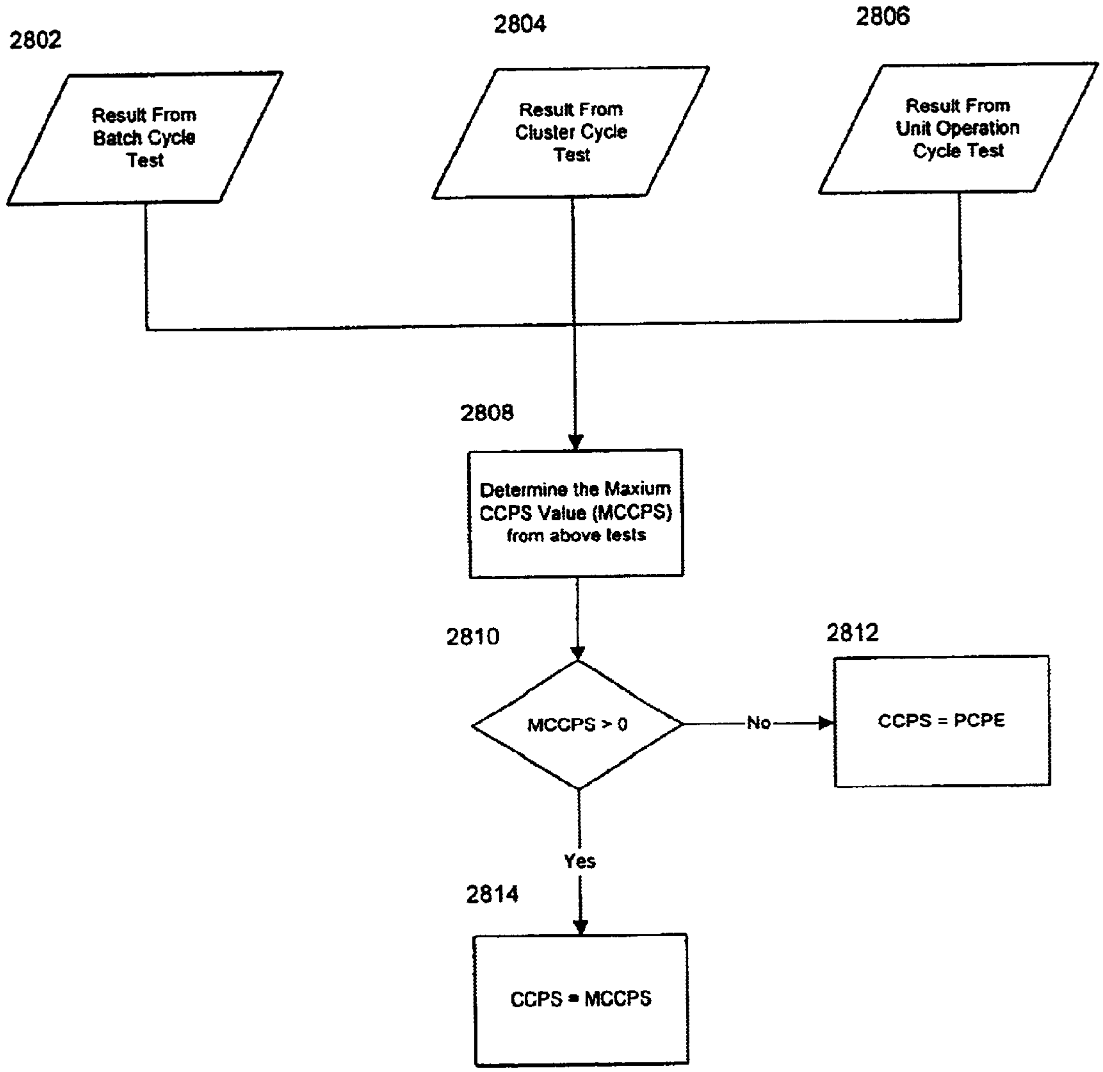
FIGS. 28–34 is a flow chart that illustrates the determination of start/stop times for various cycles according to an embodiment of the present invention.

FIG. 28 further illustrates Steps 2408–2412 of FIG. 24. In Steps 2802, 2804 and 2806 the Design Cycle Test Results from the Batch Cycle Test, Cluster Cycle Test and Unit Operation Cycle Test are obtained, respectively. In Step 2808, these obtained values are evaluated to find the maximum CCPS value (MCCPS). In step 2810, the MCCPS value is evaluated to determine if it is greater than zero. A MCCPS value equal to zero in Step 2808 indicates that the current unit operation is not a start unit operation for any design cycle iteration to which a design cycle offset applies. Therefore the CCPS time for the current unit operation in this case is PCPE (Step 2812). A MCCPS value greater than zero indicates that the current unit operation is the start unit operation for at least one design cycle iteration to which an offset greater than zero applies at the respective design cycle level. Therefore the CCPS time for the current unit operation in this case is equal to MCCPS from Step 2808. Note that the Design Cycle Tests illustrated in FIGS. 24–31 only impact the PTL if the Current Unit Operation (CUO) is the Start Unit Operation (SUO) for an iteration of at least one of the above design cycles and the offset of that design cycle is greater than zero or equal to "S". Otherwise the CCPS starts at PCPE even if the CUO is the SUO for a given Design Cycle.

Once the accurate CCPS has been determined via the above procedure, the CCPS times for each of the Design Cycle levels needs to be updated to be referenced by the Design Cycle Check mechanism for the next PTLM in the PTL as shown in Step 2414 of FIG. 24. This update mechanism is dependent on the current PTLM being the SUO of a respective Design Cycle set and the number of cycles for a respective Design Cycle level being greater than one. This update mechanism does not depend on there being an Offset Value greater than zero associated with the respective Design Cycle, as does the above Design Cycle Check mechanism.

Figure 29:
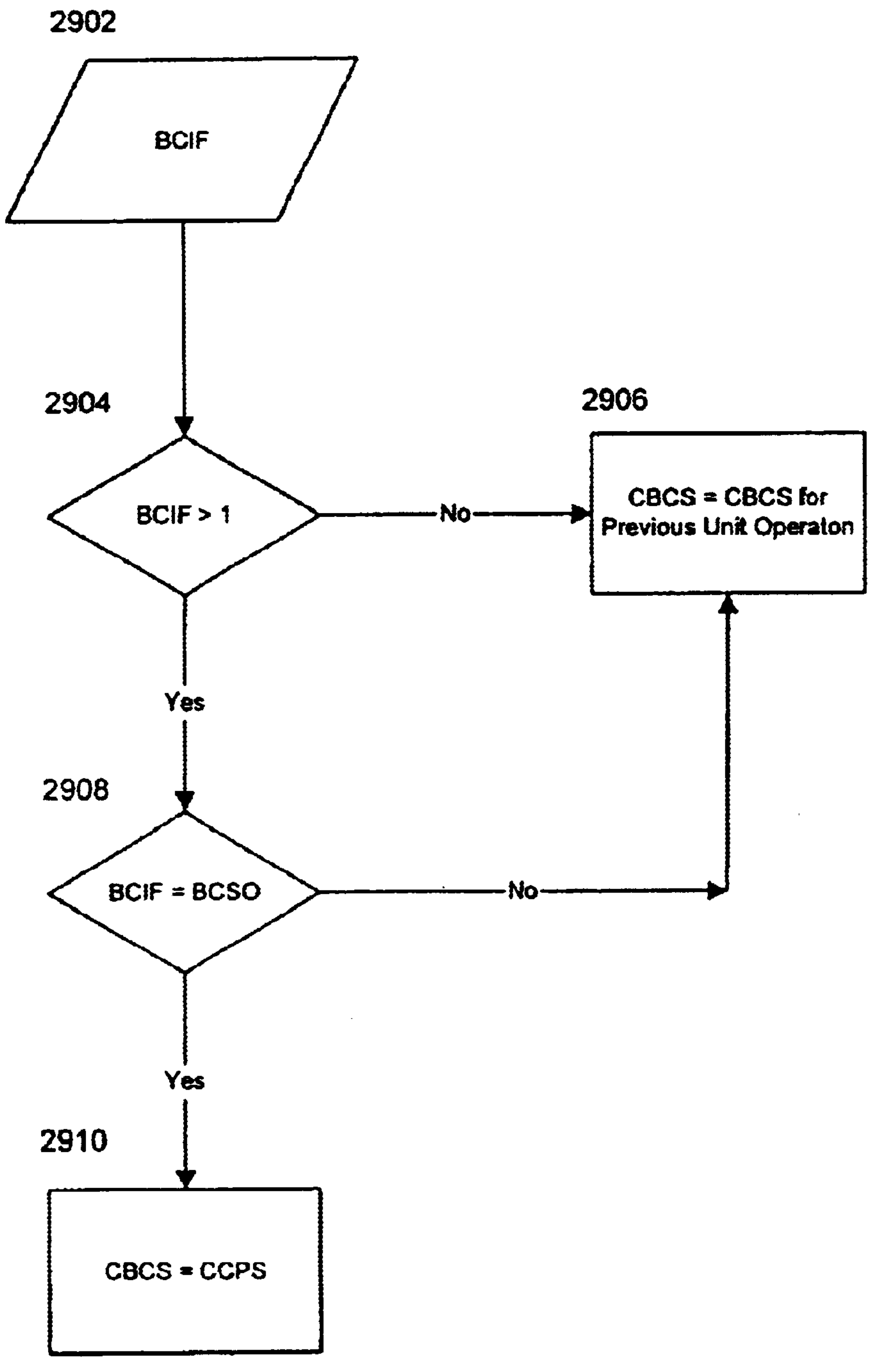

FIG. 29 further illustrates the procedure for updating the CCPS for the current Batch Cycle for the current PTLM. The BCIF is obtained in Step 2902 and evaluated in Step 2904. If the BCIF is not greater than one, the current PTLM is not the start of a new Batch Cycle because there are no reiterating Batch Cycles defined for the current PTL in the Unit Operations List (FIG. 21, Column 2120). Therefore, the Start Time for the CCPS for the current Batch Cycle (CBCS) is set equal to the CBCS for the previous Unit Operation (Step 2906). If BCIF is greater than one, the BCIF is further evaluated in Step 2908 to determine if it is equal to the BCSO. If the BCIF is not equal to the BCSO, the current Unit Operation is not the Start Unit Operation for a new iteration of a Batch Cycle. Therefore, the CBCS is set equal to CBCS for the Previous Unit Operation (Step 2906). If the BCIPF is equal to the BCSO, the current Unit Operation is the Start Unit Operation for a new iteration of a Batch Cycle and CBCS is set equal to the CCPS for the Current PTLM as determined by the procedures illustrated in FIGS. 25–28.

Figure 30:
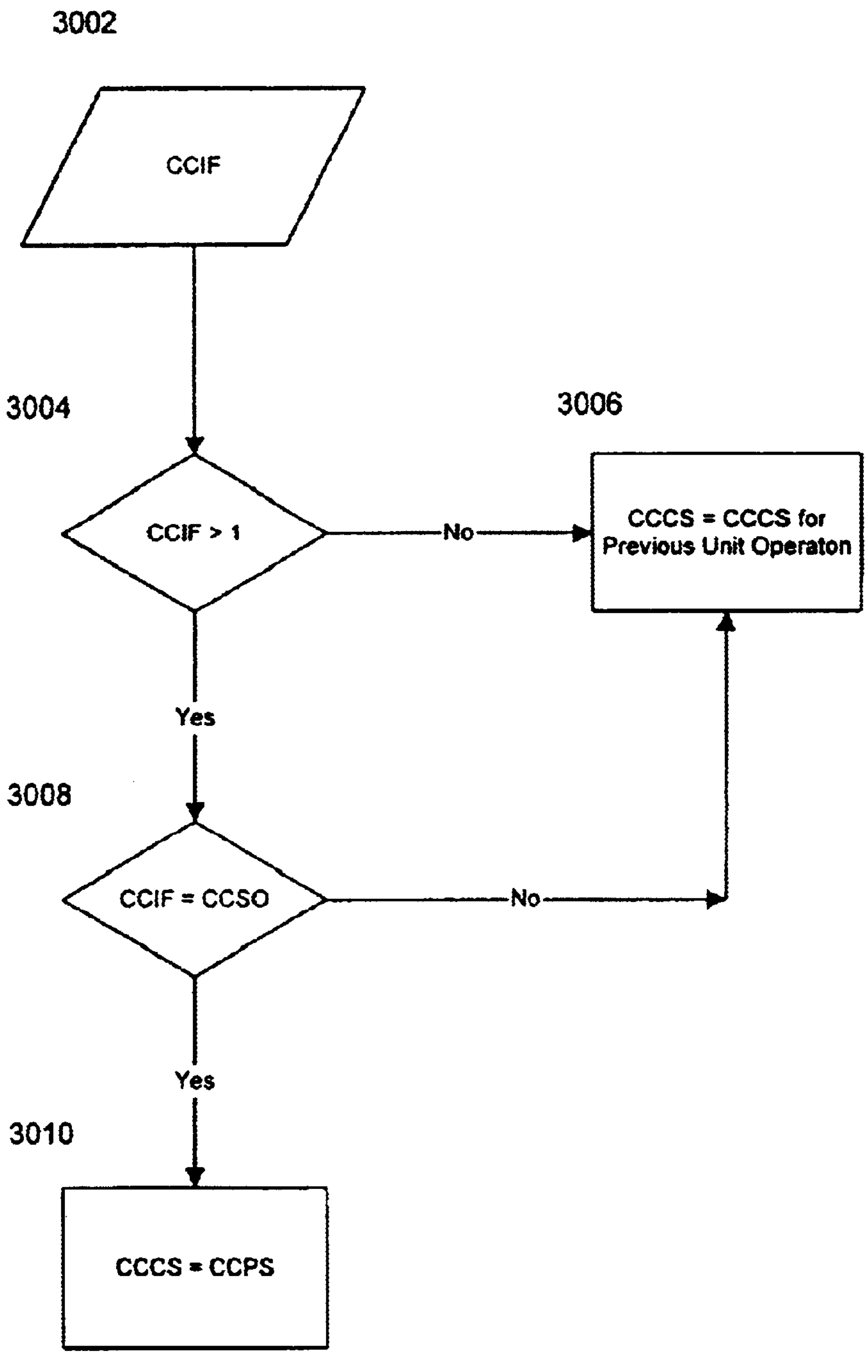

FIG. 30 further illustrates the procedure for updating the CCPS for the current Cluster Cycle for the current PTLM. The CCIF is obtained in Step 3002 and evaluated in Step 3004. If the CCIF is not greater than one, the current PTLM is not the start of a new Cluster Cycle iteration because there are no reiterating Cluster Cycles defined for the current PTL in the Unit Operations List (FIG. 21, Column 2112). Therefore, the Start Time for the CCPS for the current Cluster Cycle (CCCS) is set equal to the CCCS for the previous Unit Operation (Step 3006). If CCIF is greater than one, the CCIF is further evaluated in Step 3008 to determine if it is equal to the CCSO. If the CCIF is not equal to the CCSO, the current Unit Operation is not the Start Unit Operation for a new iteration of a Cluster Cycle. Therefore, the CCCS is set equal to CCCS for the Previous Unit Operation (Step 3006). If the BCIPF is equal to the CCSO, the current Unit Operation is the Start Unit Operation for a new iteration of a Cluster Cycle and CCCS is set equal to the CCPS for the Current PTLM as determined by the procedures illustrated in FIGS. 25–28.

Figure 31:
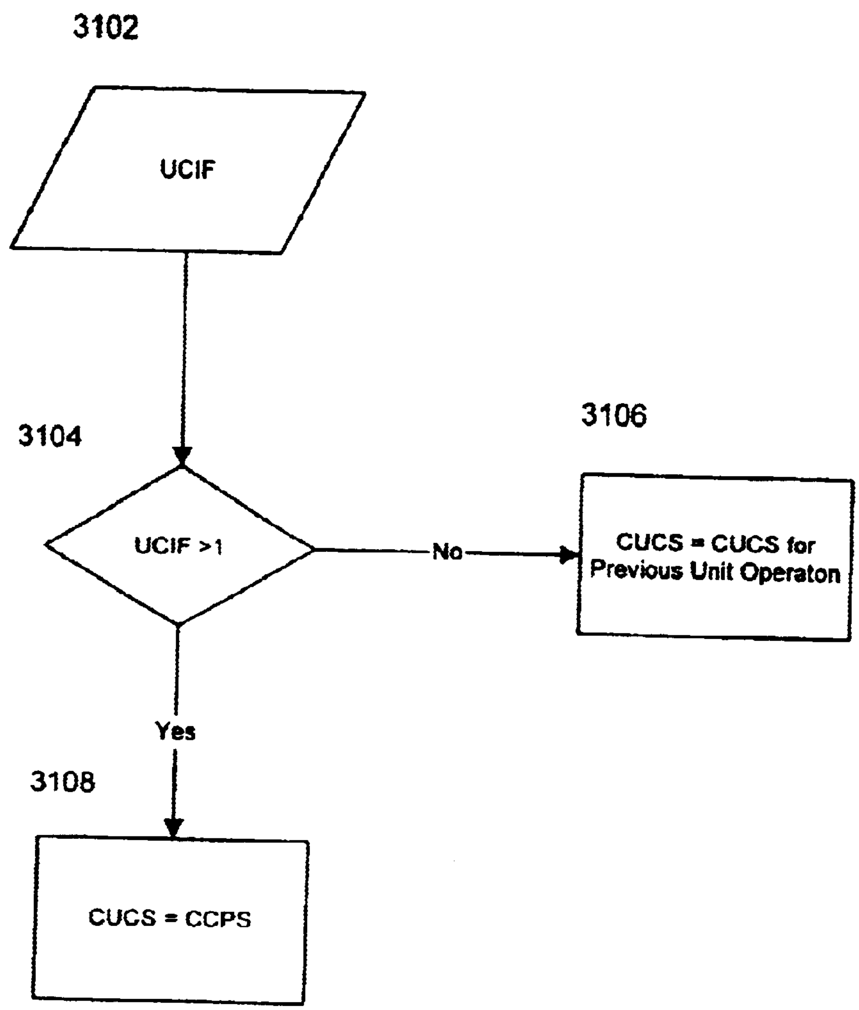

FIG. 31 further illustrates the procedure for updating the CCPS for the current Unit Operation Cycle for the current PTLM. The UCIF is obtained in Step 3102 and evaluated in Step 3104. If the UCIF is not greater than one, the current PTLM is not the start of a new Unit Operations Cycle iteration because there are no reiterating Unit Operations Cycles defined for the current PTL in the Unit Operations List (FIG. 21, Column 2112). Therefore, the Start Time for the CCPS for the current Unit Operations Cycle (UCCS) is set equal to the UCCS for the previous Unit Operation (Step 3106). If UCIF is greater than one, the CCCS is set equal to the CCPS for the Current PTLM as determined by the procedures illustrated in FIGS. 25–28.

Figure 32:
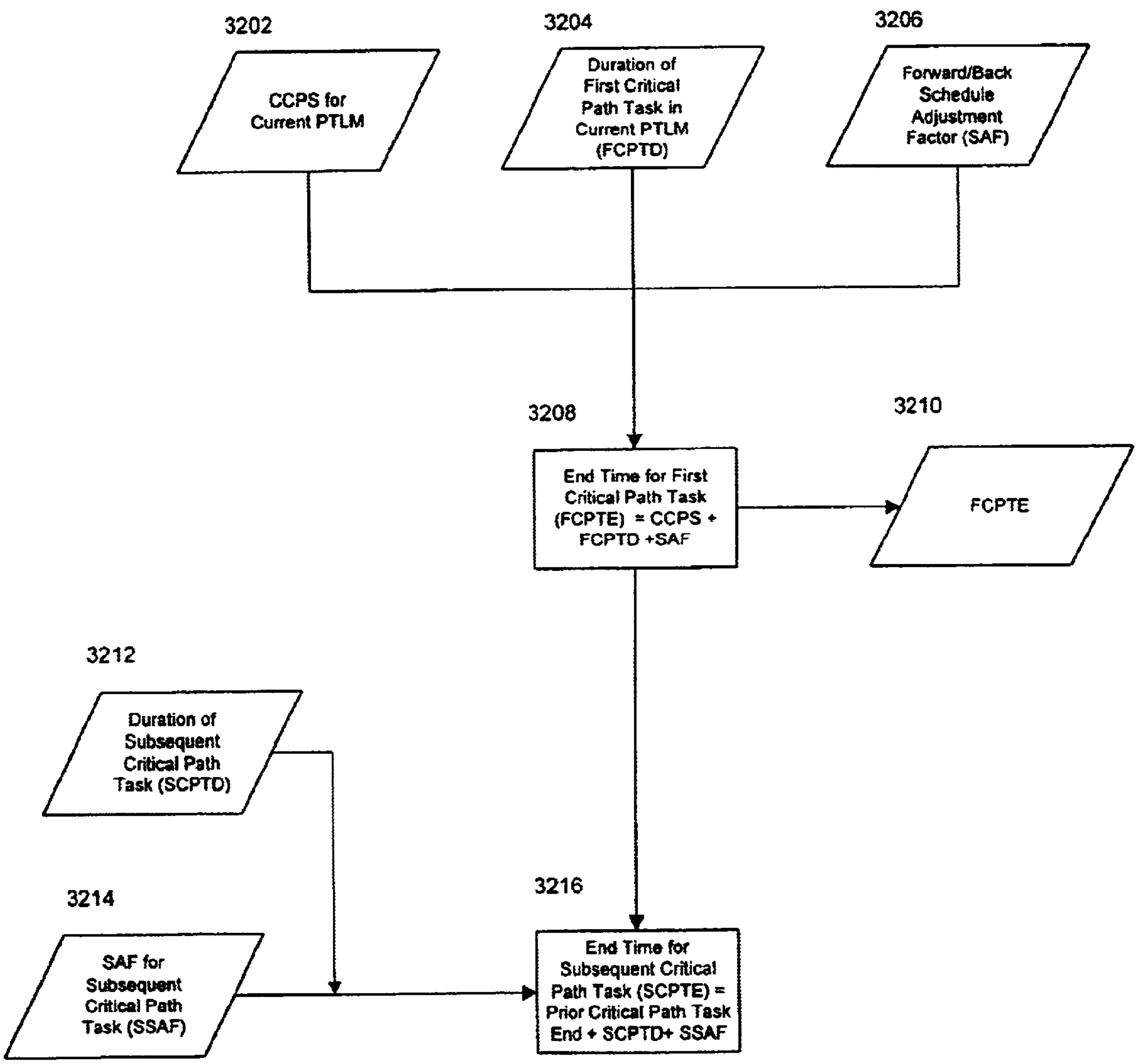

After the accurate CCPS has been determined for a PTLM and the CCPS for each of the Design Cycle Levels has been updated, the Task Start/Stop Times for each Critical Path Task (CPT) for the Current Unit Operation is calculated as illustrated in Step 2416. FIG. 32 further illustrates the procedure for determining the Task Start/Stop Times for each CPT for the Current Unit Operation. In Step 3202 the CCPS is obtained for the current PTLM via the procedure illustrated in Steps 2402–2412. In Step 3204 the duration of the First CPT (FCPT) is obtained from the calculations illustrated in FIG. 23, Column 2304. In Step 3206 the SAF is entered manually by the user to provide the user a means of delaying (or starting earlier) the start of a CPT. The SAF can be used to manually adjust the PTL in order to start and end tasks at more favorable times with respect to shift scheduling of labor resources and equipment utilization. For example, if a task is scheduled by automatic PTL calculation to end during a night shift when no staffing is present, and staffing is required to end the task and/or start the following task on the PTL, the SAF can be used to delay the start of a Critical Path Task such that the end of the task occurs when staffing will be present as required. The use of the SAF, as well as its limits of use, is further discussed below.

In step 3208 the CCPS for the current PTLM is added to the duration and the SAF of the FCPT to determine the end time of the FCPT (FCPTE). The present embodiment focuses on the determination of task end times from which the start time is back calculated. Alternatively, the FCPT Start time can be determined first by adding the SAF to the CCPS for the current PTL. In this latter case the FCPTE is calculated by adding the duration for the FCPT to this start time. The former method was chosen for this example because the end time of a CPT task is generally the focus of attention when optimizing a PTL. Generally, the SAF for all Critical Path Tasks is usually greater than or equal to zero. If the SAF for a CPT is less than zero, the start time for the CPT may conflict with the end time for the previous CPT.

For example, if the transfer of a product from a "product hold vessel" to a "product mix vessel" is defined as CPT 1, and the mixing of the product in the mix vessel is defined as CPT 2, the start/end times for CPT 2 cannot be back scheduled such that the start time for CPT 2 begins before the transfer of the product from CPT 1 is complete. However, there may be instances when it is preferable for the start time for CPT2 to begin before CPT 1 is completed. Such an example may involve the cooling or heating of product in a product mix vessel associated with CPT 2. If the start of the cooling or heating cycle for the product is associated with CPT 2, the heating or cooling cycle may need to be started after the product transfer has started and before the product transfer is complete. In this case the SAF can be a negative value. However, in general, the SAF is used to delay the start/end of a CPT from the completion time of the previous CPT, provided the delay does not conflict with use of the unit operation resources for another scheduled event or comprise the process or product in any other way.

Returning to FIG. 32, in Step 3214, the end time for a subsequent CPT is similarly determined by adding the duration (Step 3210) and SAF (Step 3212) for the subsequent CPT to the end time from the previous CPT for a given PTLM. The start time for the subsequent CPT can then be back calculated from the end time by subtracting the sum of the duration and SAF for the given subsequent task. As in the case of the FCPT, the start time for the subsequent CPT can be alternatively calculated first by adding the SAF to the end time for the previous CPT within the PTLM. In this case, the end time for the subsequent CPT is then calculated by adding the duration for the subsequent CPT to this sum. The procedure for determining the Start/Stop time for a subsequent CPT in Steps 3210 to 3214 is repeated for each subsequent CPTs associated with a given PTLM, thereby generating a critical path time line for the current PTLM.

Figure 33:
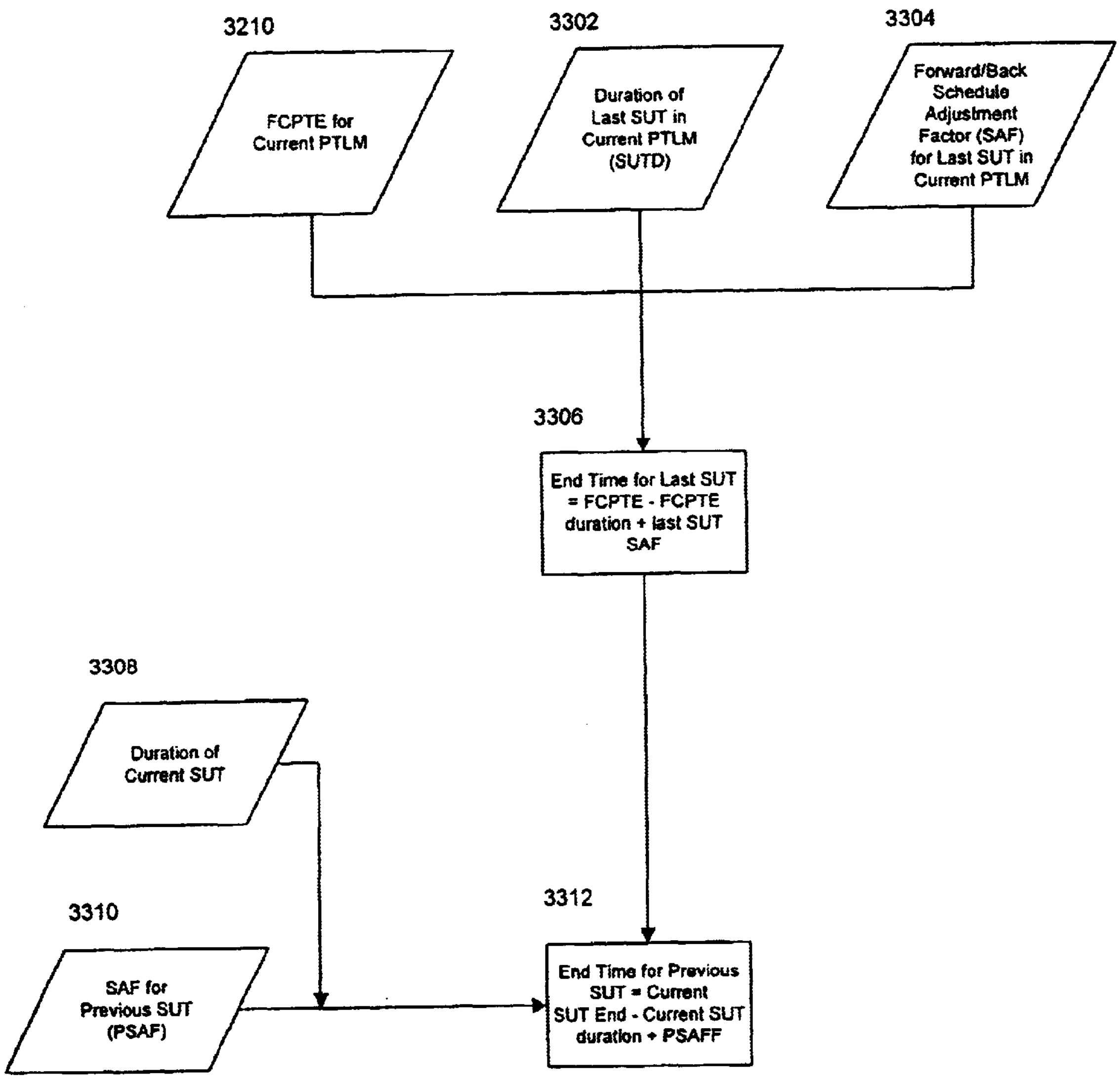

Referring to FIG. 33, the procedure for determining the Task Start/Stop Times for each SUT for the Current Unit Operation is further illustrated. The FCPTE for the Current PTLM is obtained from Step 3210 for the current PTLM. In Step 3302, the duration of the Last SUT (SUTL) is obtained from the calculations illustrated in FIG. 23, Column 2304. In some cases, the duration of SUTL will be entered manually by the user rather than calculated. In Step 3304, the Forward/Batch Schedule Adjustment Factor (SAF) for the SUTL is entered manually to provide the user a means of starting the SUT earlier. In most cases the SAF for all SUTs will be less than or equal to zero, implying that the SUT will start in time to be completed before the next task in the PTL begins or will start earlier than the minimum start time. If the SAF for a CPT greater than zero, the start time for the CPT may conflict with the end time for the previous CPT.

In step 3306, the duration of the FCPTE for the current PTLM is subtracted from the FCPTE and added to the SAF for the SUTL to determine the end time of the SUTL. As previously stated, the present embodiment focuses on the determination of task end times from which the start time is back calculated. Alternatively, the SUTL Start Time can be determined by subtracting the duration of the FCPTE and SUTL from the FCPTE and adding the SAF to the result. In this latter case, the end time for the SUTL is calculated by adding the duration for the SUTL and SAF to its start time. The former method was chosen for this example because the end time of a SUT task is generally the focus of attention when optimizing a PTL.

In Step 3312, the end time for a previous SUT is similarly determined by subtracting the duration of the current SUT from (Step 3308) from the end time for the current SUT and adding the result to the SAF (Step 3310) for the previous SUT. The start time for the previous SUT can then be back calculated from its end time by subtracting its duration from its end time. As in the case of the SUTL, the start time for the previous SUT can be alternatively calculated first by subtracting the duration of the current SUT and previous SUT from the end time of the current SUT and adding the SAF for the previous SUT to the result. In this case, the end time for the previous SUT is then calculated by adding the duration for the previous SUT to this sum. The procedure for determining the Start/Stop time for a previous SUT in Steps 3308 to 3312 is repeated for each previous SUT associated with a given PTLM, thereby generating a critical path time line for the current PTLM.

Figure 34:
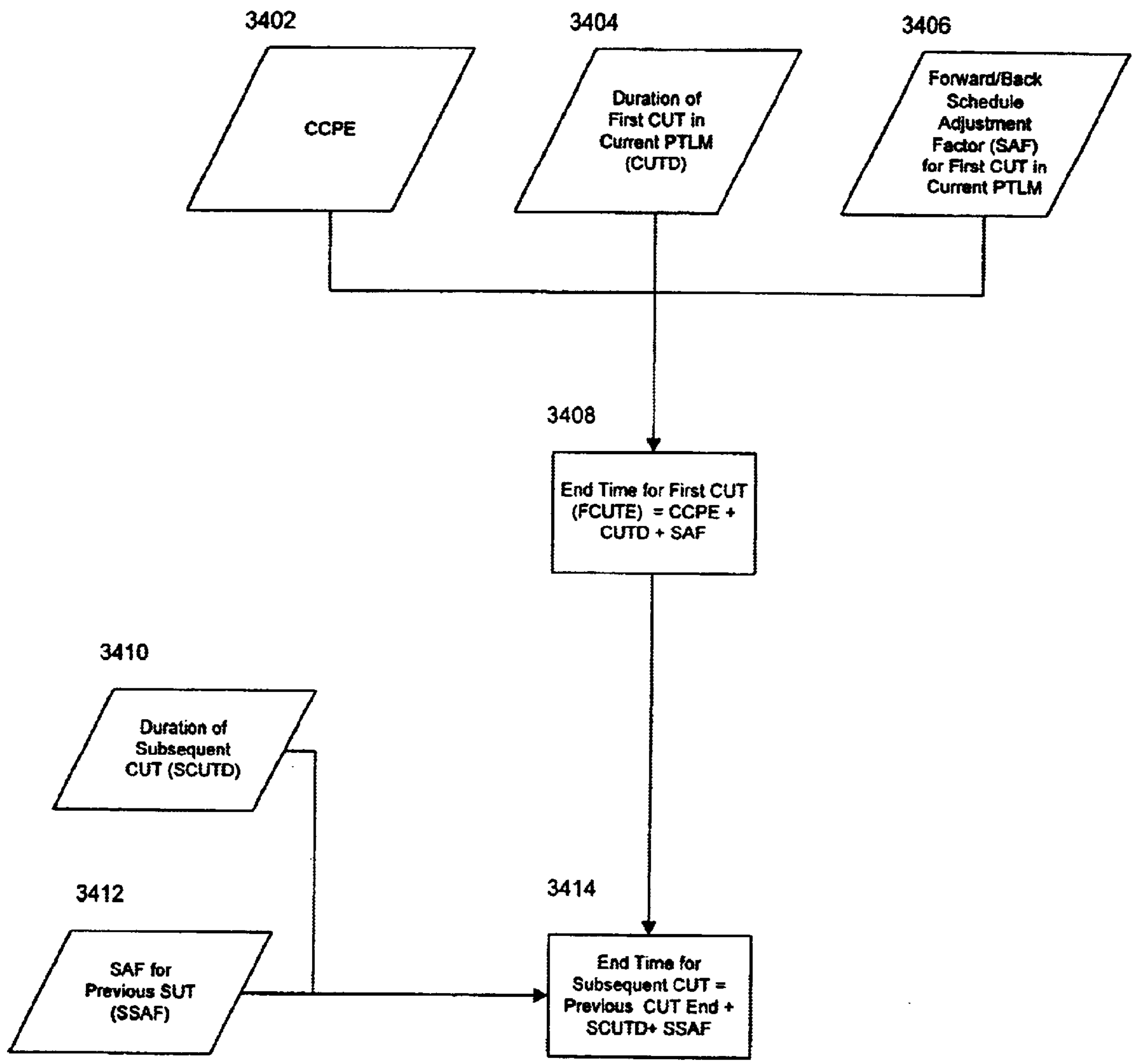

Referring to FIG. 34, the procedure for determining the Task Start/Stop Times for each CUT for the Current Unit Operation is further illustrated. The CCPE for the Current PTLM is obtained in Step 3402. In Step 3404, the duration of the First CUT (CUTF) is obtained from the calculations illustrated in FIG. 23, Column 2304. In some cases the duration of CUTF will be entered manually by the user rather than calculated. In Step 3406, the SAF for the CUTF can be altered manually from its default of zero to provide the user a means of delaying the start of the CUT. In most cases the SAF for all CUTs will be greater than or equal to zero. This implies that the CUT will start when the last CPT for a given PTLM is completed (SAF for CUT is set equal to zero) or sometime after CCPE (SAF for CUT is greater than zero) provided that all CUTs associated with a PTLM are completed before the next use cycle of the equipment and resources associated with the current PTLM. If the SAF for a CPT is less than zero, the start time for the CPT may conflict with the end time for the last CPT (or previous CUT). In step 3408, the CCPE for the current PTLM obtained in Step 3402 is added to the duration and SAF for the CUTF to determine the end time of the CUTF. As previously stated, the present embodiment focuses on the determination of task end times from which the start time is back calculated. Alternatively, the CUTF Start Time can be determined first by adding the SAF to the CCPE. In this latter case the end time for the CUTF is calculated by adding the duration for the CUTF to its calculated start time. The former method was chosen for this example because the end time of CUT task is generally the focus of attention when optimizing a PTL.

In Step 3414, the end time for a subsequent CUT (CUTS) is similarly determined by adding the duration (Step 3410) and SAF (Step 3412) for the CUTS to the end time from the current CUT for a given PTLM. The start time for the CUTS can then be back calculated from the end time by subtracting the duration of the CUTS from its end time. As in the case of the CUTL, the start time for the CUTS can be alternatively calculated first by adding the SAF to the end time for the current CUT within the PTLM. In this latter case, the end time for the CUTS is then calculated by adding the duration for the previous CUT to this sum. The procedure for determining the Start/Stop time for a CUTS in Steps 3408 to 3412 is repeated for each CUTS associated with a given PTLM, thereby generating a critical path time line for the current PTLM.

The Process Start Time (PST) for a PTL is entered manually by the user and provides the start point for all of the above time line calculations. The first PTLM in a PTL takes the PST as the CCPS to begin the PTL. Once the CCPS for the first PTLM has been entered, it is possible to calculate start and end times of all the CPTs, as well as the SUTs and CUTs associated with the first PTL. Subsequently, the start and end times of the CPTs, SUTs and CUTs for all subsequent PTLMs can be determined based on the above procedure.

Figure 13:
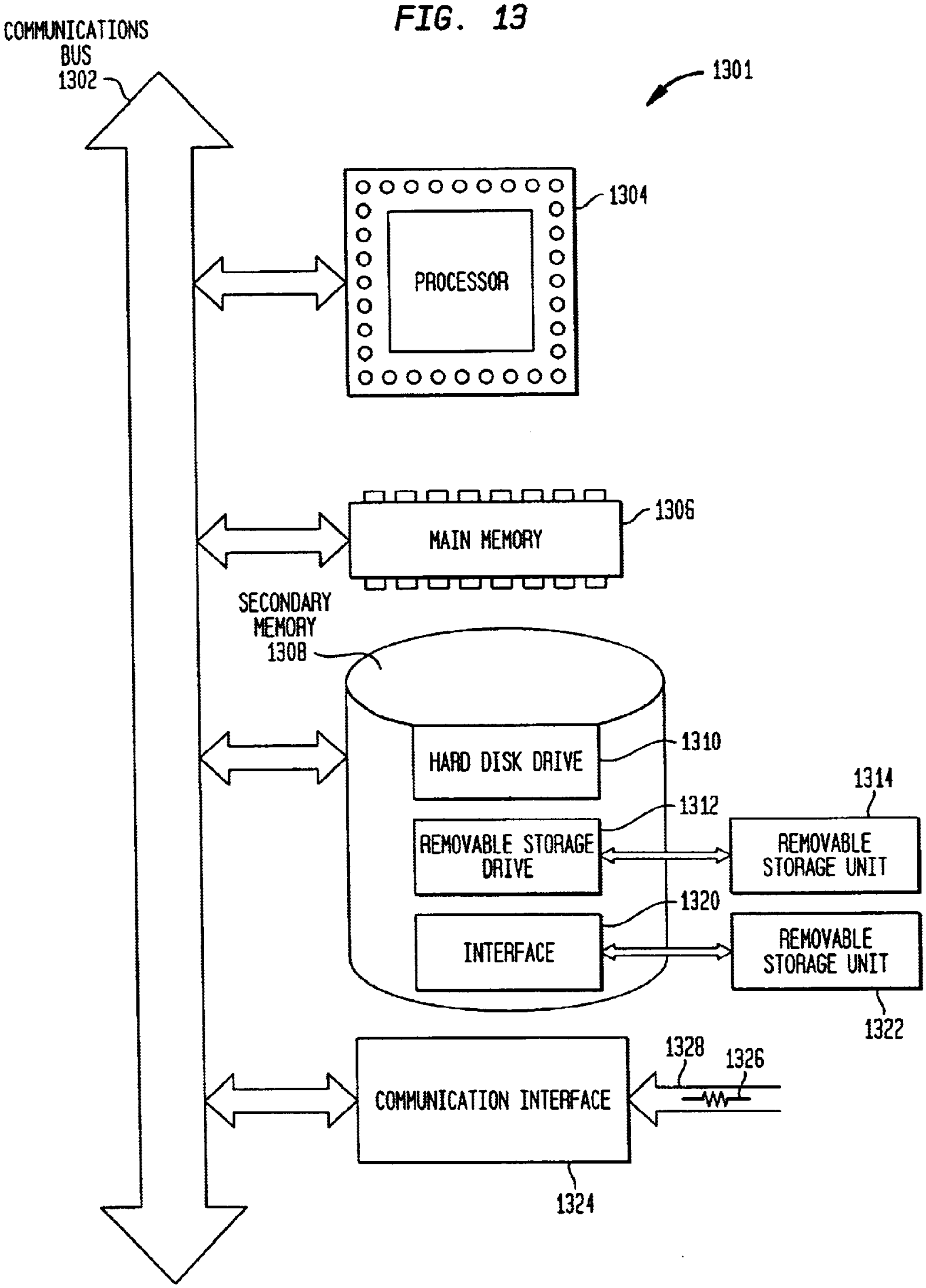
FIG. 13 illustrates an exemplary computer according to an embodiment of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1301 is shown in FIG. 13. The computer system 1301 includes one or more processors, such as processor 1304. The processor 1304 is connected to a communication bus 1302. Various software embodiments are described in terms of this example computer system. After reading this description, it will become apparent to a person skilled in the relevant art how to implement the invention using other computer systems and/or computer architectures.

Computer system 1302 also includes a main memory 1306, preferably random access memory (RAM), and can also include a secondary memory 1308. The secondary memory 1308 can include, for example, a hard disk drive 1310 and/or a removable storage drive 1312, representing a floppy disk drive, a magnetic tape drive, an optical disk drive, etc. The removable storage drive 1312 reads from and/or writes to a removable storage unit 1314 in a well known manner. Removable storage unit 1314, represents a floppy disk, magnetic tape, optical disk, etc. which is read by and written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into computer system 1301. Such means can include, for example, a removable storage unit 1322 and an interface 1320. Examples of such can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1301.

Computer system 1301 can also include a communications interface 1324. Communications interface 1324 allows software and data to be transferred between computer system 1301 and external devices. Examples of communications interface 1324 can include a modem, a network interface (such as an Ethernet card), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface via a channel 1328. This channel 1328 carries signals 1326 and can be implemented using wire or cable, fiber optics, a phone line, a cellular phone link, an RF link and other communications channels.

In this document, the terms "computer program medium" and "computer usable medium" are used to generally refer to media such as removable storage device 1312, a hard disk installed in hard disk drive 1310, and signals 1326. These computer program products are means for providing software to computer system 1301.

Computer programs (also called computer control logic) are stored in main memory and/or secondary memory 1308. Computer programs can also be received via communications interface 1324. Such computer programs, when executed, enable the computer system 1301 to perform the features of the present invention as discussed herein. In particular, the computer programs, when executed, enable the processor 1304 to perform the features of the present invention. Accordingly, such computer programs represent controllers of the computer system 1301.

In an embodiment where the invention is implemented using software, the software may be stored in a computer program product and loaded into computer system 1301 using removable storage drive 1312, hard drive 1310 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While the invention has been particularly shown and described with reference to preferred embodiments thereof, it will be understood by those skilled in the relevant art that various changes in form and details may be made therein without departing from the spirit and scope of the invention.

What is claimed is:

1. A method for simulating and modeling a batch processing manufacturing facility, comprising the steps of:

(1) selecting a sequence of unit operations, wherein each of said sequence of unit operations has an identifier code, wherein each unit operation includes one or more tasks required to execute a particular unit operation, wherein said tasks include a scheduling calculation for determining the duration of a particular task;

(2) selecting a set of scheduling cycles for each of said sequence of unit operations;

(3) defining an offset for each of said scheduling cycles;

(4) referencing a master table using said identifier code to obtain operational parameters for each of said sequence of unit operations;

(5) generating a block flow diagram using said sequence of unit operations and said operational parameters; and (6) generating a process time line using said operational parameters, said block flow diagram, said set of scheduling cycles, said offsets and said tasks for each of said sequence of unit operations, wherein said tasks include a unit operation set up task, a unit operation execution task, and a unit operation clean up task, and wherein said process time line is primarily impacted by each said unit operation execution task relative to a respective offset, wherein said unit operation set up tasks and said unit operation clean up tasks impact said process time line secondarily in a back calculating and forward calculating manner with respect to corresponding unit operation execution tasks, respectively, whereby said process time line is used as a tool for batch processing, facility design and/or resource planning.

2. The method of claim 1, wherein the batch process manufacturing facility is a biopharmaceutical batch processing facility.

3. The method of claim 1, further comprising defining a Current Critical Path Start time (CCPS), wherein said CCPS is the start time for a first unit operation execution task in a current unit operation being evaluated by a scheduling procedure.

4. The method of claim 3, further comprising (1) defining a batch cycle as a set of two or more unit operations that cycle together as a subset of a process cycle, wherein said process cycle includes unit operations that generate crude product, (2) determining a batch cycle offset for scheduling unit operations and their respective tasks associated with a batch cycle, and (3) applying said batch cycle offset to a CCPS associated with each said unit operation in order to schedule said tasks within said process time line if said unit operation is part of said batch cycle.

5. The method of claim 4, further comprising (1) defining a cluster cycle as a set of two or more unit operations that cycle together within a batch cycle, (2) determining a cluster cycle offset for scheduling two or more unit operations and their respective tasks associated with a cluster cycle, and (3) applying said cluster cycle offset to a CCPS associated with each said unit operation in order to schedule said tasks within said process time line if said unit operation is part of said cluster cycle.

6. The method of claim 5, further comprising (1) defining a unit operation cycle within a cluster cycle or a batch cycle, (2) determining a unit operation offset for scheduling said one or more tasks associated with a unit operation cycle, and (3) applying said unit operation offset to a CCPS associated with each said unit operation in order to schedule said tasks within said process time line if said unit operation is part of said unit operation cycle.

7. A system for simulating and modeling a batch processing manufacturing facility, comprising:

means for selecting a sequence of unit operations, wherein each of said sequence of unit operations has an identifier code, wherein each unit operation includes one or more tasks required to execute a particular unit operation, wherein said tasks include a scheduling calculation for determining the duration of a particular task;

means for selecting a set of scheduling cycles for each of said sequence of unit operations;

means for defining an offset for each of said scheduling cycles;

means for referencing a master table using said identifier code to obtain operational parameters for each of said sequence of unit operations;

means for generating a block flow diagram using said sequence of unit operations and said operational parameters; and means for generating a process time line using said operational parameters, said block flow diagram, said set of scheduling cycles, said offsets and said tasks for each of said sequence of unit operations, wherein said tasks include a unit operation set up task, a unit operation execution task, and a unit operation clean up task, and wherein said process time line is primarily impacted by each said unit operation execution task relative to a respective offset, wherein said unit operation set up tasks and said unit operation clean up tasks impact said process time line secondarily in a back calculating and forward calculating manner with respect to corresponding unit operation execution tasks, respectively, whereby said process time line is used as a tool for batch processing, facility design, and/or resource planning.

8. The system of claim 7, further comprising means for defining a Current Critical Path Start time (CCPS), wherein said CCPS is the start time for a first unit operation execution task in a current unit operation being evaluated by a scheduling procedure.

9. The system of claim 8, further comprising means for defining a batch cycle as a set of two or more unit operations that cycle together as a subset of a process cycle, wherein said process cycle includes unit operations that generate crude product, means for determining a batch cycle offset for scheduling unit operations and their respective tasks associated with a batch cycle, and means for applying said batch cycle of met to a CCPS associated with each said unit operation in order to schedule said tasks within said process time line if said unit operation is part of said batch cycle.

10. The system of claim 9, further comprising means for defining a cluster cycle as a set of two or more unit operations that cycle together within a batch cycle, means for determining a cluster cycle offset for scheduling two or more unit operations and their respective tasks associated with a cluster cycle, and means for applying said cluster cycle offset to a CCPS associated with each said unit operation in order to schedule said tasks within said process time line if said unit operation is part of said cluster cycle.

11. The system of claim 10, further comprising means for defining a unit operation cycle within a cluster cycle or a batch cycle, means for determining a unit operation offset for scheduling said one or more tasks associated with a unit operation cycle, and means for applying said unit operation offset to a CCPS associated with each said unit operation in order to schedule said tasks within said process time line if said unit operation is part of said unit operation cycle.

12. The system of claim 7, wherein the batch process manufacturing facility is a biopharmaceutical batch processing facility.

* * * * *